United States Patent
Gharabegian

(10) Patent No.: US 10,159,316 B2
(45) Date of Patent: Dec. 25, 2018

(54) INTELLIGENT SHADING CHARGING SYSTEMS

(71) Applicant: SHADECRAFT, LLC, Glendale, CA (US)

(72) Inventor: Armen Sevada Gharabegian, Glendale, CA (US)

(73) Assignee: Shadecraft, Inc., Pasadena, CA (US)

( * ) Notice: Subject to any disclaimer, the term of this patent is extended or adjusted under 35 U.S.C. 154(b) by 108 days.

(21) Appl. No.: 15/212,173

(22) Filed: Jul. 15, 2016

(65) Prior Publication Data

US 2017/0318921 A1 Nov. 9, 2017

Related U.S. Application Data

(63) Continuation-in-part of application No. 15/160,856, filed on May 20, 2016, and a continuation-in-part of application No. 15/160,822, filed on May 20, 2016.

(60) Provisional application No. 62/333,822, filed on May 9, 2016, provisional application No. 62/333,822, filed on May 9, 2016.

(51) Int. Cl.
*A45B 23/00* (2006.01)
*H02J 7/35* (2006.01)
(Continued)

(52) U.S. Cl.
CPC .............. *A45B 23/00* (2013.01); *A45B 17/00* (2013.01); *A45B 25/02* (2013.01); *A45B 25/16* (2013.01); *A45B 25/18* (2013.01); *B60L 11/1818* (2013.01); *H02J 7/355* (2013.01); *H02S 20/30* (2014.12); *H02S 40/38* (2014.12);
(Continued)

(58) Field of Classification Search
CPC .......................... A47B 17/00; A47B 2017/005
See application file for complete search history.

(56) References Cited

U.S. PATENT DOCUMENTS

| 138,774 A | 6/1873 | Whitcomb |
|---|---|---|
| 2,070,045 A | 2/1937 | Gilpin |

(Continued)

FOREIGN PATENT DOCUMENTS

| CN | 102258250 | 11/2011 |
|---|---|---|
| CN | 203073199 | 7/2013 |

(Continued)

OTHER PUBLICATIONS

Written Opinion of the International Searching Authority, International Application No. PCT/US2016/033331, Written Opinion Completed: Jul. 27, 2016.

(Continued)

*Primary Examiner* — Noah Chandler Hawk

(57) ABSTRACT

An intelligent shading charging system, includes a housing having a rechargeable battery installed therein, a lower support assembly connected to the housing and an upper support assembly, the upper support assembly including one or more arm support assemblies. The intelligent shading charging system further includes a hinging assembly connecting a lower support assembly to an upper support assembly to allow an upper support assembly to rotate with respect to the lower support assembly, one or more arms connected to the one or more are support assemblies, a shading fabric; and one or more solar cell arrays mounted on or integrated within the shading fabric.

18 Claims, 24 Drawing Sheets

(51) Int. Cl.

| | | |
|---|---|---|
| *B60L 11/18* | (2006.01) | |
| *H02S 20/30* | (2014.01) | |
| *H02S 40/38* | (2014.01) | |
| *A45B 25/02* | (2006.01) | |
| *A45B 17/00* | (2006.01) | |
| *A45B 25/18* | (2006.01) | |
| *A45B 25/16* | (2006.01) | |
| *H04N 7/18* | (2006.01) | |
| *A45B 25/00* | (2006.01) | |
| *F21Y 115/10* | (2016.01) | |

(52) U.S. Cl.
CPC ........ *H04N 7/181* (2013.01); *A45B 2017/005* (2013.01); *A45B 2023/0012* (2013.01); *A45B 2025/003* (2013.01); *A45B 2200/1018* (2013.01); *A45B 2200/1027* (2013.01); *F21Y 2115/10* (2016.08)

(56) References Cited

U.S. PATENT DOCUMENTS

| | | |
|---|---|---|
| 2,087,537 A | 7/1937 | Finkel |
| 2,485,118 A | 10/1949 | Simpson |
| 3,028,856 A | 4/1959 | Deall |
| 2,960,094 A | 11/1960 | Small |
| 3,917,942 A | 11/1975 | McCay |
| 4,107,521 A | 8/1978 | Winders |
| 4,174,532 A | 11/1979 | Kelley |
| 4,215,410 A | 7/1980 | Weslow et al. |
| 4,684,230 A | 8/1987 | Smith |
| 4,787,019 A | 11/1988 | Van den Broeke |
| 4,915,670 A | 4/1990 | Nesbit |
| 5,002,082 A | 3/1991 | Roder |
| 5,007,811 A | 4/1991 | Hopkins |
| 5,029,239 A | 7/1991 | Nesbit |
| 5,161,561 A | 11/1992 | Jamieson |
| 5,213,122 A | 5/1993 | Grady, II |
| 5,273,062 A | 12/1993 | Mozdzanowski |
| 5,275,364 A | 1/1994 | Burger et al. |
| 5,306,999 A * | 4/1994 | Hoffman ............ B60L 11/1818 320/109 |
| 5,318,055 A | 6/1994 | Olaniyan |
| 5,321,579 A | 6/1994 | Brown et al. |
| 5,349,975 A | 9/1994 | Valdner |
| 5,683,064 A | 11/1997 | Copeland |
| 5,979,793 A | 11/1999 | Louis |
| 5,996,511 A | 12/1999 | Swoger |
| 6,017,188 A | 1/2000 | Benton |
| 6,027,309 A | 2/2000 | Rawls |
| 6,058,951 A | 5/2000 | Wilson |
| 6,113,054 A | 9/2000 | Ma |
| 6,134,103 A | 10/2000 | Ghanma |
| 6,138,970 A | 10/2000 | Sohrt |
| 6,158,701 A | 12/2000 | Deshler |
| 6,199,570 B1 | 3/2001 | Patarra |
| 6,298,866 B1 | 10/2001 | Molnar, IV |
| 6,302,560 B1 | 10/2001 | Lai |
| 6,347,776 B1 | 2/2002 | Chuang |
| 6,374,840 B1 | 4/2002 | Ma |
| 6,397,869 B1 | 6/2002 | Jennings |
| 6,405,742 B1 | 6/2002 | Driscoll |
| 6,412,889 B1 | 7/2002 | Hummell et al. |
| 6,439,249 B1 | 8/2002 | Spatafora et al. |
| 6,446,650 B1 | 9/2002 | Ma |
| 6,453,621 B1 | 9/2002 | Bundy et al. |
| 6,488,254 B2 | 12/2002 | Li |
| 6,511,033 B2 | 1/2003 | Li |
| 6,519,144 B1 | 2/2003 | Henrie et al. |
| 6,536,721 B1 | 3/2003 | Kao |
| 6,554,012 B2 | 4/2003 | Paterra |
| 6,565,060 B2 | 5/2003 | Li |
| 6,575,183 B2 | 6/2003 | Tung |
| 6,585,219 B2 | 7/2003 | Li |
| 6,598,990 B2 | 7/2003 | Li |
| 6,612,713 B1 | 9/2003 | Kuelbs |
| 6,636,918 B1 | 10/2003 | Aguilar et al. |
| 6,637,717 B2 | 10/2003 | Li |
| 6,666,284 B2 | 12/2003 | Stirm |
| 6,692,135 B2 | 2/2004 | Li |
| 6,785,789 B1 | 8/2004 | Kekre et al. |
| 6,830,058 B2 | 11/2004 | Li |
| 6,837,255 B2 | 1/2005 | Bunch |
| 6,840,657 B2 | 1/2005 | Tung |
| 6,845,780 B2 | 1/2005 | Bishirjian |
| 6,966,667 B2 | 1/2005 | Li |
| 6,959,996 B2 | 7/2005 | Ip |
| 6,923,193 B2 | 8/2005 | Chen |
| 6,923,194 B2 | 8/2005 | Li |
| 6,941,958 B1 | 9/2005 | Sobek et al. |
| 6,945,263 B2 | 9/2005 | Li |
| 6,961,237 B2 | 11/2005 | Dickie |
| 7,003,217 B2 | 2/2006 | Bachinski et al. |
| 7,013,903 B2 | 3/2006 | Li |
| 7,017,598 B2 | 3/2006 | Nipke |
| D518,629 S | 4/2006 | Ma |
| 7,034,902 B2 | 4/2006 | Tajima |
| 7,108,388 B2 | 9/2006 | Li |
| 7,111,954 B1 | 9/2006 | Lai |
| 7,128,076 B2 | 10/2006 | Freedman |
| 7,051,744 B2 | 11/2006 | Hung |
| 7,134,442 B2 | 11/2006 | Ma |
| 7,134,762 B2 | 11/2006 | Ma |
| 7,143,501 B2 | 12/2006 | Bramson et al. |
| 7,163,042 B2 | 1/2007 | Li |
| 7,188,633 B2 | 3/2007 | Zerillo |
| D539,632 S | 4/2007 | Ma |
| D558,444 S | 1/2008 | Ma |
| 7,331,684 B2 | 2/2008 | Tung |
| 7,407,178 B2 | 8/2008 | Freedman |
| 7,412,985 B2 | 8/2008 | Ma |
| 7,422,343 B2 | 9/2008 | Li |
| 7,431,469 B2 | 10/2008 | Li |
| 7,481,547 B2 | 1/2009 | Li |
| 7,493,909 B2 | 2/2009 | Ma |
| 7,497,225 B1 | 3/2009 | Klein, Jr. et al. |
| 7,497,583 B2 | 3/2009 | Ma |
| 7,513,479 B2 | 4/2009 | Li |
| 7,533,680 B2 | 5/2009 | Ma |
| 7,559,520 B2 | 7/2009 | Quijano et al. |
| 7,562,667 B2 | 7/2009 | Li |
| 7,593,220 B2 | 9/2009 | Proctor et al. |
| 7,604,015 B2 | 10/2009 | Fraser |
| 7,628,164 B2 | 12/2009 | Ma et al. |
| 7,641,165 B2 | 1/2010 | Li |
| 7,650,230 B1 | 1/2010 | Laverick et al. |
| 7,703,464 B2 | 4/2010 | Ma |
| 7,708,022 B2 | 5/2010 | Ma |
| 7,726,326 B2 | 6/2010 | O'Donnell |
| 7,740,022 B2 | 6/2010 | Li |
| 7,755,970 B2 | 7/2010 | Welker et al. |
| 7,778,624 B2 | 8/2010 | Li |
| 7,784,761 B2 | 8/2010 | Ma |
| 7,798,161 B2 | 9/2010 | Ma |
| D626,324 S | 11/2010 | Ma |
| 7,856,996 B2 | 12/2010 | Ma |
| 7,861,734 B2 | 1/2011 | Ma |
| 7,891,367 B2 | 2/2011 | Ma |
| 7,891,633 B2 | 2/2011 | Li |
| 7,900,643 B2 | 3/2011 | Ma |
| 7,926,496 B2 | 4/2011 | Young et al. |
| 7,926,497 B2 | 4/2011 | Young et al. |
| 7,938,132 B2 | 5/2011 | Li |
| 7,963,293 B2 | 6/2011 | Ma |
| 7,963,295 B2 | 6/2011 | Li |
| 7,975,711 B2 | 7/2011 | Li |
| 8,015,988 B2 | 9/2011 | Li |
| 8,020,572 B2 | 9/2011 | Ma |
| 8,025,071 B2 | 9/2011 | Ma |
| 8,061,374 B2 | 11/2011 | Li |
| 8,061,375 B2 | 11/2011 | Ma |
| 8,066,021 B2 | 11/2011 | Ma |
| 8,069,868 B2 | 12/2011 | Kuelbs |
| 8,082,935 B2 | 12/2011 | Ma |

(56) References Cited

U.S. PATENT DOCUMENTS

| | | |
|---|---|---|
| 8,104,491 B2 | 1/2012 | Li |
| 8,116,497 B2 | 2/2012 | Li |
| 8,118,046 B2 | 2/2012 | Li |
| D660,137 S | 5/2012 | Ma |
| 8,118,045 B2 | 5/2012 | Li |
| 8,166,986 B2 | 5/2012 | Ma |
| 8,169,921 B2 | 5/2012 | Li |
| 8,205,656 B2 | 6/2012 | Ma |
| 8,251,078 B2 | 8/2012 | Ma |
| 8,267,104 B2 | 9/2012 | Li |
| 8,291,923 B2 | 10/2012 | Young et al. |
| 8,297,294 B2 | 10/2012 | Li |
| 8,331,598 B2 | 12/2012 | Li |
| 8,345,889 B2 | 1/2013 | Li |
| 8,356,613 B2 | 1/2013 | Ma |
| 8,360,079 B2 | 1/2013 | Li |
| 8,387,641 B1 | 3/2013 | Ilan |
| 8,393,341 B2 | 3/2013 | Li |
| 8,413,671 B2 | 4/2013 | Ma |
| 8,444,104 B2 | 5/2013 | Li |
| 8,453,659 B2 | 6/2013 | Li |
| 8,522,806 B2 | 9/2013 | Li |
| 8,534,304 B1 * | 9/2013 | Tung .......... A45B 17/00 135/16 |
| 8,555,905 B2 | 10/2013 | Ma |
| 8,555,906 B2 | 10/2013 | Ma |
| 8,616,226 B2 | 12/2013 | Ma et al. |
| D697,705 S | 1/2014 | Ma |
| 8,632,045 B2 | 1/2014 | Ma |
| 8,636,020 B2 | 1/2014 | Li |
| 8,657,246 B2 | 2/2014 | Ma |
| 8,672,287 B2 | 3/2014 | Li |
| 8,727,555 B2 | 5/2014 | Kuelbs |
| 8,740,170 B2 | 6/2014 | Li |
| 8,919,722 B2 | 6/2014 | Ma |
| 8,763,620 B1 * | 7/2014 | Tung .......... A45B 25/14 135/20.1 |
| 8,794,781 B2 | 8/2014 | Kuelbs |
| 8,851,093 B2 | 10/2014 | Li |
| D719,342 S | 12/2014 | Ma |
| D719,343 S | 12/2014 | Ma |
| 8,910,646 B2 | 12/2014 | Li |
| 8,919,361 B2 | 12/2014 | Ma |
| 8,960,625 B2 | 2/2015 | Ma |
| D724,309 S | 3/2015 | Ma |
| 9,030,829 B2 | 5/2015 | Ma |
| D731,166 S | 6/2015 | Ma |
| 9,078,497 B2 | 7/2015 | Ma |
| 9,113,683 B2 | 8/2015 | Ma |
| D738,609 S | 9/2015 | Ma |
| D738,610 S | 9/2015 | Ma |
| 9,125,462 B2 | 9/2015 | Akin |
| 9,192,215 B2 | 11/2015 | Ma |
| 9,220,325 B2 | 12/2015 | Ma |
| 9,222,693 B2 | 12/2015 | Gourlay et al. |
| 9,237,785 B2 | 1/2016 | Ma |
| 9,241,549 B2 | 1/2016 | Ma |
| 9,289,039 B2 | 3/2016 | Akin et al. |
| 9,345,295 B2 | 5/2016 | Li |
| 9,510,653 B2 | 12/2016 | Akin |
| 2001/0001083 A1 | 5/2001 | Helot |
| 2002/0074027 A1 | 6/2002 | Maidment |
| 2002/0078985 A1 | 6/2002 | Farr |
| 2002/0144721 A1 | 10/2002 | Kronin et al. |
| 2002/0185582 A1 | 12/2002 | Li |
| 2003/0000557 A1 | 1/2003 | Lai |
| 2003/0000559 A1 | 1/2003 | Wu |
| 2003/0192579 A1 | 10/2003 | Llama Garijo |
| 2004/0055627 A1 | 3/2004 | Moga |
| 2004/0103934 A1 | 6/2004 | Szumlic |
| 2004/0154653 A1 | 8/2004 | Brutsaert |
| 2004/0228118 A1 | 11/2004 | Peterson |
| 2004/0240167 A1 | 12/2004 | Ledbetter et al. |
| 2004/0261827 A1 | 12/2004 | Chen |
| 2005/0016571 A1 | 1/2005 | Wu |
| 2005/0072451 A1 | 4/2005 | Vivian et al. |
| 2005/0161067 A1 | 7/2005 | Hollins |
| 2005/0279396 A1 | 12/2005 | Choi |
| 2006/0016465 A1 | 1/2006 | Johannes van Loosbroek et al. |
| 2006/0016955 A1 | 1/2006 | Kao |
| 2006/0124122 A1 | 6/2006 | Young et al. |
| 2006/0127034 A1 | 6/2006 | Brooking et al. |
| 2006/0196532 A1 | 9/2006 | Tung |
| 2006/0271314 A1 * | 11/2006 | Hayes ............ G01D 4/002 702/62 |
| 2007/0070588 A1 | 3/2007 | Lin |
| 2007/0126208 A1 | 6/2007 | Freedman |
| 2007/0127231 A1 | 6/2007 | Li |
| 2007/0151588 A1 | 7/2007 | Yul et al. |
| 2007/0211450 A1 | 9/2007 | You |
| 2007/0242450 A1 | 10/2007 | Blatecky |
| 2007/0279856 A1 | 12/2007 | Bragg |
| 2007/0283987 A1 | 12/2007 | Reyes et al. |
| 2008/0056898 A1 | 3/2008 | Li |
| 2008/0062128 A1 | 3/2008 | Brodersen et al. |
| 2008/0076379 A1 | 3/2008 | Li |
| 2008/0092440 A1 | 4/2008 | Johnson |
| 2008/0092936 A1 | 4/2008 | Carabillo |
| 2008/0262657 A1 | 10/2008 | Howell et al. |
| 2009/0056775 A1 | 3/2009 | Keulbs |
| 2009/0058354 A1 | 3/2009 | Harrison |
| 2009/0071516 A1 | 3/2009 | Li |
| 2009/0193578 A1 | 8/2009 | Jang et al. |
| 2009/0196020 A1 | 8/2009 | Tsai |
| 2009/0250982 A1 | 10/2009 | Cohen |
| 2009/0277486 A1 | 12/2009 | Stepaniuk et al. |
| 2009/0320827 A1 | 12/2009 | Thompson et al. |
| 2010/0012164 A1 | 1/2010 | Stoelinga |
| 2010/0097441 A1 | 4/2010 | Trachtenberg et al. |
| 2010/0132751 A1 | 6/2010 | Li |
| 2010/0245503 A1 | 9/2010 | Li |
| 2010/0320819 A1 | 12/2010 | Cohen et al. |
| 2011/0088734 A1 | 4/2011 | Garcia |
| 2011/0157801 A1 | 6/2011 | Satterfield |
| 2012/0029704 A1 | 2/2012 | Ackermann |
| 2013/0048829 A1 | 2/2013 | Herniak |
| 2013/0306628 A1 | 11/2013 | Volin |
| 2014/0041555 A1 | 2/2014 | Ramberg |
| 2015/0116485 A1 | 4/2015 | Subramanian |
| 2015/0136944 A1 | 5/2015 | Segev |
| 2015/0216273 A1 | 8/2015 | Akin |
| 2015/0216274 A1 | 8/2015 | Akin |
| 2015/0237975 A1 | 8/2015 | Ng |
| 2015/0245691 A1 | 9/2015 | Fitgerald |
| 2015/0374083 A1 | 12/2015 | Akin |
| 2016/0095398 A1 | 4/2016 | Li |
| 2016/0119699 A1 | 4/2016 | Caban |
| 2016/0184993 A1 | 6/2016 | Brandwijk |
| 2016/0198818 A1 | 7/2016 | Akin |
| 2016/0326765 A1 | 11/2016 | Barbret |
| 2016/0338457 A1 | 11/2016 | Gharabegian |
| 2017/0055653 A1 | 3/2017 | Gharabegian |
| 2017/0071300 A1 | 3/2017 | Gharabegian |
| 2017/0086545 A1 | 3/2017 | Gharabegian |
| 2017/0086546 A1 | 3/2017 | Gharabegian |
| 2017/0105497 A1 | 4/2017 | Gharabegian |

FOREIGN PATENT DOCUMENTS

| | | |
|---|---|---|
| CN | 103405009 | 11/2013 |
| CN | 104835334 | 8/2015 |
| CN | 105193034 | 12/2015 |
| CN | 205089186 | 3/2016 |
| CN | 201580588 | 4/2016 |
| EP | 2479375 | 7/2012 |
| ES | EP 1731055 | 12/2006 |
| FR | 2977457 A1 | 1/2013 |
| GR | 20060100244 | 11/2007 |
| RU | 12174 | 12/1999 |
| RU | 2251066 | 4/2005 |
| RU | 47414 | 8/2005 |
| RU | 55549 | 8/2006 |
| WO | WO 03 073884 | 9/2003 |
| WO | WO 2004103113 | 12/2004 |

(56) References Cited

FOREIGN PATENT DOCUMENTS

| WO | WO 2005092140 | 10/2005 |
|----|---------------|---------|
| WO | WO 2006059334 | 6/2006 |
| WO | WO 2008102403 | 8/2008 |
| WO | WO 2009124384 | 10/2009 |
| WO | WO 2010/098735 | 9/2010 |
| WO | WO 2011140557 | 11/2011 |

OTHER PUBLICATIONS

GPS Sun Tracking Solar Panel; Alyammahi et al., published May 7, 2015, accessed Jun. 21, 2017 from https:repository.lib.fit.edu/handle/11141/628?show=full.

International Search Report and Written Opinion of International Searching Authority, International Application No. PCT/US2017/045059, dated Jan. 25, 2018.

Interntional Search Report and Written Opinion of International Searching Authority, International Application No. PCT/US2017/043789, dated Nov. 23, 2017.

International Search Report and Written Opinion of International Searching Authority Application No. PCT/US2017/052595, dated Feb. 21, 2018.

Written Opinion and International Search Report for PCT International Application No. PCT/US2018/028281, Federal Institute of Industrial Property, International Filing Date Apr. 19, 2018, dated Sep. 13, 2018.

Written Opinion and International Search Report for PCT International Application No. PCT/US2018/030169, Federal Institute of Industrial Property, International Filing Date Apr. 30, 2018, dated Aug. 9, 2018.

\* cited by examiner

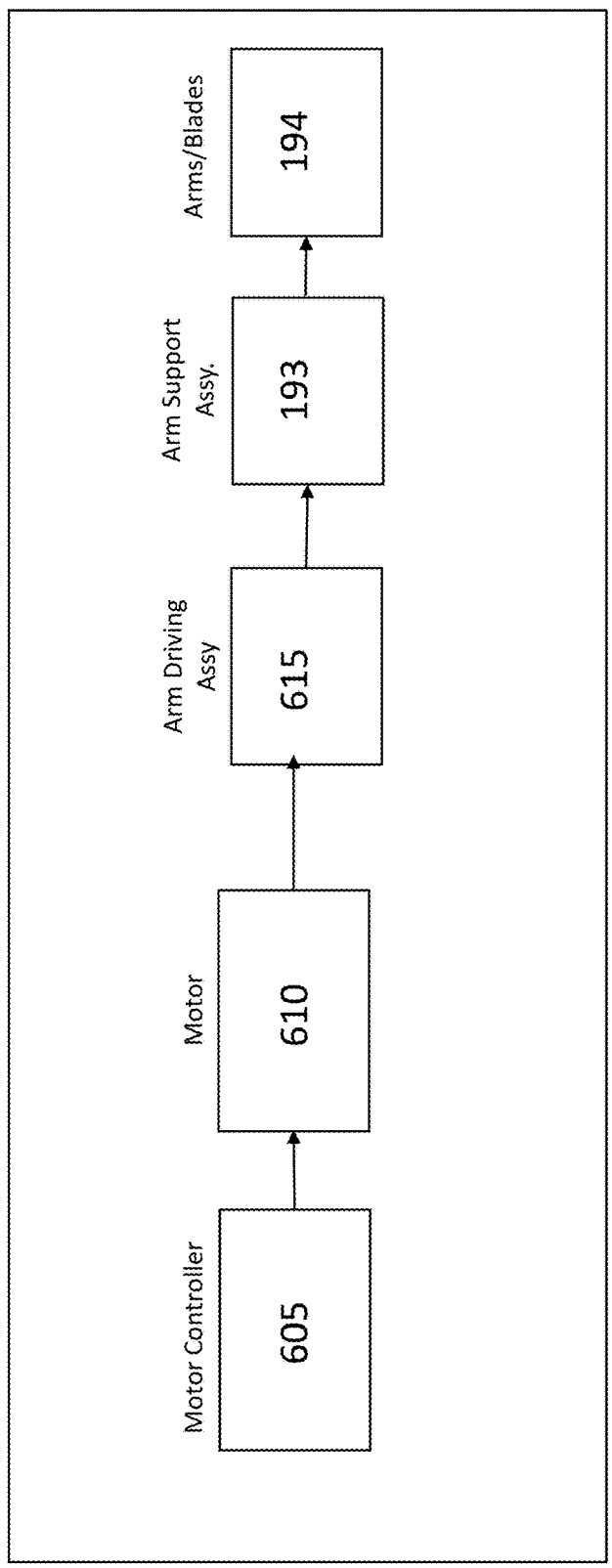

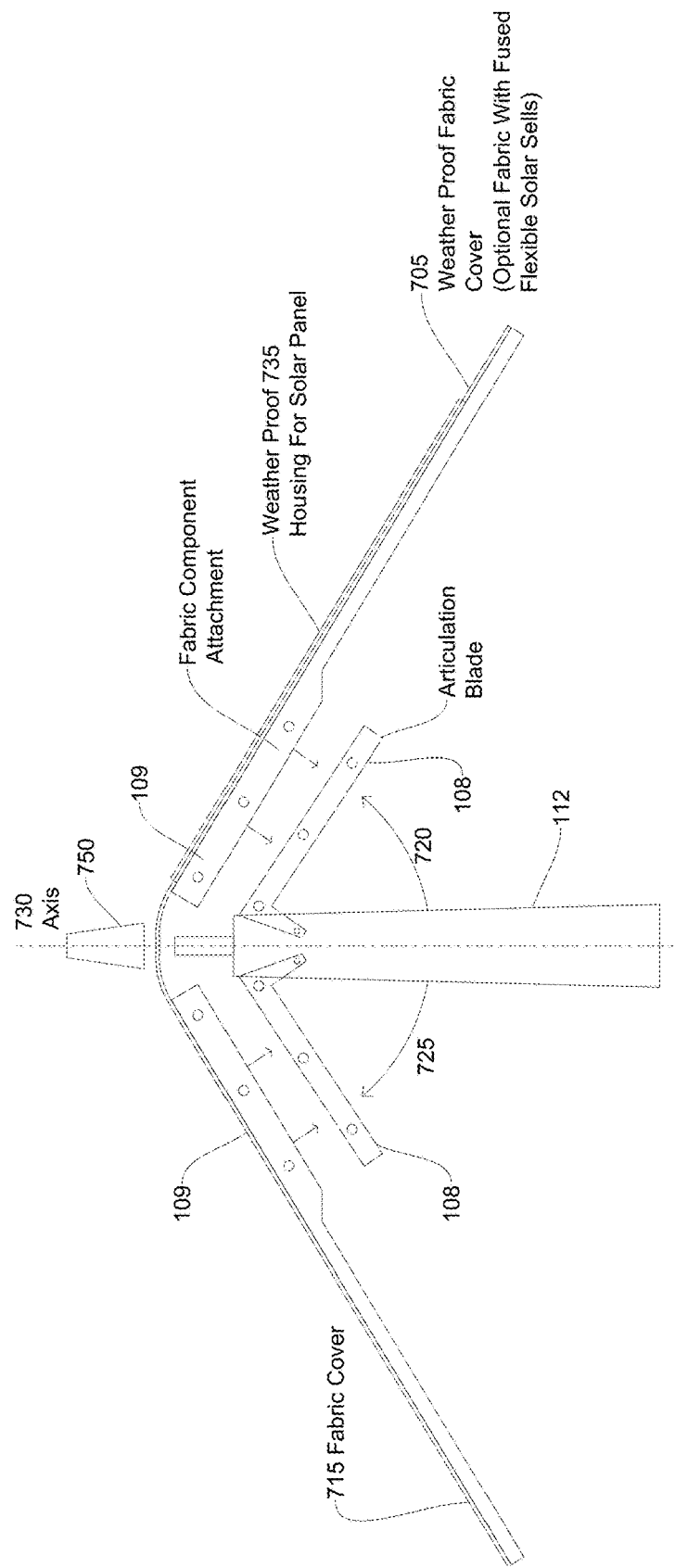

Fig. 8A

| Hardware | | | Function |
|---|---|---|---|
| 805 | Telemetry Board With Slave Processor | GPS/GNSS — 806<br>Digital Compass — 807 | Provide Location and Orientation Information |
| 810 | Weather Variables Board With Slave Processor | Air Quality Sensor — 811<br>UV Radiation Sensor — 812<br>Digital Barometer — 813<br>Temperature — 814<br>Humidity — 816<br>Wind Speed — 817 | Sense Weather Variables Surrounding the Shade.<br><br>Detect High Winds and Close Shade's Arms |
| 815 | Voice Recognition Board With Slave Processor | | Enable Control Via Voice Commands,<br>Provide Audible Warnings |
| 820 | Rechargable Battery | | Store Electricity Collected Through Solar Panel/AC Charger<br>Provide Electricity for All Shade Components |
| 825 | Solar Panel | | Generate Electricity To Charge the Battery |
| 830 | Power Tracking Solar Charger | | Regulate and Balance the Charging Process<br>Provide Data Regarding Charging State |
| 835 | AC Adapter Input | | Charge the Battery/Run System in Absence of Sun |
| 840 | Proximity Sensor | | Identify the Location of A Person Relative to Moving Components |
| 845 | Motion Sensor | | Detect Presence of Person Around Shade |

Fig. 8B

| | Hardware | Function |
|---|---|---|
| 850 | Code Based Obstacle Detector | Detect Presence of Person/Object Within Shade's Path of Travel |
| 855 | Tilt Sensor | Detect movement/relocation of Shade and Reorient to Correct Position |
| 860 | Linux Based Computer With Integrated Wifi And 5xIP Cameras | Collect Video Feed along with Sensor data Communicate Through Wifi. |
| 865 | Bluetooth | Provides Short Distance Communication for App Based Control, Audio Transmission, and Data Retrieval. |
| 870 | LED Lighting | Provides Light During Night Operation |
| 875 | Class D Stereo Amplifier With Speakers | Provides Audio Playback Through Mobile App or Wifi Stream |
| 880 | Azimuth Servo Motor With Controller | Rotates Shade to Predetermined Azimuth Angle |
| 885 | Elevation Servo Motor With Controller | Rotates Shade to Predetermined Elevation Angle |
| 890 | Actuator Servo Motor With Controller | Extend/Retract Shade Blades |
| 895 | Motion Control PCB | |
| 857 | Digital Cameras | |
| 866 | Wind Turbine | |
| 877 | USB Device | |

870 – Lighting Assembly /First Lighting Assembly 199/ Lighting Subassembly 198

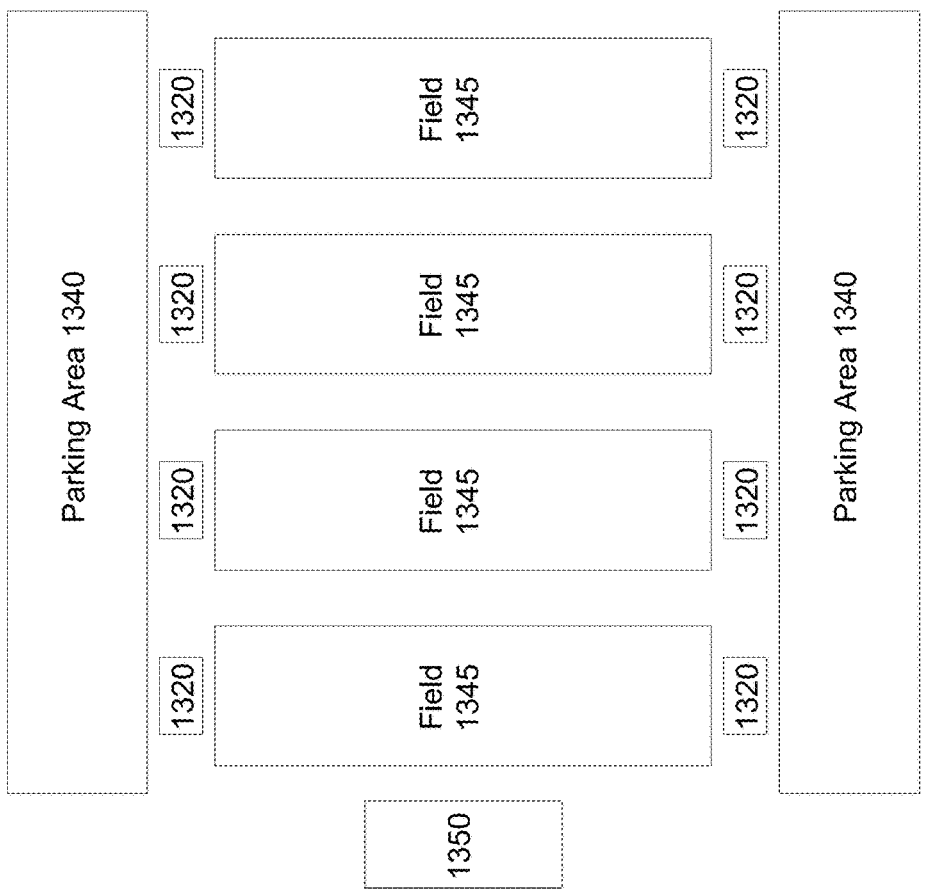

INTELLIGENT SHADING CHARGING SYSTEMS

RELATED APPLICATIONS

This application is a continuation-in-part of application of U.S. non-provisional patent application Ser. No. 15/160,856, filed May 20, 2016, entitled "Automated Intelligent Shading Objects and Computer-Readable Instructions for Interfacing With, Communicating With and Controlling a Shading Object," and is also a continuation-in-part of application of U.S. non-provisional patent application Ser. No. 15/160,822, filed May 20, 2016, entitled "Intelligent Shading Objects with Integrated Computing Device," both of which claim the benefit of U.S. provisional Patent Application Ser. No. 62/333,822, entitled "Automated Intelligent Shading Objects and Computer-Readable Instructions for Interfacing With, Communicating With and Controlling a Shading Object," filed May 9, 2016, all of which are hereby incorporated by reference.

BACKGROUND

1. Field

The subject matter disclosed herein relates to an apparatus, methods and systems for providing vehicle charging utilizing an intelligent shading system and more specifically to an automated intelligent shading charging system.

2. Background of the Invention

Conventional sun shading devices usually are comprised of a supporting frame and an awning or fabric mounted on the supporting frame to cover a predefined area. For example, a conventional sun shading device may be an outdoor umbrella or an outdoor awning.

However, current sun shading devices do not appear to be flexible, modifiable or able to adapt to changing environmental conditions, or user's desires. Many of the current sun shading devices appear to require manual operation in order to change inclination angle of the frame to more fully protect an individual from the environment. Further, the current sun shading devices appear to have one (or a single) awning or fabric piece that is mounted to an interconnected unitary frame. An interconnected unitary frame may not be able to be opened or deployed in many situations. Accordingly, alternative embodiments may be desired. Further, current sun shading devices may not have automated assemblies to allow a shading object to track movement of a sun and/or adjust to other environmental conditions. In addition, current sun shading devices do not communicate with external shading object related systems. Further, individuals utilizing current sun shading devices are limited in interactions with users. In addition, outdoor locations having parking are exposed to the sun and have to deal with an ever increasing fleet of electric vehicles. Accordingly, a need exists for a system to provide shade, utilize solar power, and recharge a battery of an electric vehicle.

BRIEF DESCRIPTION OF DRAWINGS

Non-limiting and non-exhaustive aspects are described with reference to the following figures, wherein like reference numerals refer to like parts throughout the various figures unless otherwise specified.

FIG. 5B illustrates a block diagram of an actuator or deployment motor in an intelligent shading charging system according to embodiments;

FIG. 7 illustrates assemblies to deploy arms and/or blades according to embodiments;

FIGS. 8A and 8B illustrate a block diagram of a movement control PCB according to embodiments;

FIGS. 13A and 13B illustrates placements of intelligent shading charging systems according to embodiments.

DETAILED DESCRIPTION

Figure 1A:
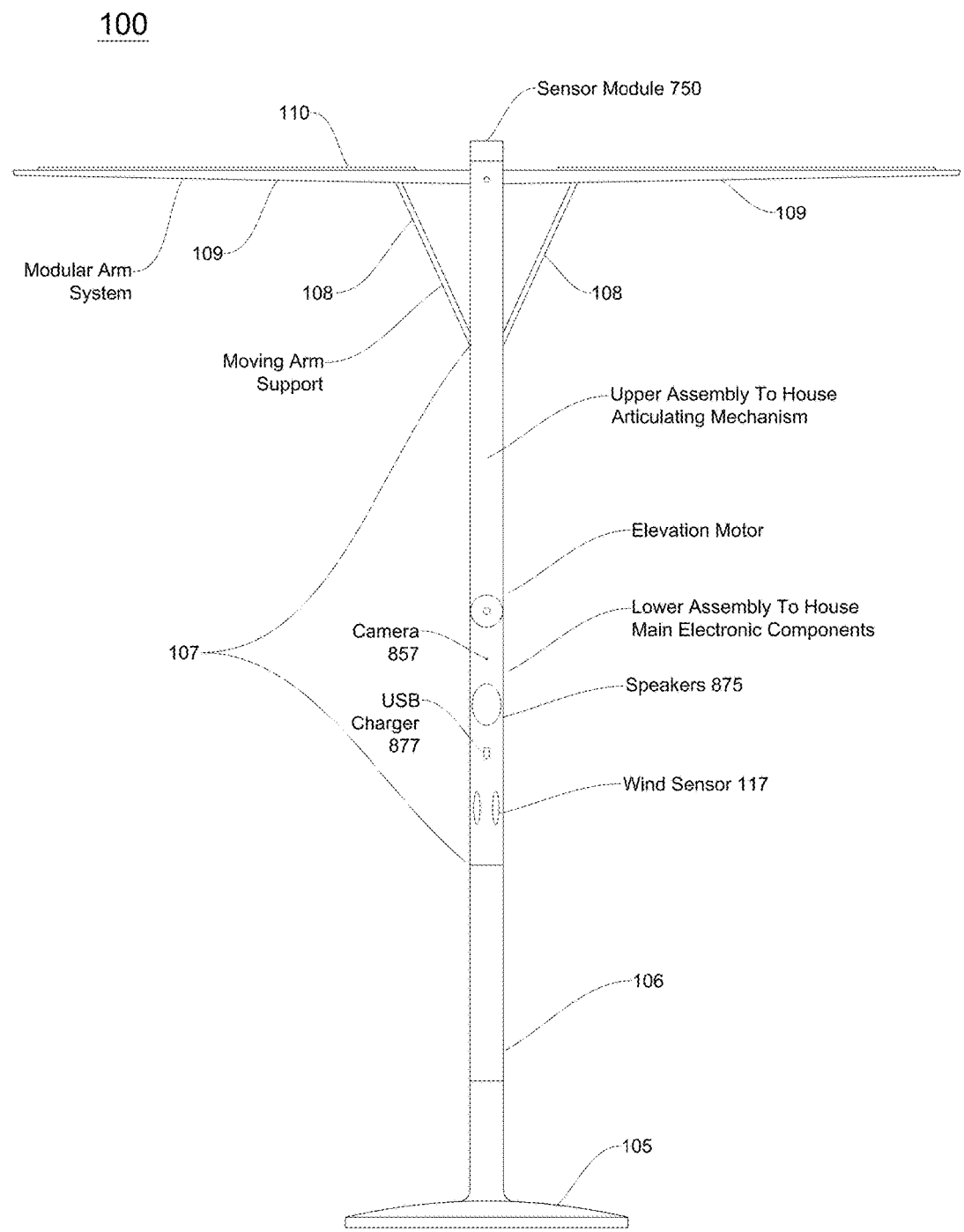
FIGS. 1A and 1B illustrates a shading object or shading object device according to embodiments.

In the following detailed description, numerous specific details are set forth to provide a thorough understanding of claimed subject matter. For purposes of explanation, specific numbers, systems and/or configurations are set forth, for example. However, it should be apparent to one skilled in the relevant art having benefit of this disclosure that claimed subject matter may be practiced without specific details. In other instances, well-known features may be omitted and/or simplified so as not to obscure claimed subject matter. While certain features have been illustrated and/or described herein, many modifications, substitutions, changes and/or equivalents may occur to those skilled in the art. It is, therefore, to be understood that appended claims are intended to cover any and all modifications and/or changes as fall within claimed subject matter.

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

With advances in technology, it has become more typical to employ distributed computing approaches in which portions of a problem, such as signal processing of signal samples, for example, may be allocated among computing devices, including one or more clients and/or one or more servers, via a computing and/or communications network, for example. A network may comprise two or more network devices and/or may couple network devices so that signal communications, such as in the form of signal packets and/or frames (e.g., comprising one or more signal samples), for example, may be exchanged, such as between a server and a client device and/or other types of devices, including between wireless devices coupled via a wireless network, for example.

A network may comprise two or more network and/or computing devices and/or may couple network and/or computing devices so that signal communications, such as in the form of signal packets, for example, may be exchanged, such as between a server and a client device and/or other types of devices, including between wireless devices coupled via a wireless network, for example.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals (e.g., signal samples), such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. As mentioned, signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases, database servers, and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device or a network device, and, instead, may be embodied as a variety of devices or combinations thereof, including, for example, one or more illustrative examples.

Operations and/or processing, such as in association with networks, such as computing and/or communications networks, for example, may involve physical manipulations of physical quantities. Typically, although not necessarily, these quantities may take the form of electrical and/or magnetic signals capable of, for example, being stored, transferred, combined, processed, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and/or similar terms are to be associated with appropriate physical quantities and are intended to merely be convenient labels.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context. In a context of this application, if signals, instructions, and/or commands are transmitted from one component (e.g., a controller or processor) to another component (or assembly), it is understood that signals, instructions, and/or commands may be transmitted directly to a component, or may pass through a number of other components on a way to a destination component. For example, a signal transmitted from a motor controller or processor to a motor (or other driving assembly) may pass through glue logic, an amplifier, and/or an interface. Similarly, a signal communicated through a misting system may pass through an air conditioning and/or a heating module, and a signal communicated from any one or a number of sensors to a controller and/or processor may pass through a conditioning module, an analog-to-digital controller, and/or a comparison module.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

A network may also include now known, and/or to be later developed arrangements, derivatives, and/or improvements, including, for example, past, present and/or future mass storage, such as network attached storage (NAS), cloud storage, a storage area network (SAN), and/or other forms of computing and/or device readable media, for example. A network may include a portion of the Internet, one or more local area networks (LANs), one or more wide area networks (WANs), wire-line type connections, one or more personal area networks (PANs), wireless type connections, other connections, or any combination thereof. Thus, a network may be worldwide in scope and/or extent.

The Internet and/or a global communications network may refer to a decentralized global network of interoperable networks that comply with the Internet Protocol (IP). It is noted that there are several versions of the Internet Protocol. Here, the term Internet Protocol, IP, and/or similar terms, is intended to refer to any version, now known and/or later developed of the Internet Protocol. The Internet may include local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices and/or computing devices may engage in an HTTP session through an exchange of appropriately compatible and/or compliant signal packets and/or frames. Here, the term Hypertext Transfer Protocol, HTTP, and/or similar terms is intended to refer to any version, now known and/or later developed. It is likewise noted that in various places in this document substitution of the term Internet with the term World Wide Web ('Web') may be made without a significant departure in meaning and may, therefore, not be inappropriate in that the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility that may be accessible to tens of millions of people or more worldwide. A content delivery server and/or the Internet and/or the Web, therefore, in this context, may comprise an service that organizes stored content, such as, for example, text, images, video, etc., through the use of hypermedia, for example. A HyperText Markup Language ("HTML"), for example, may be utilized to specify content and/or to specify a format for hypermedia type content, such as in the form of a file and/or an "electronic document," such as a Web page, for example. An Extensible Markup Language ("XML") may also be utilized to specify content and/or format of hypermedia type content, such as in the form of a file or an "electronic document," such as a Web page, in an embodiment. HTML and/or XML are merely example languages provided as illustrations and intended to refer to any version, now known and/or developed at another time. Likewise, claimed subject matter is not intended to be limited to examples provided as illustrations, of course.

Also as used herein, one or more parameters may be descriptive of a collection of signal samples, such as one or more electronic documents, and exist in the form of physical signals and/or physical states, such as memory states. For example, one or more parameters, such as referring to an electronic document comprising an image, may include parameters, such as time of day at which an image was captured, latitude and longitude of an image capture device, such as a camera, for example, etc. Claimed subject matter is intended to embrace meaningful, descriptive parameters in any format, so long as the one or more parameters comprise physical signals and/or states, which may include, as parameter examples, name of the collection of signals and/or states.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In embodiments, a shading object may comprise a shading object computing device installed within or as part of a shading object. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like, and that these are conventional labels. Unless specifically stated otherwise, it is appreciated that throughout this specification discussions utilizing terms such as "processing," "computing," "calculating," "determining" or the like may refer to actions or processes of a specific apparatus, such as a special purpose computer or a similar special purpose electronic computing device (e.g., such as a shading object computing device). In the context of this specification, therefore, a special purpose computer or a similar special purpose electronic computing device (e.g., a shading object computing device) is capable of manipulating or transforming signals (electronic and/or magnetic) in memories (or components thereof), other storage devices, transmission devices sound reproduction devices, and/or display devices.

In an embodiment, a controller and/or a processor typically performs a series of instructions resulting in data manipulation. In an embodiment, a microcontroller or microprocessor may be a compact microcomputer designed to govern the operation of embedded systems in electronic devices, e.g., an intelligent, automated shading object, and various other electronic and mechanical devices. Microcontrollers may include processors, microprocessors, and other electronic components. Controller may be a commercially available processor such as an Intel Pentium, Motorola PowerPC, SGI MIPS, Sun UltraSPARC, or Hewlett-Packard PA-RISC processor, but may be any type of application-specific and/or specifically designed processor or controller. In an embodiment, a processor and/or controller may be connected to other system elements, including one or more memory devices, by a bus. Usually, a processor or controller, may execute an operating system which may be, for example, a Windows-based operating system (Microsoft), a MAC OS System X operating system (Apple Computer), one of many Linux-based operating system distributions (e.g., an open source operating system) a Solaris operating system (Sun), a portable electronic device operating system (e.g., mobile phone operating systems), and/or a UNIX operating systems. Embodiments are not limited to any particular implementation and/or operating system.

The specification may refer to an automated intelligent shading charging system as an apparatus and/or device that provides charges electric vehicles and/or provides shade to an electric vehicle, an area, or an individual located near the shading charging system and/or protects user from weather elements such as sun, wind, rain, and/or hail. In embodiments, an intelligent shading charging system may incorporate one or more transceivers so that electric vehicles and/or electric vehicle operators can utilize the intelligent shading charging system transceiver to communicate wirelessly with an electric vehicle, other electric vehicles, other users within an outdoor area, and/or external computing devices.

The automated intelligent shading charging system may also be referred to as a parasol, umbrella, sun shade, outdoor shade furniture, sun screen, sun shelter, awning, sun cover, sun marquee, brolly and other similar names, charger, electric vehicle charging system, electric vehicle charger, electric vehicle supply equipment, a shading charger and/or other similar names. These terms may all be utilized interchangeably in this application. Automated intelligent shading charging systems described herein comprises many novel and non-obvious features.

Current electric vehicle charging systems do not include shading systems. Accordingly many prior art electric vehicle charging systems may not be located outside because direct sunlight onto a charging system may cause the charging system to overheat and/or malfunction. In many locations, sunlight directly hits and/or shines on a charging system for a large amount of hours every day. In such embodiments, additional cooling components may need to be incorporated into a charging station such as one or more fans, water-based cooling systems, and/or gas-based cooling systems.

Charging stations may be needed in many outdoor environments such as building plazas, parking lots, athletic field complexes, outdoor event locations, and/or parks. Normal charging stations require shade and may not be placed in such environments due to overheating and/or erosion concerns. In addition, electric vehicle users and/or operators may not have shade protection and/or weather element protection.

An electric vehicle charging station may also be referred to as a EV charging station, an electric recharging point, a charging point, a charge point and an Electric Vehicle Supply Equipment (EVSE). In embodiments, an electric vehicle charging station is an element in a power infrastructure that supplies electric energy for recharging of electric vehicles. In embodiments, electric vehicles may be plugin electric vehicles, such as, but not limited to, electric cars, neighborhood electric vehicles and/or plugin hybrids. As plugin hybrid electric vehicles and battery electric vehicle ownership is expanding, there is a growing need for widely distributed publicly accessible charging stations, some of which support faster charging at higher voltages and currents than are available from residential EVSEs. Many charging stations are on street facilities provided by electric utility companies or located at retail shopping centers and operated by many private companies. These charging stations provide one or a range of heavy duty or special connectors that conform to the variety of electric charging connector standards. Charging stations are usually connected to the electrical grid, which often means that their electricity originates from fossil fuel power stations or nuclear power plants. Many existing outdoor facilities, such as building plazas, sports fields, event fields and/or parking lots may not have access to charging stations and/or systems which may provide shade to users and/or operators.

In embodiments, as illustrated in FIG. 1, an intelligent shading object or umbrella may comprise a base assembly 105, a stem assembly 106, a central support assembly 107 (including a lower assembly, a hinge assembly and/or gearbox, and/or an upper assembly), arm support assemblies 108, arms/blades 109, and/or a shading fabric 715 (see FIG. 7). In embodiments, a stem assembly 106 (and a coupled central support assembly, arm support assemblies, and/or blades) may rotate within a base assembly 105 around a vertical axis. In embodiments, an upper assembly of a center support assembly 107 may rotate up to a right angle with respect to a lower assembly of the center support assembly 107 via a gearbox or hinging mechanism, and a second motor. In embodiments, arm support assemblies 109 may deploy and/or extend from a center support assembly 107 to open a shading object. In embodiments, detachable arms/blades 109 may be attached or coupled to arm support assemblies 108. In embodiments, a detachable shading fabric 715 may be attached or coupled to arms/blades 109.

Figure 1B:
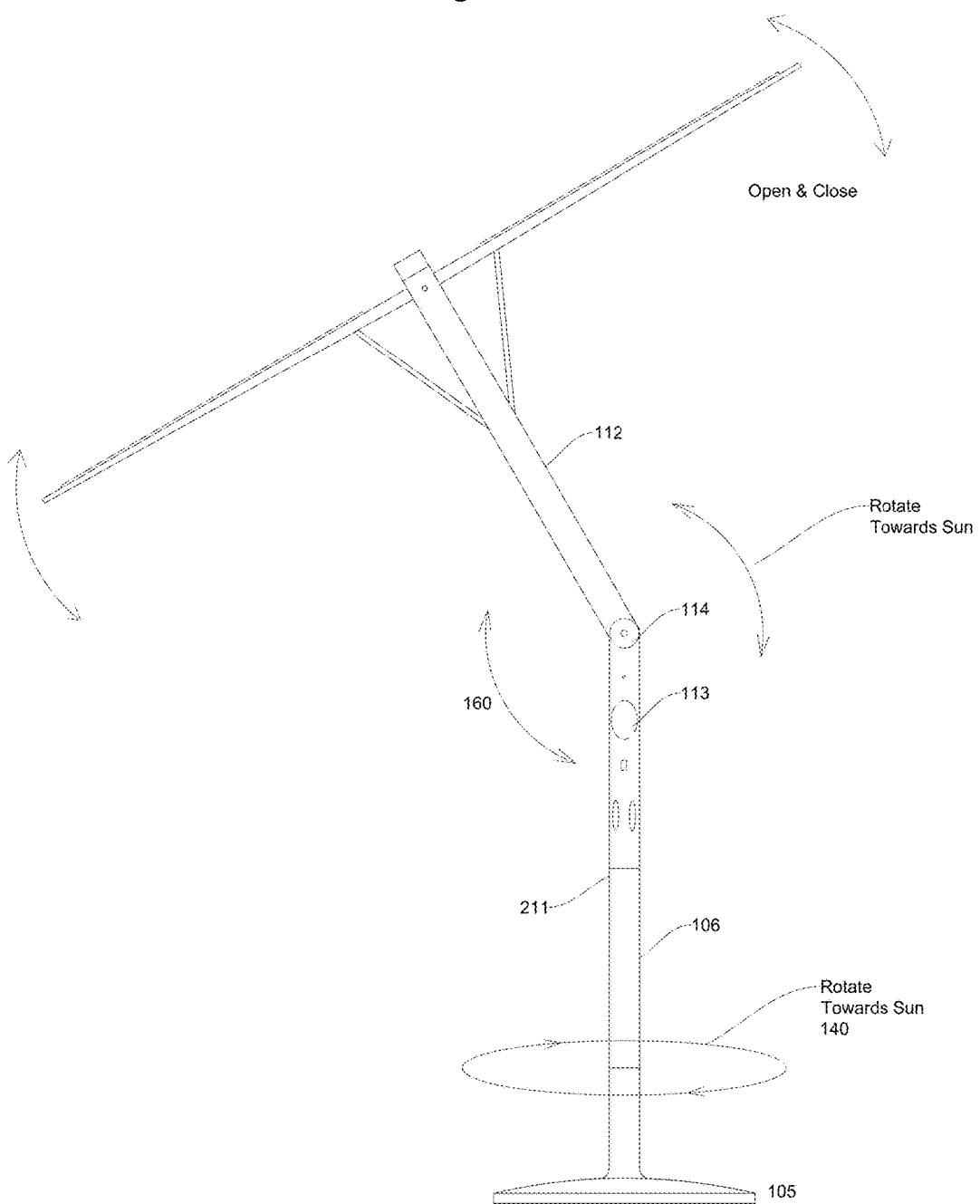

FIGS. 1A and 1B illustrates a shading object or shading object device according to embodiments. In embodiments, a shading object 100 may comprise a base assembly 105, a stem assembly 106, a center support assembly 107, one or more supporting arm assemblies 108, one or more arms/blades 109, solar panels and or a shading fabric 715. In embodiments, a stem assembly 106, a center support assembly 107, one or more supporting arm assemblies 108, and/or one or more arms/blades 109 may be referred to as an umbrella support assembly, a shading system body and/or shading subsystem. In embodiments, a central support assembly 107 may comprise an upper assembly 112, a lower assembly 113 and a hinging assembly and/or a gearbox 114, where the hinging assembly and/or gearbox assembly 114 may connect and/or couple the upper assembly 112 to the lower assembly 113. In embodiments, a base assembly 105 may rest on a ground surface in an outdoor environment. A ground surface may be a floor, a patio, grass, sand, or other outdoor environments surfaces. In embodiments, a stem assembly 106 may be placed, connected, coupled and/or inserted into a top portion of a base assembly 105.

Figure 1C:
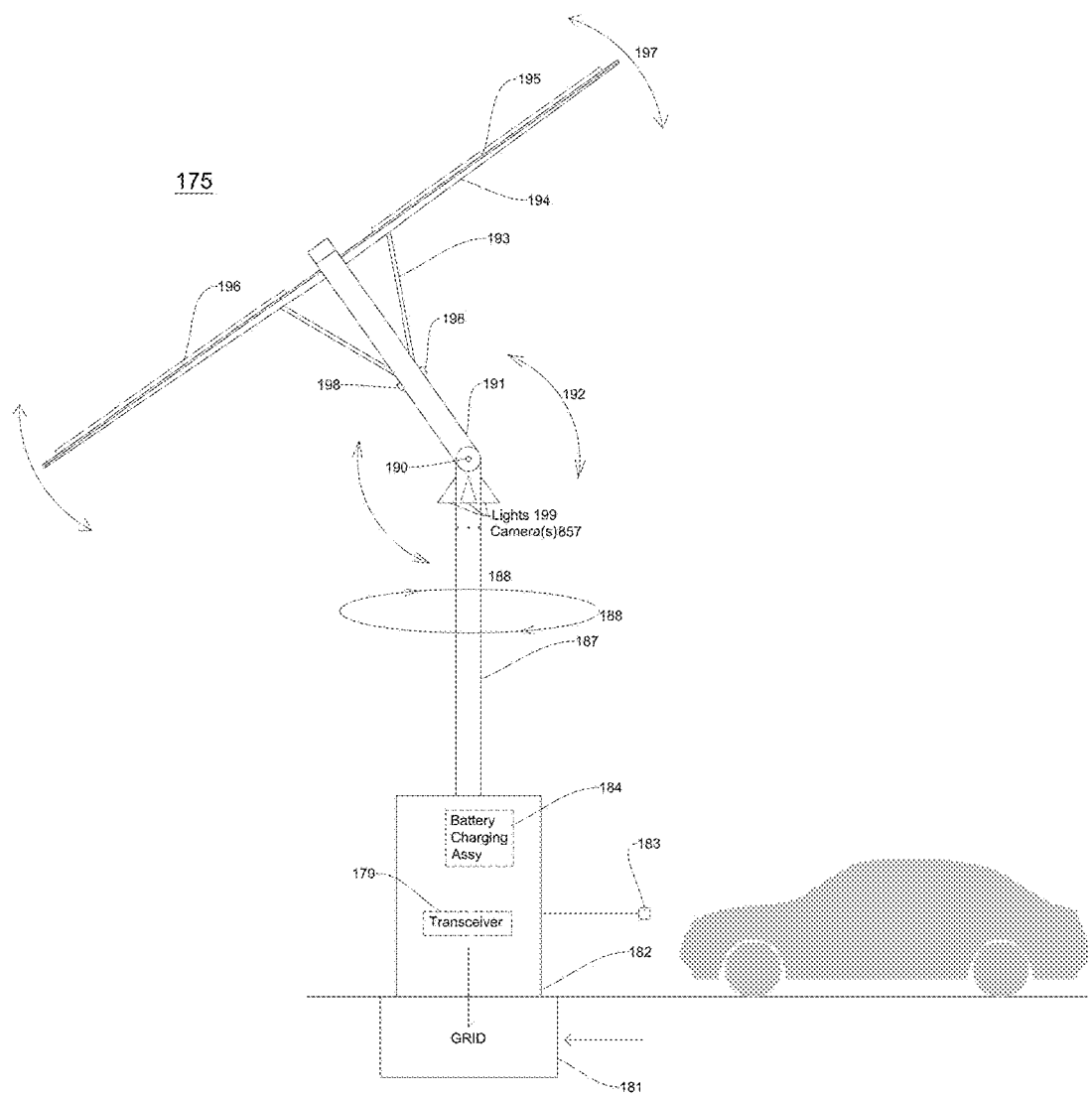
FIGS. 1C and 1D illustrate intelligent shading charging systems according to embodiments.

FIG. 1C illustrates an intelligent shading charging system according to embodiments. In embodiments, an intelligent shading charging system provides shade to a surrounding area, converts solar energy to solar power, and charges a rechargeable battery in an electric vehicle. In embodiments, an intelligent shading charging system 175 comprises a rechargeable battery connection interface (not shown), a housing and/or enclosure 182 including a rechargeable battery 184 and/or a transceiver 179, a lower support assembly 187, a hinging assembly or mechanism 190, and an upper support assembly 191. In embodiments, an intelligent shading charging system 175 further comprises a base assembly (not shown). In embodiments, an intelligent shading charging system 175 may comprise one or more arm support assemblies 193, one or more arms and/or blades 194 and a shading fabric 195. In embodiments, a shading fabric 195, arms 194, and/or arm support assemblies 193 may have one or more solar cells and/or arrays 196 attached thereto, integrated therein, and/or placed thereon. In embodiments, many movements of an intelligent shading charging system may be automated. In embodiments, an intelligent shading charging system 175 may be connected and/or coupled to a power delivery system (e.g., a power grid or a power mains) 181.

In embodiments, an automated intelligent shading charging assembly or system may comprise an interface assembly, a rechargeable apparatus (e.g., a rechargeable battery, a base assembly (not shown), a charging port and/or interface 183 for an electric vehicle, a lower support assembly 187, an upper support assembly 191, a hinging assembly and/or gearbox assembly 190, one or more arm support assemblies 193, one or more arms/blades 194, and/or a shading fabric 195. In embodiments, a lower support assembly 187 (and a coupled and/or connected hinging assembly 190, upper support assembly 193, one or more arm support assemblies 193, and/or arms/blades 194) may also rotate with respect to a housing and/or enclosure 182 around a vertical axis, as is illustrated by reference number 188 in FIG. 1C. In embodiments, an upper support assembly 191 may rotate up to a right angle (e.g., 90 degrees) with respect to a lower support assembly 187 of the center via a gearbox or hinging mechanism 190. In embodiments, one or more arm support assemblies 193 may deploy and/or extend from an upper support assembly 191 to open an intelligent shading charging system 175. In embodiments, one or more detachable arms/blades 194 may be attached or coupled to one or more arm support assemblies 193. In embodiments, a detachable shading fabric 195 may be attached or coupled to one or more arms/blades 194.

In embodiments, a housing and/or enclosure 182 including a rechargeable battery 184, an electric vehicle charging port 183, a transceiver 179, and/or a charging interface may rest or be inserted into a ground surface in an outdoor environment. In embodiments, a ground surface may be a floor, a patio, grass, sand, cement, an outdoor plaza, a parking garage surface, or other outdoor environment surfaces. In embodiments, a rechargeable battery interface may be integrated into a ground surface and a rechargeable battery 184 (or an enclosure or housing including a rechargeable battery) may rest on a ground surface.

In embodiments, an intelligent shading charging system 175 may comprise a housing 182 and/or enclosure. In embodiments, a housing and/or enclosure 182 may comprise a rechargeable battery 183, a charging port 183, a wireless transceiver 179 and/or a base assembly. In embodiments, a rechargeable battery may be enclosed in a housing and/or enclosure 182. In embodiments, a base assembly may be enclosed in a housing and/or enclosure 182. In embodiments, a housing and/or enclosure 182 may be comprised of a cement, wood, metal, stainless steel, and/or hard plastic material.

In embodiments, a lower support assembly 187 may comprise one or more first lighting assemblies 199. In embodiments, one or more first light assemblies 199 may be integrated into a lower support assembly 187. In embodiments, one or more first light assemblies 199 may be connected to, adhered to, coupled to, and/or attached to a lower support assembly 187. In embodiments, one or more light assemblies 199 may direct light downward to a housing and/or enclosure 182 including a rechargeable battery 184 and/or a charging port 183 as well as an area surrounding an intelligent shading charging system 175. This allows an intelligent shading charging system to be utilized even at night or in a dark environment in a public environment and not utilize power from an electrical grid. In alternate embodiments, one or more first lighting assemblies 199 may be installed in an upper support assembly 191 and/or a shading fabric 196.

In embodiments, an intelligent shading charging system may comprise a second lighting subsystem 198. In embodiments, an intelligent shading charging system upper support assembly 191 may comprises a second lighting subsystem 198 integrated therein and/or installed and/or mounted thereon. In embodiments, a second lighting subsystem 198 may be integrated into an upper support assembly 191. In embodiments, a second lighting subsystem 198 may be connected to, adhered to, coupled to, and/or attached to an upper support assembly 191. In embodiments, a second lighting subsystem 198 may comprise a plurality of LED lights. In embodiments, a second lighting subsystem 198 may be integrated into and/or attached to arm support assemblies 193. In embodiments, a second lighting subsystem 198 may direct light in a downward manner directly towards or at a certain angle to a ground surface and/or where a charging electric vehicle is located. In embodiments, a second lighting subsystem 198 may direct light beams outward (e.g., in a horizontal direction) from an upper support assembly 191. In embodiments, for example, a second lighting subsystem 198 may direct light at a 90 degree angle from an upper support assembly 191 vertical axis. In embodiments, a second lighting subsystem 198 (e.g., one or more LED lights) may be installed in a swiveling assembly and the second lighting subsystem 198 may transmit and/or direct light (or light beams) at an angle of 5 to 185 degrees from an intelligent upper support vertical axis. In embodiments, one or more LED lights in a second lighting subsystem 198 may be directed to shine lines in an upward direction (e.g., more vertical direction) towards arms/blades 194 and/or a shading fabric 195 of an intelligent shading charging system. In embodiments, a bottom surface of a shading fabric 195, arms/blades 194 and/or arm support assemblies 193 may reflect light beams from one or more LED lights of a second lighting subsystem 198 back to a surrounding area of an intelligent shading charging system. In an embodiment, a shading fabric 195, arms/blades 194 and/or arm support assemblies 193 may have a reflective bottom surface to assist in reflecting light from the LED lights back to a shading area. In alternate embodiments, a second lighting subsystem 198 may be installed in or attached to a lower support assembly 187 and/or in a shading fabric 195.

Figure 1D:
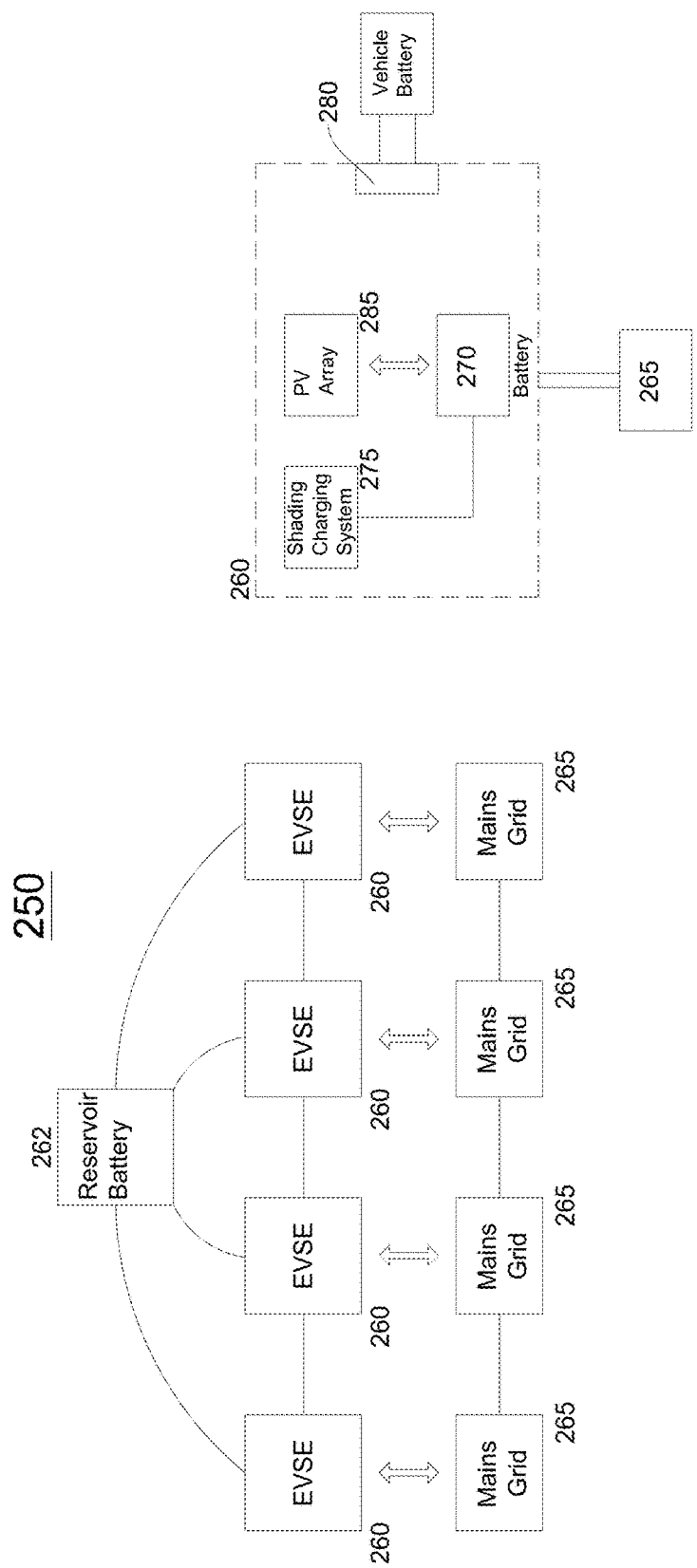
Figure 2:
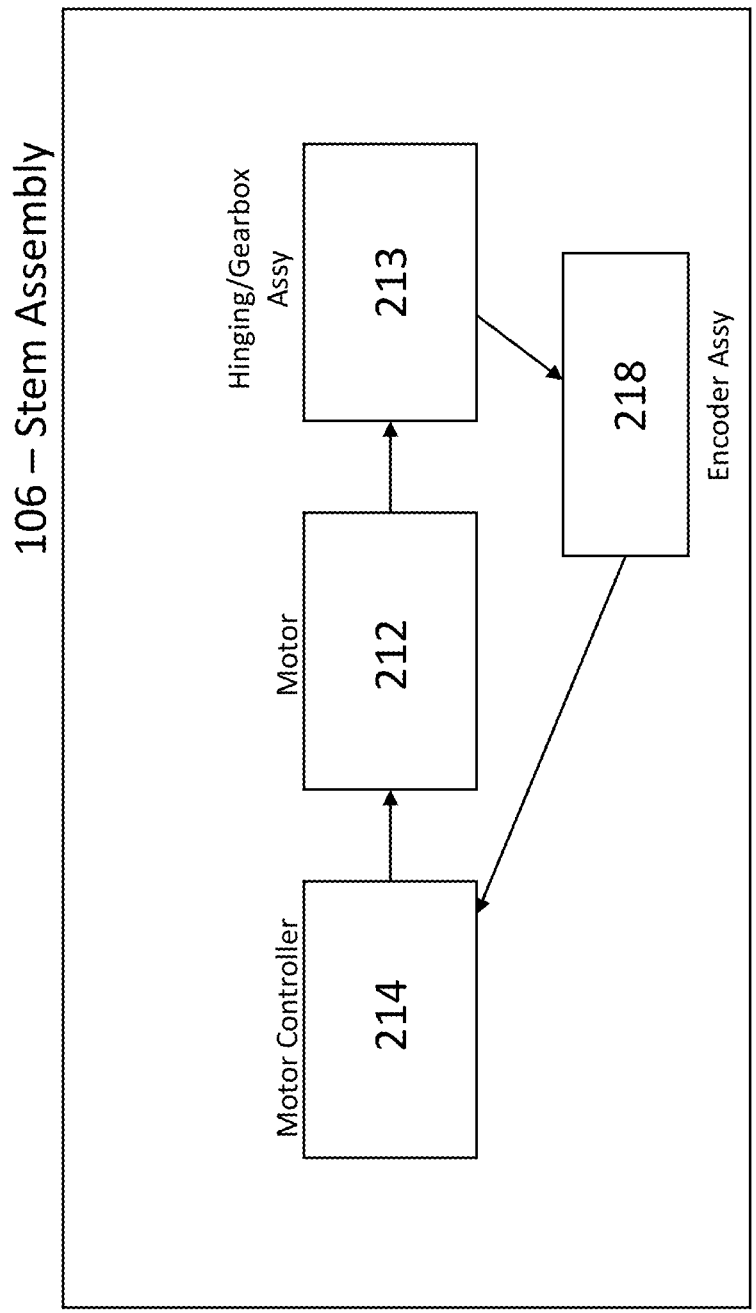
FIG. 2 illustrates a block diagram of a stem assembly according to embodiments.

FIG. 1D illustrates a power charging station 250 comprising one or more automated intelligent shading charging systems installed in an outdoor or indoor environment according to embodiments. In embodiments, a power charging station 250 may comprise one or more intelligent shading charging systems 260 (or electric vehicle supply equipment (EVSE)) and one or more reservoir batteries 262 connected, attached and/or coupled a power supply system 265 (e.g., a power mains grid). In embodiments, one or more intelligent shading charging systems 260 may comprise a rechargeable apparatus 270 (e.g., a rechargeable battery), an intelligent shading charging assembly or system 275 and a solar power system 285 (e.g., a photovoltaic (PV) array or a solar power array). In embodiments, an intelligent shading charging assembly or system 275 may be portable and/or detachable from an enclosure and/or housing 182 including a rechargeable apparatus 270 (e.g., rechargeable battery). In embodiments, an intelligent shading charging assembly or system 275 may be portable and/or detachable from a base assembly, which is coupled, connected, attached in a housing 182, which may also include a rechargeable apparatus 270 (battery).

As shown in FIG. 1D, an intelligent shading charging systems 260 may be coupled, connected and/or interfaced with a power supply system 265, such as an electricity mains grid 265. In embodiments, a power supply company may transfer, transmit or communicate power to an electricity mains grid 265. In embodiments, an intelligent shading charging system 260 may include a car charging interface 280. In embodiments, an electric vehicle charging interface 280 may be coupled and/or connected to vehicle battery (e.g., a vehicle rechargeable battery).

In embodiments, a plaza, a parking garage, an open-air parking lot, an outdoor sports complex, a mall parking lot, a store parking lot, a school, a university, and/or other large outdoor facilities may include an electric vehicle charging station 250 which comprises a plurality of electric vehicle charging systems 260. FIG. 1D illustrates a station with four electrical vehicle charging systems connected to one another. In embodiments, an electric vehicle charging system may be referred to as an EVSE (electric vehicle supply equipment) and also may be referred to as an intelligent shading charging system. In embodiments, a computing device or a plurality of computing devices may control operation of one or more intelligent shading charging systems at an electric vehicle charging station, such as a station at a parking lot at a shopping mall. In embodiments, the electric vehicle charging station also provides shade for electric vehicles, wireless communication capabilities (via wireless transceivers 179) in intelligent shading charging system, as well as interfaces to computing devices located in intelligent shading charging systems 260 and/or external computing devices. In embodiments, for example, an operator of one or more intelligent shading charging systems 175 may charge users, electric vehicle users, or third parties for global communications network access (e.g., Internet usage access) as well as electric vehicle charging. In outdoor environments, e.g., a shopping plaza, a parking lot, an outdoor sporting location or an event outdoor location, this may provide an additional revenue source. In addition, an operator and/or use may also charge for providing images, videos, and/or sounds to third parties. These capabilities installed on shading objects, intelligent umbrellas, and intelligent shading charging systems are a marked improvement on existing outdoor locations such as shopping parking lots, parking lots, outdoor sporting locations and event locations generally do not provide wireless communication capabilities and/or electric vehicle recharging capabilities.

In embodiments, an intelligent shading charging system 260, when offline (e.g., not providing power to an electric vehicle) may feed and/or transfer power to a power supply system, such as a mains power grid 265. In embodiments, an intelligent shading charging system may transfer up to 2, 4, 6 or 8 kilowatt hours of power back to a mains power grid. In embodiments, an electric vehicle charging station 250 may generate revenue by selling excess power back to the power company. In embodiments, current owners of parking lots, building plazas, athletic and/or event fields having EVSE have to pay a power company for power utilized to charge an electric vehicle (e.g., $100 a month/$1,200 a year or $200 a month or $2,400 a year). However, because an intelligent shading charging system 260 obtains power from the sun (e.g., converts solar energy into solar power), recharging an electric vehicle's battery may not cost an owner of an intelligent shading charging system 260 and/or station 250 anything or a minimal amount because the power is self-generating and there is little or no need to obtain power from a mains power grid 265. Thus, the intelligent shading charging system 260 (and/or power station 250) may be a revenue generator for an owner which may be multiplied if an electric vehicle charging station owner has a plurality of intelligent shading charging systems at a location (any of the outdoor locations listed above).

In embodiments, an intelligent shading charging system may charge an electric vehicle in two, four and/or eight hours if an electric vehicle arrives with little or no charge/power in its rechargeable battery. In embodiments, if one intelligent shading charging system does not have enough power in its rechargeable battery 184 to charge an electric vehicle connected to its charging port 183, a rechargeable battery in another intelligent shading charging system 260 at the electric vehicle charging station 250 (such as the one illustrated in FIG. 1D) may provide power to the rechargeable battery in the initial intelligent shading charging system. In embodiments, in an electric vehicle charging station, one or more intelligent shading charging systems 260 (and thus one or more rechargeable batteries) may be connected in series with a capability of providing backup power for other intelligent shading charging systems to power electric vehicles connected to the intelligent shading charging systems. In embodiments, a reservoir battery (and/or reservoir charging assembly) 262 may be charged by and/or provide power to connected and/or coupled shading charging systems 260. In embodiments, a reservoir battery may be a rechargeable battery, a capacitor or similar rechargeable assemblies.

In embodiments, an intelligent shading charging system 260 may comprise a power conversion subsystem or power converter or a power converter. In embodiments, a power conversion subsystem may receive power from a power supply system 265 and may output DC power to a rechargeable battery 270. In embodiments, a power conversion subsystem may comprise an AC-to-DC converter, a DC-to-DC converter and/or regulator and a digital control system. In embodiments, an AC-to-DC converter may convert AC power from an electrical grid to DC power. In embodiments, converted power from the AC-to-DC converter may be regulated by a DC-to-DC converter. The power output from the DC-to-DC converter may be transferred or transmitted to a rechargeable battery 270. In embodiments, a digital control system may controls operations of a DC-to-DC converter and an AC-to-DC converter.

Figure 3A:
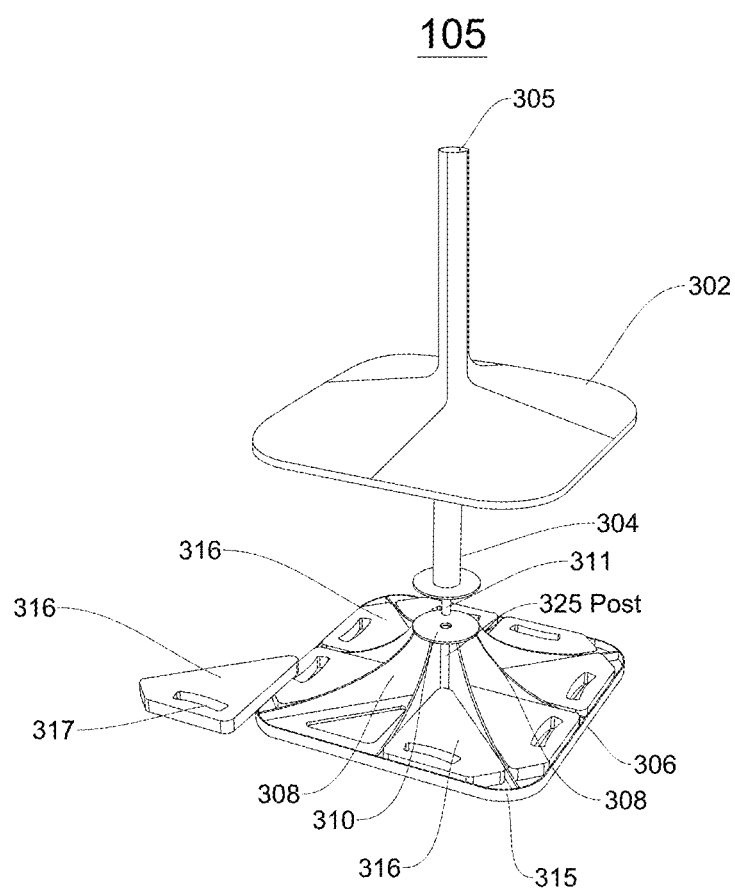
FIG. 3A illustrates a base assembly according to embodiments.

FIG. 3A illustrates a base assembly according to embodiments. In embodiments, a base assembly 300 comprises a base enclosure 302, a detachable stem 304, a stem tip 311, and a weight housing unit 306. In embodiments, a weight housing unit 306 may comprise a stem support 310, a plurality of weight housing walls 308 and a bottom housing plate 315. In embodiments, a weight housing unit 306 comprises a plurality of weight wedges 316.

In embodiments, a plurality of weight housing walls 308 may divide a weight housing plate 315 into a plurality of regions. In embodiments, a weight housing plate 315 may be divided into four, six or eight regions. In embodiments, a weight housing plate 315 may be divided into more than one region (e.g., two or more regions). In embodiments, weight wedges 316 may be placed into regions formed by weight housing walls 308 and weight housing plate 316. As is illustrated in FIG. 3A, weight wedges may have a triangular-base shape. In embodiments, weight wedges 316 may be formed of steel or stainless steel. In embodiments, weight wedges may be comprised of a solid plastic material. In embodiments, weight wedges 316 may include a space for a handle 317. In embodiments, handles 317 may allow for weight wedges to be carried by a user of a sun shade. In embodiments, a weight housing unit 305 may include resting supports 320. In embodiments, weight housing supports may allow a weight wedge 316 to not damage a surface of a weight housing plate 315.

In embodiments, a weight housing wall 308 vary in height. A weight housing wall 308 may have a low height at a first end (e.g., at an outside edge of a weight housing unit 306), as illustrated in FIG. 3A. A second end of a weight housing wall 308 may have a higher height. A second end of a weight housing wall 308 be connected and/or coupled to a center support post 325. In embodiments, two, four or eight weight housing walls 308 may be connected and/or coupled to a center support post 325. In embodiments, a stem support 310 may be attached, coupled, and/or connected to a plurality of weight housing walls 308 and a center support post 325. In embodiments, a top surface of a second end of a weighting housing wall 308 and/or a top surface of a center support post 325 may be connected to a stem support 310 (e.g., a bottom surface of a stem support 310). In embodiments, a stem support 310 may have a hole and/or opening into which a tip 311 may be inserted and/or placed. In embodiments, a base assembly may comprise and/or be made of a metal. In embodiments, a base assembly may comprise a lightweight metal, e.g., aluminum, although other metals may be utilized based on degradation in environment where shading object is located. In embodiments, a base assembly 105 may be made of a composite material, a wood material, or a plastic material, or a combination thereof. In embodiments, a base assembly 105 may comprise a biodegradable material so that when a base assembly is thrown away and placed in a landfill or buried, the biodegradable material may decompose over time.

In embodiments, a base assembly 105 may comprise a battery (e.g., a rechargeable battery). In an embodiment, a base battery may be charged and/or powered by an AC adapter which is connected at one end to a battery (or charging system such as a rectifier and/or a capacitor) and at another end to a wall outlet. In embodiments, a solar charging assembly and/or a rechargeable battery in a center support assembly 107 may provide power (e.g., voltage and/or current) to a battery in a base assembly 105. In embodiments, a base assembly 105 battery may be a backup and/or secondary battery to a main battery in a center support assembly 107 (or stem assembly 106).

Figure 3B:
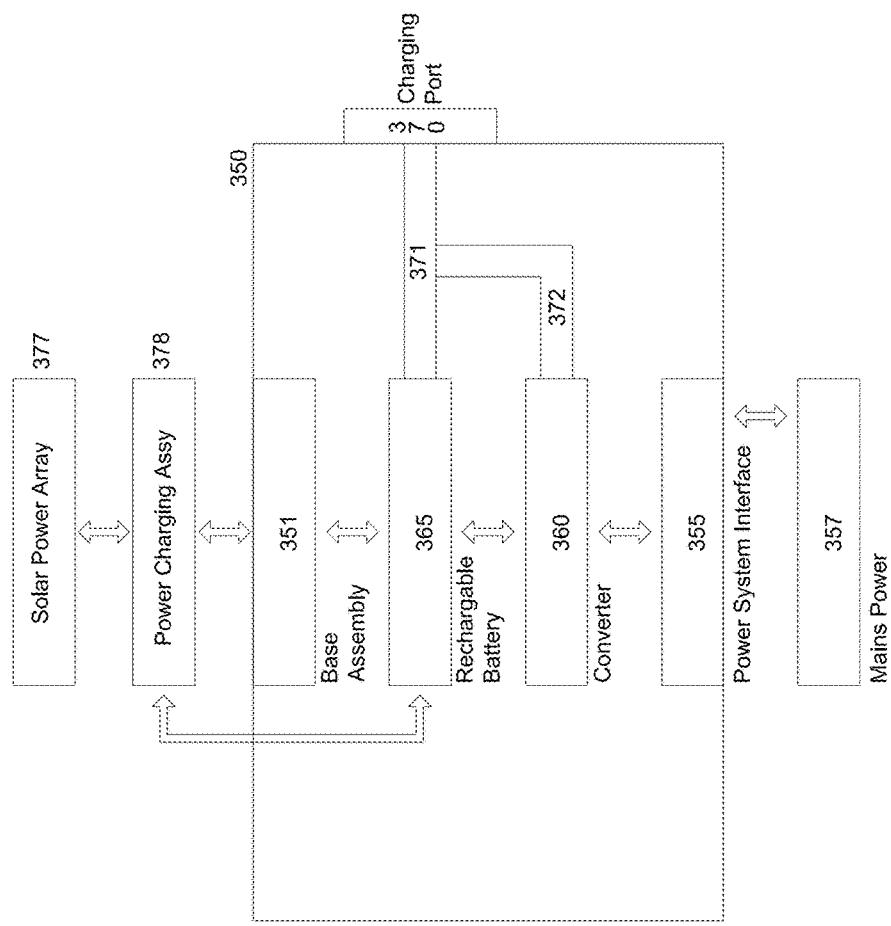
FIG. 3B illustrates a housing and/or enclosure according to embodiments.

FIG. 3B illustrates a housing and/or enclosure of an intelligent shading charging system according to embodiments. In embodiments, a housing and/or enclosure 350 may comprise a base assembly 351, a power supply system interface 355, a rechargeable apparatus (e.g. rechargeable battery) 365, a power converter 360, and/or a vehicle charging port 370. In embodiments, a rechargeable battery 365 may be coupled and/or electrically connected to a recharging port 370 via or utilizing a connector cable 371 or other electrically conductive wire and/or cable apparatus. In embodiments, a converter may also be coupled and/or electrically connected to a recharging port 370 to provide power (from a power supply system such as mains power 265 (see FIG. 1D) to an electric and/or hybrid vehicle if a rechargeable battery 365 does not supply enough power (e.g., a solar array has not charged a rechargeable battery 365 to a sufficient level). In embodiments, a power supply system 357 may provide additional power to a rechargeable battery 365. In embodiments, a power supply system 357 may be coupled and/or connected to a rechargeable battery 365 via a power interface 355 and/or a converter 360. In embodiments, a rechargeable battery 365 may provide, transfer or deliver excess power back to a power supply system 357. In embodiments, a rechargeable battery 365 may provide power to assemblies, components, and/or other assemblies in an intelligent shading charging system 160 (in some embodiments, e.g., via a power charging assembly 378). In embodiments, a power supply system 357 may provide power to assemblies, components, and/or other assemblies in an intelligent shading charging system. In embodiments, a solar power array 377 may provide power to assemblies, components, and/or other assemblies in an intelligent shading charging system. In embodiments, a solar power array 377 may provide power to rechargeable battery 365 via a power charging assembly 378 in an intelligent charging shading system.

In embodiments, a base assembly 351 may have an opening (e.g., a circular or oval or other shaped opening) into which a lower support assembly 187 (or a shaft of a lower support assembly 187) may be placed, inserted, and/or connected. In embodiments, a base assembly 351 may be stationary and a lower support assembly 187 (and a remainder of an intelligent shading charging system) may rotate about a base assembly 351.

In embodiments, a housing and/or enclosure 350 may comprise and/or be made of a metal. In embodiments, a housing and/or enclosure 350 may comprise a lightweight metal, e.g., aluminum, although other metals may be utilized based on degradation in environment where shading object is located. In embodiments, a housing and/or enclosure 350 may be made of a composite material, a wood material, a cement material, or a plastic material, or a combination thereof. In embodiments, a housing and/or enclosure 350 may comprise a biodegradable material so that when a base assembly is thrown away and placed in a landfill or buried, the biodegradable material may decompose over time.

In embodiments, a lower support assembly may comprise a stem assembly and a center support assembly. Such an embodiment is illustrated in FIG. 1B. FIG. 4 illustrates a block diagram of a lower support assembly according to embodiments. In embodiments, such as illustrated in FIGS. 1A and 1B, a stem assembly may be referred to as an automatic and/or motorized stem assembly. In embodiments, a stem assembly 106 may comprise a stem body 211 and a first motor assembly. In embodiments, a first motor assembly may comprise a first motor 212, a gear box assembly and/or hinging assembly 213, and/or a first motor controller 214. Although a gearbox assembly and/or hinging assembly 213 may be illustrated and/or discussed, other connecting assemblies, gearing assemblies, actuators, etc., may be utilized. In embodiments, a first motor controller 214 may also be referred to as a motor driver and within this specification, terms "motor driver" and "motor controller" may be used interchangeably. In embodiments, a first motor controller 214 may receive commands, instructions, messages and/or signals requesting movement of a shading system around an azimuth axis. In embodiments, a shading system body 211 may rotate (e.g., may rotate between 0 and 360 degrees about a vertical axis formed by a base assembly 105, a stem assembly 106, and/or a central support assembly 107). In embodiments, reference number 161 (FIG. 6) may represent such a vertical axis. Reference number 140 (FIG. 1B) illustrates a rotation of a shading system body about a vertical axis according to embodiments. In embodiments, a shading object stem assembly 106 may rotate around a vertical axis, such as vertical axis 730 in FIG. 7 and vertical axis 161 in FIG. 6. In embodiments, a shading object stem assembly may rotate 360 degrees about a vertical axis. In embodiments, a shading object stem assembly 106 may rotate up to 270 degrees and/or 180 degrees about a vertical axis. In embodiments, a shading object stem assembly 106 may have its rotation be limited by detents, stops and/or limiters in an opening of a base assembly 105. In embodiments, a stem assembly encoder 218 may provide location and/or position feedback of a stem assembly 106 to a first motor controller 214. In other words, an encoder 218 may verify that a certain distance and/or position has been moved by a stem assembly 106 from an original position a stem assembly moved with respect to a base assembly. In embodiments, encoders may be utilized in motor systems in order to feedback position and/or distance information to motor controllers and/or motors to verify a correct position has been reached or moved to. In embodiments, encoders may have a number of positions and/or steps and may compare how much an output shaft and/or gearbox assembly has moved towards these positions and/or steps in order to feedback information to a motor controller. Encoders may be utilized with any motors and/or motor controllers (e.g., first, second and/or third motors and/or first, second, and/or third motor controllers). The utilization of encoders with motor controllers and/or motors provides a benefit as compared to prior art umbrellas and shading objects, because the intelligent shading umbrella, due to its rotation (e.g., 360 degree rotation), may orient itself with respect to any number of positions in a surrounding area.

In embodiments, a first motor controller 214 may communicate commands, messages and/or signals to a first motor 212 to cause movement of an umbrella support assembly or shading system body (e.g., a stem assembly 106, central support assembly 107, shading arm supports 108, and/or arms/blades 109) about an azimuth axis. In this illustrative embodiment, a base assembly 105 may remain stationary while the shading system body rotates within a base assembly 105. In other words, a shading system body may be placed in an opening of a base assembly 105 and rotates while the base assembly remains stationary. In embodiments, a first motor 212 may be coupled to a gearbox assembly 213. In embodiments, a gearbox assembly 213 may comprise a planetary gearbox assembly. In embodiments, a planetary gearbox assembly may be comprise a central sun gear, a planet carrier with one or more planet gears and an annulus (or outer ring). In embodiments, planet gears may mesh with a sun gear while outer rings teeth may mesh with planet gears. In embodiments, a planetary gearbox assembly may comprise a sun gear as an input, an annulus as an output and a planet carrier (one or more planet gears) remaining stationary. In embodiments, an input shaft may rotate a sun gear, planet gears may rotate on their own axes, and may simultaneously apply a torque to a rotating planet carrier that applies torque to an output shaft (which in this case is the annulus). In embodiments, a planetary gearbox assembly and a first motor 212 may be connected, attached and/or adhered to a stem assembly 105. In embodiments, an output shaft from a gearbox assembly 213 may be connected and/or coupled to a base assembly 105 (e.g., an opening of a base assembly). In embodiments, because a base assembly 105 is stationary, torque on an output shaft of a gearbox assembly 213 may be initiated by a first motor 212 to cause a stem assembly 106 to rotate. In embodiments, other gearbox assemblies and/or hinging assemblies may also be utilized to utilize an output of a motor to cause a stem assembly 106 (and hence an umbrella support assembly) to rotate within a base assembly 105. In embodiments, a first motor 212 may comprise a pneumatic motor. In other embodiments, a first motor 212 may comprise a servo motor and/or a stepper motor.

In embodiments, a stem assembly 106 may be coupled and/or connected to a center support assembly 107. In embodiments, as mentioned above, a stem assembly 106 and a center support assembly 107 may both be part of an umbrella support assembly. In embodiments, a center support assembly 107 may comprise an upper assembly 112, a second gearbox assembly (or a linear actuator or hinging assembly) 114, a lower assembly 113, a second motor 412, and/or a second motor controller 410. In embodiments, a second motor assembly may comprise a second motor controller 410 and a second motor 412, and maybe a second gearbox assembly or linear actuator 414. In embodiments, a center support assembly 107 may also comprise a motor control PCB which may have a second motor controller 410 mounted and/or installed thereon. In embodiments, an upper assembly 112 may be coupled or connected to a lower assembly 113 of the center support assembly 107 via a second gearbox assembly 113. In embodiments, a second gearbox assembly 414 and a second motor 412 connected thereto, may be connected to a lower assembly 113. In embodiments, an output shaft of a second gearbox assembly 114 may be connected to an upper assembly 112. In embodiments, as a second motor 412 operates and/or rotates, a second gearbox assembly 114 or 414 rotates an output shaft which causes an upper assembly 112 to rotate (either upwards or downwards) at a right angle from, or with respect to, a lower assembly 113. In embodiments utilizing a linear actuator as a hinging assembly 114, a steel rod may be coupled to an upper assembly 112 and/or a lower assembly 113 which causes a free hinging between an upper assembly 112 and a lower assembly 113. In embodiments, a linear actuator 114 may be coupled, connected, and/or attached to an upper assembly 112 and/or a lower assembly 113. In embodiments, as a second motor 412 operates and/or rotates a steel rod, an upper assembly 112 moves in an upward or downward direction with respect to a hinged connection (or hinging assembly) 114. In embodiments, a direction of movement is illustrated by reference number 160 in FIG. 1B. In embodiments, a direction of movement may be limited to approximately a right angle (e.g., approximately 90 degrees). In embodiments, an upper assembly 112 may move from a position where it is an extension of a lower assembly 113 (e.g., forming a vertical center support assembly 107) to a position wherein an upper assembly 112 is at a right angle from a lower assembly 113 (and also approximately parallel to a ground surface). In embodiments, movement may be limited by a right angle gearbox or right angle gearbox assembly 114 and/or 414. In embodiments, an upper assembly 112 and a lower assembly 113 may be perpendicular to a ground surface in one position (as is shown in FIG. 1A), but may move (as is shown by reference number 160) to track the sun (depending on location and time of day) so that an upper assembly 112 moves from a perpendicular position with respect to a ground surface to an angular position with respect to a ground surface and an angular position with respect to a lower assembly 113. In embodiments, an upper assembly may track and move in coordination with a sun movement between a vertical position (top of sky) and a horizontal position (horizon). In embodiments, a position of an upper assembly may depend on a specific time and location. In embodiments, an ability to track the sun's position and/or other predetermined positions provides a benefit, as compared to prior art umbrellas, of automatically orienting a shading object or umbrella to positions of a sun in the sky (e.g., directly overhead, on a horizon as during sunrise and/or sunset) or to move with respect to predetermined times and/or locations.

Figure 4A:
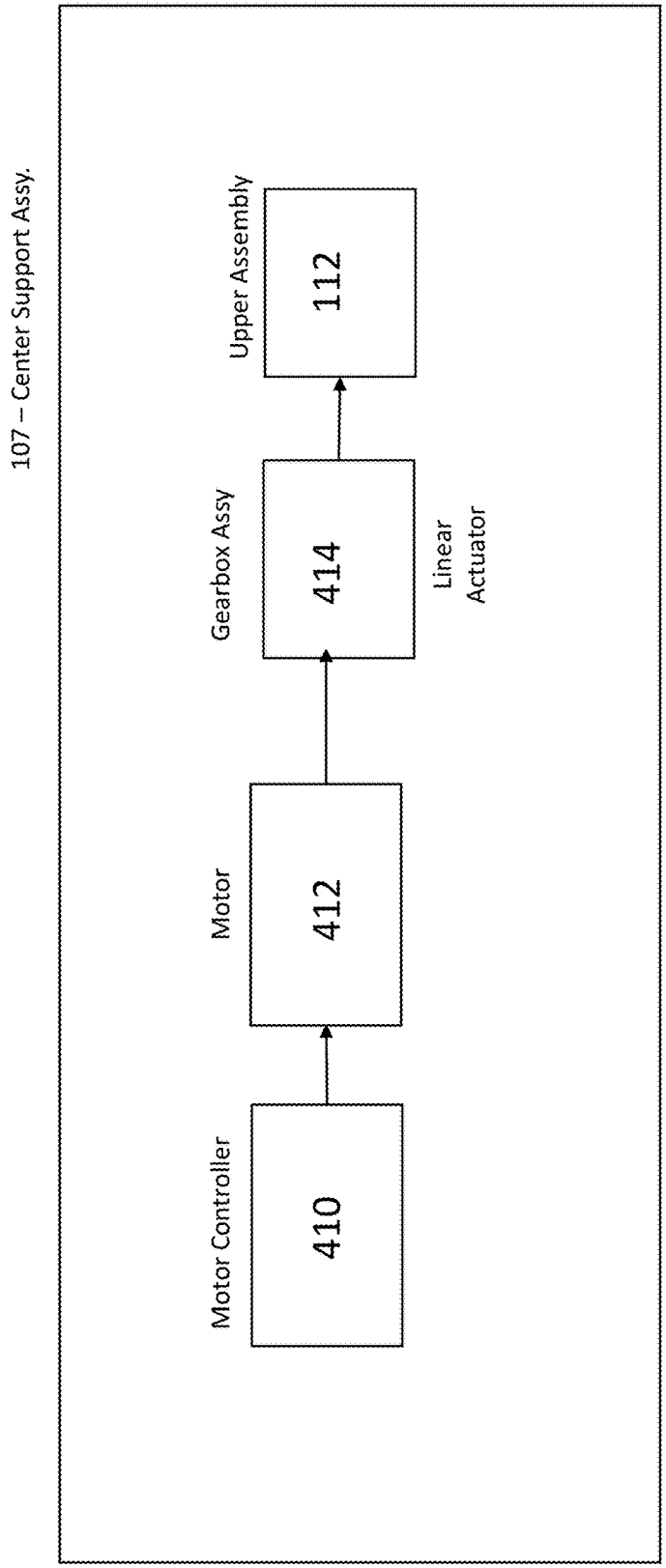
FIG. 4A illustrates a block diagram of a center support assembly motor control according to embodiments.

FIG. 4A illustrates a block diagram of center support assembly motor control according to embodiments. In embodiments, a center support assembly 107 may comprise a second motor assembly. In embodiments, a second motor assembly comprises a second motor controller 410 (which may or may not be installed on a shading object movement control PCB) and a second motor 412. In embodiments, a second controller 410 may receive commands, signals, messages, and/or instructions from a shading object movement controller (which may or may not be located on a shading object movement PCB 895 (see FIG. 8), and/or a computing device, to control operation of a second motor 412. In embodiments, a second controller 410 may generate commands, messages and/or signals causing a second motor 412 to drive its output shaft and engage a gearbox assembly 414 (or linear actuator), which in turn causes an upper assembly 112 of a center support assembly 107 to rotate and/or move with respect to a lower assembly 113. In embodiments, a second motor or actuator 412 may drive a hinging assembly 414 to move with respect to a stem assembly 106. In embodiments, an upper assembly 112 may move up to 90 degrees (or at a right angle) with respect to a lower assembly 113. In embodiments, a second motor or actuator 412 may comprise a pneumatic motor. In other embodiments, a second motor or actuator 412 may comprise a servo motor and/or a stepper motor. In embodiments, an encoder and/or other feedback assembly may be utilized for feedback of position information to a second motor controller or driver 410.

Figure 4B:
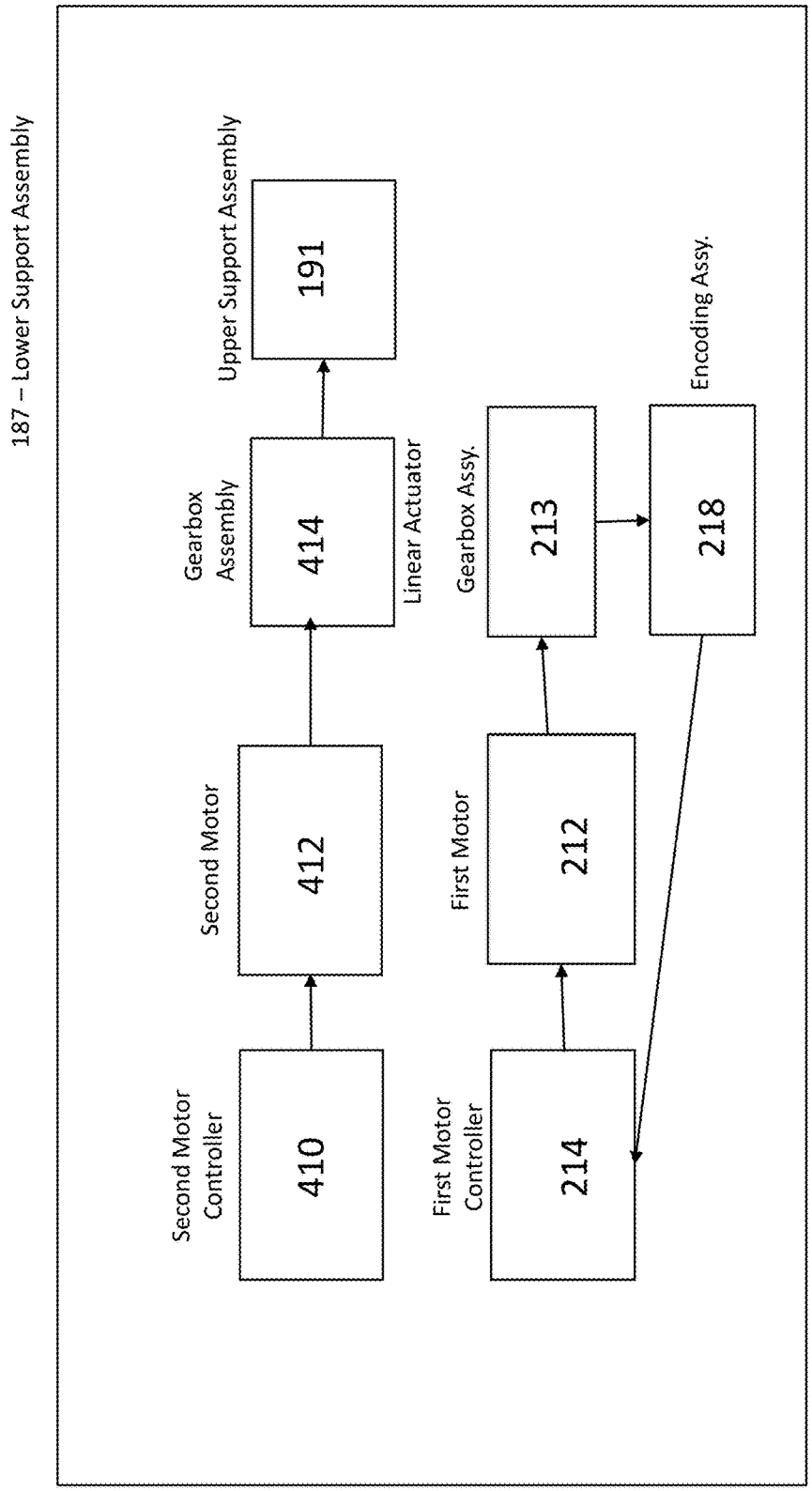
FIG. 4B illustrates a lower support motor assembly according to embodiments.

FIG. 4B illustrates a lower support motor assembly according to embodiments. In embodiments, such as illustrated in FIG. 1C, a lower 187 assembly may comprise a first motor assembly and/or a second motor assembly. In embodiments, a first motor assembly may comprise a first motor 212, a gear box assembly and/or hinging assembly 213, and/or a first motor controller 214. In embodiments, a second motor assembly may comprise a second motor 412, a second motor driver controller 410, an upper assembly 191, and a gearbox assembly 414. In embodiments, a first motor controller 214 and/or a second motor controller 410 may also be referred to as motor drivers and within this specification, terms "motor driver" and "motor controller" may be used interchangeably. Although descriptions herein may describe a first motor controller 214 and a second motor controller 410, one motor controller may be able to perform functions and/or operations of both a first motor controller 214 and a second motor controller 410. In addition, one motor may perform functions and/or operations of both a first motor 212 and a second motor 412.

In embodiments, a first motor controller 214 may receive commands, instructions, messages and/or signals requesting movement of a shading shading charging system around an azimuth axis. In embodiments, a lower support assembly 187 may rotate about a vertical axis (e.g., may rotate between 0 and 360 degrees about a vertical axis). Reference number 188 (FIG. 1C) illustrates a rotation of a lower support assembly 187 about a vertical axis according to embodiments. In embodiments, a lower support assembly 187 may rotate 360 degrees about a vertical axis with respect to a housing and/or enclosure 182. In embodiments, a lower support assembly 187 may rotate up to 270 degrees and/or 180 degrees about a vertical axis with respect to a housing and/or enclosure 182. In embodiments, a lower assembly 187 may have its rotation be limited by detents, stops and/or limiters in an opening of a housing and/or assembly 182 (e.g., an opening in a base assembly). In embodiments, an encoder 218 may provide location and/or position feedback of a lower support assembly 187 to a first motor controller 214. In embodiments, encoders may be utilized in motor systems in order to feedback position and/or distance information to motor controllers and/or motors to verify a correct position has been reached or moved to.

In embodiments, a first motor controller 214 may communicate commands, messages and/or signals to a first motor 212 to cause movement of a shading charging system (e.g., a lower support assembly 187, an upper support assembly 199, one or more shading arm supports 193, and/or one or more arms/blades 194) about an azimuth axis. In embodiments, for example, an enclosure and/or housing 182 may remain stationary while a shading charging system rotates within a base assembly within a housing and/or enclosure 182. In other words, in an illustrative embodiment, a shading charging system may be placed in an opening of a base assembly of an enclosure and/or housing 182 and may rotate while the base assembly (and thus the enclosure and/or housing 182) remains stationary.

In embodiments, a first motor 212 may be coupled to a gearbox assembly 213. In embodiments, a gearbox assembly 213 may comprise a planetary gearbox assembly. In embodiments, a planetary gearbox assembly may be comprise a central sun gear, a planet carrier with one or more planet gears and an annulus (or outer ring). In embodiments, planet gears may mesh with a sun gear while outer rings teeth may mesh with planet gears. In embodiments, a planetary gearbox assembly may comprise a sun gear as an input, an annulus as an output and a planet carrier (one or more planet gears) remaining stationary. In embodiments, an input shaft may rotate a sun gear, planet gears may rotate on their own axes, and may simultaneously apply a torque to a rotating planet carrier that applies torque to an output shaft (which in this case is the annulus). In embodiments, a planetary gearbox assembly and a first motor 212 may be connected, attached and/or adhered to a lower support assembly 187. In embodiments, an output shaft from a gearbox assembly 213 may be connected and/or coupled to a housing and/or enclosure 182 (e.g., a base assembly (e.g., an opening of a base assembly)). In embodiments, because a housing and/or enclosure 182 is stationary (e.g., a base assembly may stationary), torque on an output shaft of a gearbox assembly 213 may be initiated by a first motor 212 to cause a lower support assembly 187 to rotate. In embodiments, other gearbox assemblies and/or hinging assemblies may also be utilized to utilize an output of a motor to cause a lower support assembly (and hence an intelligent shading charging system) to rotate within an enclosure and/or housing 182 (e.g., a base assembly). In embodiments, a first motor 212 may comprise a pneumatic motor. In other embodiments, a first motor 212 may comprise a servo motor and/or a stepper motor.

In embodiments, as is illustrated in FIG. 1C, a lower support assembly 187 may comprise a second gearbox assembly (or a linear actuator or hinging assembly) 190 or 414, a second motor 412, and/or a second motor controller 410. In embodiments, a second motor assembly may comprise a second motor controller 410 and a second motor 412, and maybe a second gearbox assembly or linear actuator 414. In embodiments, a lower assembly 187 may also comprise a motor control PCB which may have a second motor controller 410 mounted and/or installed thereon. In embodiments, an upper support assembly 191 may be coupled or connected to a lower assembly 187 via a second gearbox assembly or linear actuator 190 or 414. In embodiments, a second gearbox assembly and/or linear actuator 414 and a second motor 412 connected thereto, may be connected to a lower assembly 187. In embodiments, an output shaft of a second gearbox assembly or linear actuator 414 may be connected to an upper support assembly 191. In embodiments, as a second motor 412 operates and/or rotates, a second gearbox assembly 190 or 414 rotates an output shaft which causes an upper assembly 191 to rotate (either upwards or downwards) at a right angle from, or with respect to, a lower assembly 187. In embodiments utilizing a linear actuator as a hinging assembly 190, a steel rod may be coupled to an upper support assembly 191 and/or a lower assembly 187 which causes a free hinging between an upper support assembly 191 and a lower support assembly 187. In embodiments, a linear actuator 190 or 414 may be coupled, connected, and/or attached to an upper support assembly 191 and/or a lower support assembly 187. In embodiments, as a second motor 412 operates and/or rotates a steel rod, an upper support assembly 191 moves in an upward or downward direction with respect to a hinged connection (or hinging assembly) 190 or 414. In embodiments, a direction of movement is illustrated by reference number 192 in FIG. 1C. In embodiments, a direction of movement may be limited to approximately a right angle (e.g., approximately 90 degrees). In embodiments, an upper assembly 191 may move from a position where it is a vertical extension of a lower assembly 187 (e.g., forming a vertical support assembly) to a position wherein an upper assembly 191 is at a right angle from a lower assembly 187 (and also approximately parallel to a ground surface). In embodiments, movement may be limited by a right angle gearbox or right angle gearbox assembly 190 and/or 414. In embodiments, an upper assembly 191 and a lower assembly 187 may be perpendicular to a ground surface in one position, but may move (as is shown by reference number 192) to track the sun (depending on location and time of day) so that an upper support assembly 192 moves from a perpendicular position with respect to a ground surface to an angular position with respect to a ground surface and an angular position with respect to a lower support assembly 187.

In embodiments, a lower support assembly 187 may comprise a second motor assembly. In embodiments, a second motor assembly comprises a second motor controller 410 (which may or may not be installed on a shading object movement control PCB) and a second motor 412. In embodiments, a second controller 410 may receive commands, signals, messages, and/or instructions from a shading object movement controller (which may or may not be located on a shading object movement PCB 895 (see FIG. 8), and/or a computing device, to control operation of a second motor 412. In embodiments, a second controller 410 may generate commands, messages and/or signals causing a second motor 412 to drive its output shaft and engage a gearbox assembly 414 (or linear actuator), which in turn causes an upper assembly 191 to rotate and/or move with respect to a lower assembly 187. In embodiments, a second motor or actuator 412 may drive a hinging assembly 190 or 414 to move with respect to a lower support assembly 187. In embodiments, an upper assembly 191 may move up to 90 degrees (or at a right angle) with respect to a lower assembly 187. In embodiments, a second motor or actuator 412 may comprise a pneumatic motor. In other embodiments, a second motor or actuator 412 may comprise a servo motor and/or a stepper motor. In embodiments, an encoder and/or other feedback assembly may be utilized for feedback of position information to a second motor controller or driver 410.

In embodiments, such as shading objects and/or intelligent umbrellas illustrated in FIGS. 1A and 1B, an upper assembly 112 of a center support assembly 107 may further comprise and/or house an arm support assembly 108. In embodiments, arms and/or blades 109 may be connected, coupled and/or attached to a center support assembly 107. In embodiments, such as embodiments of an intelligent shading charging system illustrated in FIG. 1D, an upper support assembly 191 may further comprise and/or house an arm support assembly 193 and in some cases arms/blades 194.

Figure 5A:
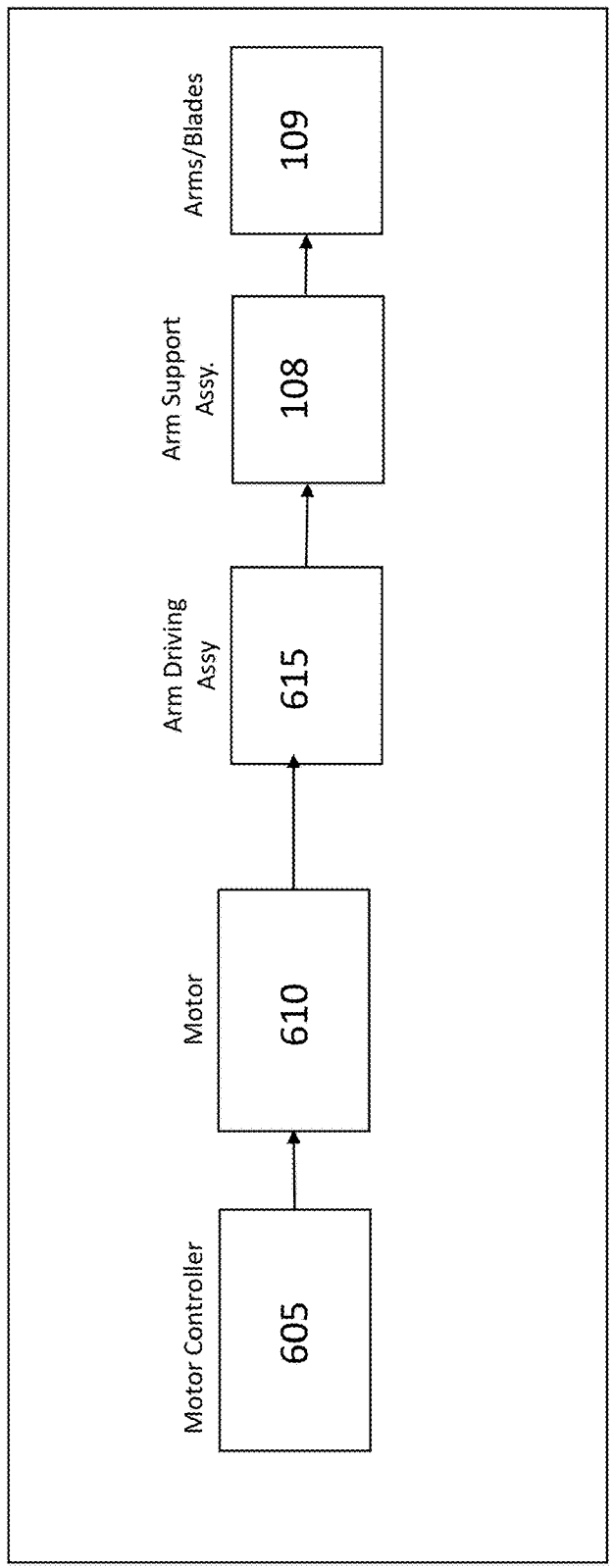
FIG. 5A illustrates a block diagram of an actuator or deployment motor in an intelligent umbrella or shading object according to embodiments.
Figure 6A:
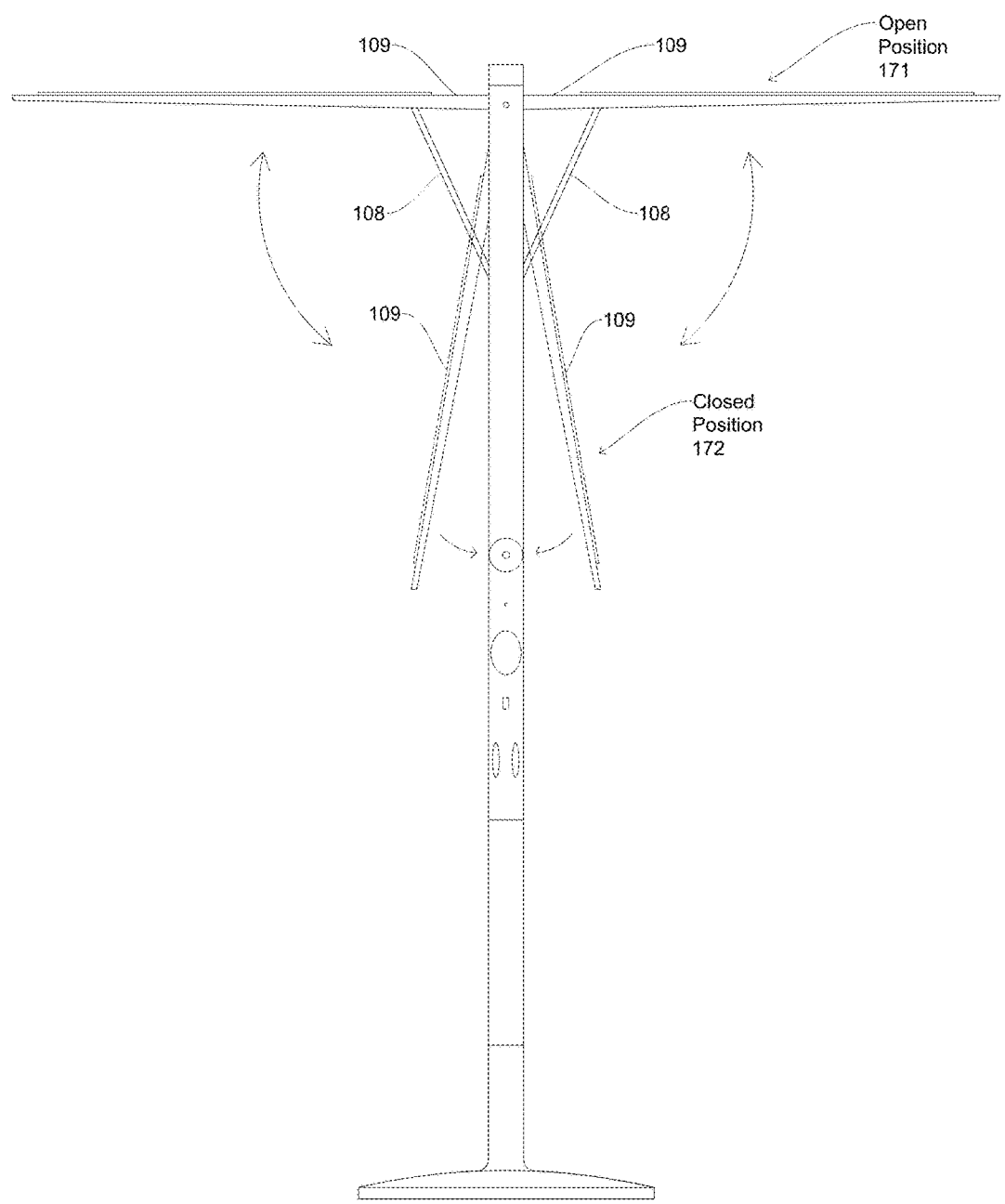
FIG. 6A illustrates a shading object or intelligent umbrella with arm support assemblies and arms/blades in an open position and a closed positions.

FIG. 6A illustrates a shading object with arm support assemblies 108 and arms/blades in an open position 171 and a closed position 172. FIG. 5A illustrates a block diagram of shading object actuator or deployment assembly according to embodiments. In embodiments, an upper assembly 112 of a center support assembly 107 may further comprise a third motor assembly, an arm driving assembly, an arm support assembly 108 and/or arms/blades 109. In embodiments, a third motor assembly may comprise a third motor controller 605, a third motor 610, and an arm driving assembly 615. In embodiments, some of these assemblies may be housed in a lower assembly 113. In embodiments, a third motor controller 605, a third motor 610, an arm supporting assembly 108 and/or arm/blade 109 may be housed and/or positioned in an upper assembly 112, which may be positioned above a lower assembly 113 of a center support assembly 107. In embodiments, a third motor 610 may comprise a stator, rotor and shaft/spindle. In embodiments, a shaft/spindle may be coupled and/or connected to a rod (e.g., a threaded rod). In embodiments, an arm driving assembly 615 may comprise at least a threaded rod and a collar. In embodiments, a threaded rod may be coupled and/or connected to a collar, and a collar may have a number of slots to which linked arm supports (e.g., arm support assembly 108) are linked, coupled or connected. In embodiments, a linear actuator may be coupled in between a third motor controller 605 and arm supporting assembly 108.

Figure 6B:
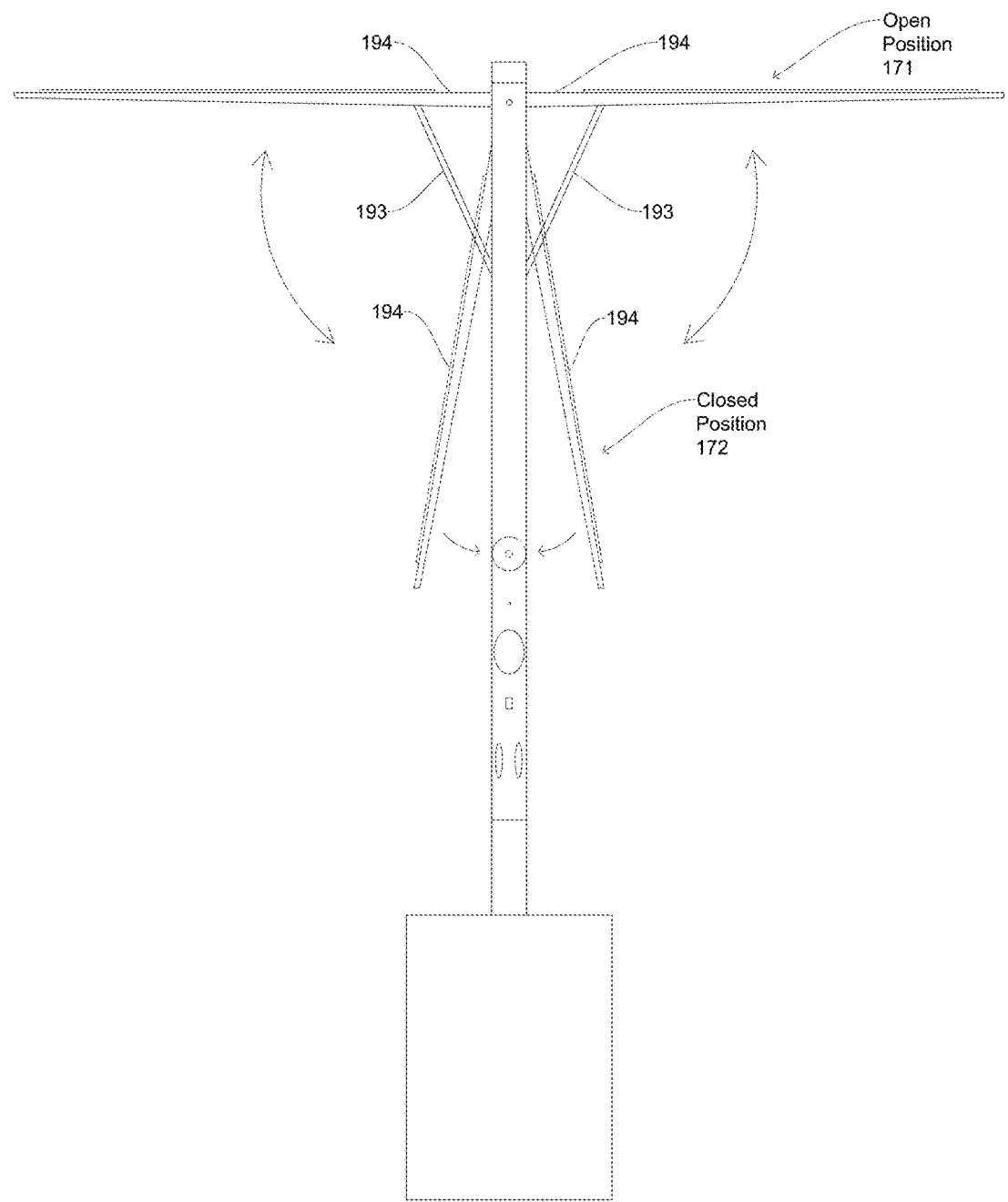
FIG. 6B illustrates an intelligent shading charging system with arm support assemblies and arms/blades in an open position and a closed position.

FIG. 6B illustrates an intelligent shading charging system with arm support assemblies 193 and arms/blades 194 in an open position 171 and a closed position 172. FIG. 5B illustrates a block diagram of shading object actuator or deployment assembly according to embodiments. In embodiments, such as illustrated in FIG. 1C, an upper support assembly 191 of an intelligent shading charging system may further comprise a third motor assembly, one or more arm support assemblies 193 and/or one or more arms/blades 194. In embodiments, a third motor assembly may comprise a third motor controller 605, a third motor 610, and an arm driving assembly 615. In alternative embodiments, some of these assemblies may be housed in a lower support assembly 187. In embodiments, a third motor controller 605, a third motor 610, one or more arm supporting assemblies 193 and/or one or more arm/blades 194 may be housed and/or positioned in an upper support assembly 191, which may be positioned above a lower assembly 187 of an intelligent shading charging system. In embodiments, a third motor 610 may comprise a stator, rotor and shaft/spindle. In embodiments, a shaft/spindle may be coupled and/or connected to a rod (e.g., a threaded rod). In embodiments, an arm driving assembly 615 may comprise at least a threaded rod and a collar. In embodiments, a threaded rod may be coupled and/or connected to a collar, and a collar may have a number of slots to which linked arm supports (e.g., arm support assembly 193) are linked, coupled or connected. In embodiments, a linear actuator may be coupled in between a third motor controller 605 and arm supporting assembly 193.

FIG. 7 illustrates assemblies to deploy arms and/or blades according to embodiments. FIG. 7 illustrates assemblies that are equally applicable to shading objects or intelligent umbrellas (FIGS. 1A and 1B) and/or intelligent shading charging systems (FIG. 1C) In embodiments, arm supports and/or arm supporting assemblies 108 (FIGS. 1A and 1B) and 193 (FIG. 1C) may be coupled to arms, blades or other similar devices. In embodiments, arms, blades, and/or other similar devices 109 (FIGS. 1A and 1B) and 194 (FIG. 1C) may be detachably attached to an arm driving assembly. A shading fabric 715 (FIGS. 1A and 1B) and 195 (FIG. 1C) may be detachably attached to arms/blade 109 or 194 and/or arm supporting assembly 108 or 193. In an embodiment illustrated in FIG. 7, a shading object and/or umbrella may comprise an upper assembly 112 of a center support assembly 107 (FIGS. 1A and 1B) or an upper support assembly 191, one or more arm support assemblies 108 or 193, one or more arms/blades 109 or 194, on or more solar panels (not shown) 196 (FIG. 1C), and a shading fabric cover 705.

In embodiments, a shading fabric cover 705 may include fabric fused with flexible solar cells. In embodiments, arm support assemblies 108 (or articulating blades) or 193 may be in a rest position inside an upper assembly 112 of a center support assembly 108 (e.g., a recess or a recessed channel in an upper assembly 112) or inside an upper support assembly 191 (FIG. 1C) (e.g., a recessed channel within upper support assembly). As is illustrated in FIG. 7, arm support assemblies 108 or 193 may be connected to a top end 710 (or upper section) of an upper assembly 112 of a center support assembly 107 or upper support assembly 191. In embodiments, arms/blades 109 or 194 may be attached, adhered, fastened, and/or connected to arm support assemblies 108 or 193 (e.g., articulation blades). As illustrated in FIG. 7, arm support assemblies 108 or 193 and/or arms/blades 109 or 194 may have holes or openings and a fastener or connector may be used to attach and/or fasten the arm support assemblies 108 or 193 to the arms/blades 109 or 194. In embodiments, arm support assemblies 108 or 193 and/or arms/blades 109 or 194 made be adhered together, fastened together, welded together, or may be snapped together to fit. In embodiments, a fabric cover 715 or 195 may be connected, adhered, and/or fastened to arms/blades 109 or 194. In embodiments, a fabric cover 715 or 195 may include integrated flexible solar panels. In embodiments, integrated flexible solar panels may be placed in a weather proof housing 735 in a fabric cover 715 or 195 and/or in a weather proof housing in arms/blades 109 or 194. In embodiments, when arm support assemblies are deployed to an open position, the arm support assemblies 108 or 193 may move in a direction as shown by reference number 720 and 725. In other words, arm support assemblies 108 or 193 (and thus the attached arms/blades 109 or 194) move at an angle with respect to a vertical axis coming out of a center support assembly 107 or upper support assembly 1919. In embodiments, as illustrated in FIG. 7, a vertical axis is represented by reference number 730.

Following discussions apply with equal force to embodiments illustrated in FIG. 6A (shading objects and/or intelligent umbrellas) and FIG. 6B (intelligent shading charging system). Reference numbers for both embodiments may be disclosed below. In embodiments, a third motor controller (or motor driver) 605 may receive commands, signals, and/or instructions from a shading object movement control PCB 895 (and/or a shading object computing device 860) to control operation of a third motor 610. In embodiments, a third motor controller 605 may generate commands and/or signals causing a third motor 610 to drive its outside shaft and engage a gearbox assembly 615 (or linear actuator or gearing assembly), which in turn causes movement of a linked arm support assemblies 108 (FIGS. 1A, 1B, 6A) and arm support assemblies 193 (FIGS. 1C and 6B). In embodiments, a linear actuator may incorporate a motor. In embodiments, a potentiometer may act as a control device to limit how much arm support assemblies 108 (or 193) deploy or move away from an upper assembly 112 of a center support assembly 107 (FIGS. 1A and 1B) or (arm support assemblies 193 move away from an upper support assembly 191). In embodiments, for example, a potentiometer may feedback how far and/or much arm support assemblies 108 (or arm support assemblies 193) have been deployed and/or may stop deployment or movement when a predefined distance is reached (or when a full deployment distance is reached). In embodiments, a third motor 610 may comprise a pneumatic motor. In other embodiments, a third motor 610 may comprise a servo motor and/or a stepper motor.

In embodiments, a rotation of a shaft/spindle of a third motor 610 may be transmitted to a threaded rod. In embodiments, a rotation may be transmitted accordingly to a gearing ratio in order to reduce speed transferred to a threaded rod. In embodiments, a gearbox assembly (or linear actuator) may be located between an output shaft of a third motor 610 and may establish a gearing ratio in order to generate necessary torque. In embodiments, a threaded rod is rotated about its own axis and is coupled to a collar via a nut or other fastener. In embodiments, a threaded rod's rotation may cause a collar (or vertical movement assembly) to rotate and/or move in a vertical direction (e.g., in an up or down direction). A movement of a collar in a vertical direction may cause one or more linked arm support assemblies 108 (FIGS. 1A and 1B) or 193 (FIG. 1C) to be moved outward from a shaft of a center support assembly 107 (FIGS. 1A and 1B) or upper support assembly 191 (FIG. 1C) in order to deploy one or more linked arm support assemblies 108 or 193 in an open position (extend outwards and away from an upper assembly 112 or upper support assembly 191). Once one or more linked arm supports are extended and/or deployed, a shading fabric may be attached to arms/blades 109 (FIGS. 1A and 1B) and 194 (FIG. 1C) and/or linked arm supports 108 or 193 of the shading system (or the shading charging system. In embodiments, a shading fabric 715 (FIGS. 1A and 1B) or 195 (FIG. 1C) may be connected to arms/blades 109 or 194 and/or linked arm supports (support assemblies 108—FIGS. 1A and 1B and 193 (FIG. 1C)) before linked arm supports are deployed and/or extended. In this illustrative embodiment, deployment of one or more linked arm assemblies 108 or 193 results in stretching of a shading fabric 715 or 195 between one or more arms/blades 109 or 194 and/or linked arm support assemblies 108 or 193. In embodiments, a shading object and/or a shading charging system may be ready for use to provide shade for a user in an outdoor environment.

Again, the following descriptions apply with equal force to intelligent shading objects and/or umbrellas (FIGS. 1A and 1B) and intelligent shading charging systems (FIG. 1C). Similarly, if a shading object is to be placed in a rest or closed position, in embodiments, a third motor 610 output shaft may be rotated in an opposite direction. In embodiments, a threaded rod may be rotated in an opposite direction (e.g., counterclockwise), and a collar (or vertical movement assembly), which may be coupled and/or connected to the threaded rod, may move in a downward direction. One or more linked arm support assemblies 108 (FIGS. 1A and 1B) or 193 (FIG. 1C), which are linked, coupled, and/or connected to the collar on one end and blades/arms 109 (FIGS. 1A and 1B) and 194 (FIG. 1C) on another end, will drop and/or move from an extended position to an at rest position. In embodiments, a shading object or umbrella may have a plurality of vertical movement assemblies (e.g., collars) linked separately to a plurality of arm support assemblies. In embodiments, linked arms supports may not need to be extended and/or moved together. In embodiments, a separate motor may be connected to one or more linear actuators, which in turn may be linked to a corresponding arm support assembly, so that each of corresponding arm support assemblies may be moved independently.

In embodiments, the linked arm supports (or support assemblies) 108 (FIGS. 1A and 1B) or 193 (FIG. 1C) may come to rest inside a center support assembly 107 or a shading object or upper support assembly 191 of an intelligent shading charging system. In other words, the linked arm supports or linked arm support assemblies 108 (FIGS. 1A and 1B) or 193 (FIG. 1C) may contract or come to rest into and/or inside channels of a center support assembly 107 of the shading object or a shading object or upper support assembly 191 of an intelligent shading charging system. In embodiments, one or more linked arm support assemblies 108 or 193 may rest or be housed in channels of an upper assembly 112 of a center support assembly 107 (or upper support assembly 191), which provides for convenient storage of arm support assemblies. This is more aesthetically pleasing and/or allows for easier movement and/or carrying of the shading object, intelligent umbrella, and/or intelligent shading charging system. In embodiments, a shading object, intelligent umbrella, and/or intelligent shading charging system may comprise between one and 20 linked arm support assemblies 107 and/or arms/blades 108 (or an arm support assemblies 193 and/or arms/blades 194).

Again, the following descriptions apply with equal force to intelligent shading objects and/or umbrellas (FIGS. 1A and 1B) and intelligent shading charging systems (FIG. 1C). In embodiments, a shading object central support may comprise one or more shading object arm support assemblies 108 (FIGS. 1A and 1B) or 193 (FIG. 1C) that are deployed outward from a shading object central support 107 or an upper support assembly 191 (FIG. 1C). In embodiments, shading object blades/arms 109 (FIGS. 1A and 1B) or 194 (FIG. 1C) may be attached and/or connected, respectively, to a shading object central support arm assembly 107 or upper support assembly 191. In embodiments, shading object arms/blades 109 or 194 may be detachably connected to a shading object arm support assembly 108 193. In embodiments, a detachable coupling may occur after shading object arms support assemblies 108 or 193 have been opened and/or deployed. In embodiments, shading object arms or blades 109 or 194 may be coupled and/or connected to shading arm support assemblies 108 or 193 and rest inside a shading object central support assembly 107 or 191 until deployment.

In embodiments, shading object arms/blades may comprise any shape (e.g., rectangular, triangular, circular). In embodiments, shading object arms/blades may have openings in a shape (e.g., rectangle and/or triangle) rather than being a solid price of material. In embodiments, shading arms/blades may form a frame onto which a shading object is attached. In embodiments, a shading object central support may comprise between 1-10 shading object arm supports and 1-20 shading object blades and/or arms). In embodiments, one or more shading object arms may comprise fasteners and/or connectors. In embodiments, a shading fabric may be connected and/or attached to shading arm connectors and/or fasteners. In embodiments, a shading fabric 715 (FIG. 1A or 1B) or 195 (FIG. 1C) may be connected and/or attached to shading arms after deployment of shading arm supports. In embodiments, a shading fabric 715 or 195 may be connected and/or attached to shading arms before shading arms are connected to the shading arm support assemblies.

FIGS. 8A and 8B illustrate a block diagram of hardware and/or combined hardware/software assemblies in a shading object according to embodiments. In addition, FIGS. 8A and 8B also illustrate a block diagram of hardware/software assemblies in an intelligent shading charging system. In embodiments, a shading object, intelligent umbrella, or an intelligent shading charging system may not have one, more than one, or all of listed shading object components and/or assemblies. For example, in embodiments, an intelligent shading charging system may not have all of the sensor identified in FIGS. 8A and 8B but a smaller subset of sensors configured for the outdoor area where the shading charging system is installed. In embodiments, as is illustrated in FIGS. 8A and 8B, a shading object, intelligent umbrella, or intelligent shading charging system may comprise a telemetry printed circuit board (PCB) comprising a processor 805, a weather variable PCB comprising a processor 810, a voice recognition PCB and/or engine 815, a rechargeable battery 820, and one or more solar panels and/or solar panel arrays 825. Although FIGS. 8A and 8B illustrate a PCB housing the above-identified components, circuits or assemblies mounted and/or installed thereon, components, circuits and/or assemblies may be one or more PCBs, circuit boards, or other assemblies and should not be limited to PCBs.

In embodiments, a shading object, intelligent umbrella, or intelligent shading charging system may comprise a power tracking solar charger 830, a power input or power source (e.g., AC adapter assembly) 835, a lighting assembly 870, an audio system 875 and/or a shading object computing device 860. In embodiments, a shading object, intelligent umbrella, or intelligent shading charging system may include an obstacle detection module 855, a motion sensor 845, a proximity sensor 840, a tilt sensor 855, a personal area network communications module or transceiver 865, a first motor controller and motor (azimuth motor and controller) 880, a second motor controller and motor (elevation motor and controller) 885, and a third motor controller and motor (an actuator motor and controller) 890, a motion control PCB 895, and/or a computing device 860. In embodiments, a weather variable PCB 810 may be coupled and/or connected to one or more air quality sensors 811, UV radiation sensors 812, a digital barometer sensor 813, a temperature sensor 814, a humidity sensor 816, and/or a wind speed sensor 817. In embodiments, a wind sensor 817 may be a thermistor. In embodiments, a telemetry PCB 805 may be coupled and/or connected to a GPS/GNSS sensor 807 and/or a digital compass 808.

In embodiments, a shading object, intelligent umbrella, or intelligent shading charging system may comprise a telemetry printed circuit board (PCB) comprising a processor 805 and the telemetry PCB may provide potential location and orientation information. In embodiments, a weather variable PCB comprising a processor 810 may provide sensor weather variables surrounding a shading object, an intelligent umbrella, or an intelligent shading charging system. Again, although a PCB is described, components, assemblies, and/or circuits may be installed on a number of assemblies, boards, flex circuits, or other similar assemblies.

In embodiments, a wind sensor 817 may detect a high wind conditions, generate signals, and an umbrella movement control PCB 895, or other controller, may generate signals and/or commands causing arm support assemblies to close or move to a closed position. In embodiments, if a wind sensor initially measures a wind speed above a certain threshold, then arm support assemblies may never deploy because the shading object, intelligent umbrella, and/or intelligent shading charging system has determined that a dangerous condition exists.

In embodiments, a voice recognition engine or module 815 may enable control of a shading object, intelligent umbrella, or intelligent shading charging system via voice commands and/or a microphone. In embodiments, a voice recognition engine or module 815 may generate voice responses and/or audible warnings. In embodiments, a rechargeable battery 820 may be charged or powered by an AC adapter, a DC adapter, and/or an array of solar cells 825, which provide power (e.g., current and/or voltage) to a power tracking solar charger 830 and other assemblies and/or components. In embodiments, a power tracking solar charger 830 may regulate and balance a charging process. In addition, a power tracking solar charger 830 may provide data and/or information regarding a charging state. In embodiments, an AC adapter 835 and/or a DC adapter may plug into a power source (e.g., a wall outlet and/or a generator) and provide power (primarily or secondarily) to a shading object, intelligent umbrella, or intelligent shading charging system.

In embodiments, a proximity sensor 840 may identify location of a person relative to moving components of a shading object or umbrella. In embodiments, a motion sensor 845 may detect and/or identify a presence of an individual in an area around a shading object or umbrella. In embodiments, an obstacle detector 850 may detect presence of a person and/or object in a shading object's path of travel. In embodiments, a tilt sensor 855 may detect movement and/or relocation of a shading object and/or umbrella with respect to a correct position. In embodiments, a personal area network (PAN) (e.g., Bluetooth) module 865 and/or transceiver may provide short distance communication for application based control, audio sound transmission and/or data processing and/or retrieval. In embodiments, a lighting assembly 870 may provide and/or project light for a shading object and/or an area around a shading object. In embodiments, an audio system 875 may provide or generate audio playback through a mobile application of WiFi stream or through a PAN (e.g., Bluetooth) transceiver 865.

In embodiments, a shading object, intelligent umbrella, or intelligent shading charging system may comprise one or more printed circuit boards. Although a description may reference a specific printed circuit board, many of features or functions of a shading object or umbrella may be implemented utilizing components mounted on a single, two or three circuit boards. In other words, a number of circuit boards may be utilized to provide features and/or functions of a shading object and/or umbrella although embodiments described herein may only describe a specific number. Although the term "circuit board" or "printed circuit board" is utilized, any electronic device allowing installation on and communicate with components may be utilized along with circuit board. As used in this specification, the terms "printed circuit board" and "PCB" are intended to refer generally to any structure used to mechanically support and electrically connect electronic components using conductive pathways, tracks, or signal traces etched from (e.g., copper) sheets laminated onto a non-conductive substrate. Synonyms for printed circuit boards include printed wiring boards and etched wiring boards.

In embodiments, a shading object, intelligent umbrella, or intelligent shading charging system may comprise one or more printed circuit boards. In embodiments, a shading object, intelligent umbrella, or intelligent shading charging system 800 may comprise a movement control PCB 895, a shading object computing device or computing device PCB 860, a first motor PCB (azimuth control) 880, a second motor PCB (elevation control) 885, a third motor PCB (actuation/deployment control) 890, a telemetry PCB (location and orientation data/information collection) 805, and/or a weather variable PCB (environmental sensor data/information collection) 810.

In embodiments, a telemetry PCB 805 comprises a processor, a memory, a GPS receiver and/or transceiver and/or a compass (e.g. a digital) compass). The GPS receiver and/or compass provides location and orientation information and/or measurements which may be transferred to a memory utilizing a processor. In embodiments, a telemetry PCB processes and conditions the communicated information and/or measurements. In embodiments, a telemetry PCB 805 communicates measurements and/or additional information (e.g., in some cases, measurements are conditioned and processed and in some cases, measurements are raw data) to a shading object movement control PCB 895 which analyzes the received location and/or orientation information and measurements.

In embodiments, a weather variable PCB 810 comprises a processor, a memory, an air quality sensor 811, a UV radiation sensor 812, a barometer 813, a temperature sensor 814, a humidity sensor 816, and/or a wind speed sensor 817. One or more of the listed sensors may generate environmental and/or weather measurements and/or information, which may be transferred to a memory utilizing a processor. In embodiments, a weather variable PCB 810 processes and conditions information and measurements from the one or more sensors. In embodiments, a weather variable PCB 810 communicates received environmental and/or weather sensor measurements (e.g., in some cases conditioned and processed and in some cases raw data) to a shading object movement control PCB 895 or other controller which analyzes the received location and/or orientation information and measurements.

In embodiments, a center support assembly 107 (FIGS. 1A and 1B) or an upper support assembly 191 (FIG. 1C) may comprise an umbrella movement control PCB 895, as well as an integrated computing device PCB 860. In embodiments, a movement control PCB 895 may also be located in a stem assembly 106 and/or a base assembly 105 (FIGS. 1A and 1B) or a lower support assembly 187 (FIG. 1C). In embodiments, other terms may be utilized in place of circuit board, such as printed circuit board, a flexible circuit board, and/or an integrated circuit. In embodiments, an umbrella movement control PCB 895 may consume a low amount of power and may be referred to as a low-power PCB. In embodiments, this may prove to be a benefit as compared to prior-art umbrellas which utilized a large amount of power and thus needed to have power from a power source and could not be powered by an array of solar cells providing power to a solar power charger 830. In embodiments, a solar array may provide enough provide power to power components on an umbrella movement control PCB 895. In this case, for example, components and associated activities controlled by an umbrella movement circuit PCB 895 may not consumer large amounts of power because these activities do not require continuous operation and may only receive information or measurements on a periodic basis. In embodiments, another controller or assembly may control movements of a shading object, intelligent umbrella, and/or intelligent shading charging assembly and the controller or assembly may also require low power.

As an example, an intelligent shading object, intelligent umbrella, or intelligent shading charging system 800 may not be rotating and/or tilting frequently. Thus, in embodiments, therefore, sensors providing these measurements (e.g., a tilt sensor or sunlight sensor), and a movement control PCB 895 communicating these measurements may not need to be in an active state at all times, which results in significant power usage savings for a shading object and/or controller. In embodiments, a motion control PCB 895 may comprise a processor 896, a non-volatile memory 897, a volatile memory, and many other components described above and below. In embodiments, for example, computer-readable instructions may be fetched from a non-volatile memory 897, loaded into a volatile memory 898, and executed by a processor 896 to perform actions assigned to, controlled and/or commanded a motion control PCB 895. In embodiments, non-volatile memory may be flash memory, ASIC, ROMs, PROMs, EEPROMs, solid state memory, CD, DVD, persistent optical storage or magnetic storage media.

In embodiments, as a further example, shading object motors, (e.g., a first motor (azimuth movement motor), a second motor (elevation movement motor), and/or a third motor (articulation or actuator movement motor)) may not be utilized frequently, so there does not need to be a large amount of power utilized by these motors within a shading object, intelligent umbrella, and/or intelligent shading charging system. In embodiments, when motors and/or motor assemblies are operating, motors may require 2 to 3 amps. If a shading object, intelligent umbrella, or intelligent shading charging system is idle and for example, the shading object computing device is not operating, an intelligent shading object, intelligent umbrella, or intelligent shading charging system may only require 180 milliamps. If an audio system is operating, e.g., music is playing and the amplifier and speakers are being utilized, only 400-500 milliamps, In addition, motor controllers may not be utilized frequently since the motor controllers may not be driving and/or sending commands, instructions, and/or signals to motors frequently. Thus, a low-power movement control PCB 895 (or other circuit, assembly or component) may provide a shading object, intelligent umbrella, or intelligent shading charging system owner with power usage savings and efficiency.

In embodiments, readings and/or measurements from sensors may cause a movement control PCB 895 (or other circuit or assembly) to transmit commands, messages, instructions, and/or signals to either a first motor control PCB 880 (azimuth movement), a second motor control PCB 885 (elevation movement), and/or a third motor control PCB 890 (actuation movement), in order to cause specific movements of different assemblies of a shading object, intelligent umbrella, or intelligent shading charging system. For example, in embodiments, a GPS transceiver 806 may receive GPS signals and provide GPS measurements (e.g., values representative of a longitude, latitude, and/or an altitude reading) to a movement control PCB 895. In embodiments, a movement control PCB 895 may analyze the GPS measurements and determine that a shading object, intelligent umbrella, or intelligent shading charging system may be moved to a specific elevation. In other words, in embodiments, a movement control PCB 895 may utilize GPS generated measurements to direct a second motor assembly to move to a proper elevation. In embodiments, GPS measurements (coordinates and time) identify a proper elevation of the sun based on a geographic location. In embodiments after center support assembly 107 (FIGS. 1A and 1B) or lower support assembly 187 (FIG. 1C) is moved to a position identified by GPS measurements, arm support assemblies 108 or 193 may be extended and the arms and/or blades 109 or 194 may be fully deployed. In embodiments, a movement control PCB 896 may communicate commands, instructions, and/or signals to a second motor control PCB 885 to cause an upper assembly 112 of a center support assembly 107 of FIGS. 1A and 1B (or upper support assembly 191 of FIG. 1C) to rotate or move approximately 45 degrees in a downward direction with respect to a lower assembly 113 of the center support assembly of FIG. 1A or 1B (or lower support assembly 187 of FIG. 1C). In embodiments, continuing with this illustrative embodiment, a movement control PCB 895 may communicate commands, instructions, and/or signals to a third motor control PCB to fully extend arm support assemblies 108 (e.g. articulating blades/assemblies) or 193 and also arms/blades 109 or 194.

In embodiments, a digital compass 807 may generate a heading and/or orientation measurement and a telemetry PCB 805 may communicate a heading and/or orientation measurement to a movement control PCB 895. In embodiments, a movement control PCB 895 may analyze a heading measurement and generate and/or communicate commands, instructions, and/or signals to a first control PCB 880 to rotate a stem assembly 106 and a center support assembly 107 (FIGS. 1A and 1B) or lower support assembly 187 (FIG. 1C) to face or move the shading object, intelligent umbrella, or intelligent shading charging system towards a light source (e.g., a sun). In embodiments, digital compass measurements may be utilized as directional input for an azimuth (or first motor). In embodiments, a movement control PCB 895 may calculate counts and/or limits for motors to properly orient an intelligent shading object based on GPS measurements and/or digital compass measurements. Continuing with this embodiment, a movement control PCB 895 may generate and/or communicate commands, messages, instructions, and/or signals to a third motor controller PCB 890 to cause arm support assemblies 108 or 193 to be extended or deployed along with arms/blades 109 or 194.

In embodiments, a wind speed sensor 817 may generate measurements and a variable weather PCB 810 may communicate measurements to a movement control PCB 895 (or other circuit or assembly). In embodiments, a movement control PCB 895 may analyze and/or compare communicated measurements to a threshold in order to determine if unsafe conditions are present. In embodiments, for example, if a wind speed threshold is reached or exceeded, identifying an unsafe condition, a movement control PCB 895 may communicate commands, instructions, and/or signals to move shading object assemblies to a rest position. Continuing with this illustrative example, a movement control PCB 895 may communicate commands, messages, or instructions or signals to a second movement control PCB to cause an upper assembly 112 or upper support assembly 191 to move to an original position (e.g., at rest position), which may be where an upper assembly 112 or 191 is a vertical extension of a lower assembly 113 (FIGS. 1A and 1B) or lower support assembly (FIG. 1C). In embodiments, a movement control PCB 895 may communicate instructions, messages, commands and/or signals to a third motor control PCB 890 to move arm support assemblies 108 or 193 back into an upper assembly and/or retract arm support assemblies 108 or 193 into channels of an upper assembly 112 or 191. In embodiments, a movement control PCB 895 may communicate commands, messages, instructions and/or signals to a sound reproduction system 875 and/or a display device to warn a user of unsafe wind conditions.

In embodiments, a first motor control PCB 880, a second motor control PCB 885, a third motor control PCB 890 and a movement control PCB 895 may be connected to each other via wires and/or traces and instructions may, commands and/or signals may be communicated via wires and/or traces. In embodiments, the motor control PCBs 880, 885 and 890 may communicate with a movement control PCB 895 via a personal area network communications protocol, e.g., Bluetooth. In embodiments, a weather variable PCB 810 and/or a telemetry PCB 805 may communicate with a movement control PCB 895 via wires, traces, integrated circuits, and/or interfaces and communicate instructions, commands or signals. In embodiments, a weather variable PCB 810 and a telemetry PCB 805 may communicate with a movement control PCB 895 via personal area network protocols (utilizing a PAN transceiver—e.g., a Bluetooth transceiver) and/or other wireless communication protocols. In embodiments, motor control PCBs 880 885 890 may communicate directly (either via wires and/or a wireless communication protocol) with a weather variable PCB 810 and/or a telemetry PCB 805 without utilizing a computing device 860 and/or a movement control PCB 895.

In embodiments, as described above, a shading object, intelligent umbrella, or intelligent shading charging system may comprise a computing device PCB, which may comprise an integrated or separate computing device 860. In embodiments, a shading object, intelligent umbrella, or intelligent shading charging system may comprise a computing device 860 which is not installed and/or mounted on a computing device PCB. In embodiments, a computing device 860 and/or a computing device PCB may consume a larger amount of power (with respect to movement control PCB 895) due to activities it is responsible for executing being performed more frequently, intensively, and/or that require a higher data throughput. In embodiments, an integrated computing device 860 is separate and apart from a computing device, controller, or processor that controls motor operation in a shading object, intelligent umbrella, and/or intelligent shading charging assembly. In embodiments, for example, an integrated computing device 860 may be responsible for camera control, video and/or image processing, external Wi-Fi communication, e.g., such as operating as a hot spot, as well as running various software applications associated with the intelligent shading object, intelligent umbrella, or intelligent shading charging system. The computing device 860, because of operating and being responsible for more data intensive features and/or functions, may require more processing power due to extended operation in terms of time and continuous data throughput during operational time. In embodiments, a computing device may be integrated into or installed within a center support assembly 107, a base assembly, a stem assembly (FIGS. 1A and 1B) of a shading object or intelligent umbrella, or a lower support assembly 187 or an upper support assembly 191 (FIG. 1C) of an intelligent shading charging system.

Figure 9:
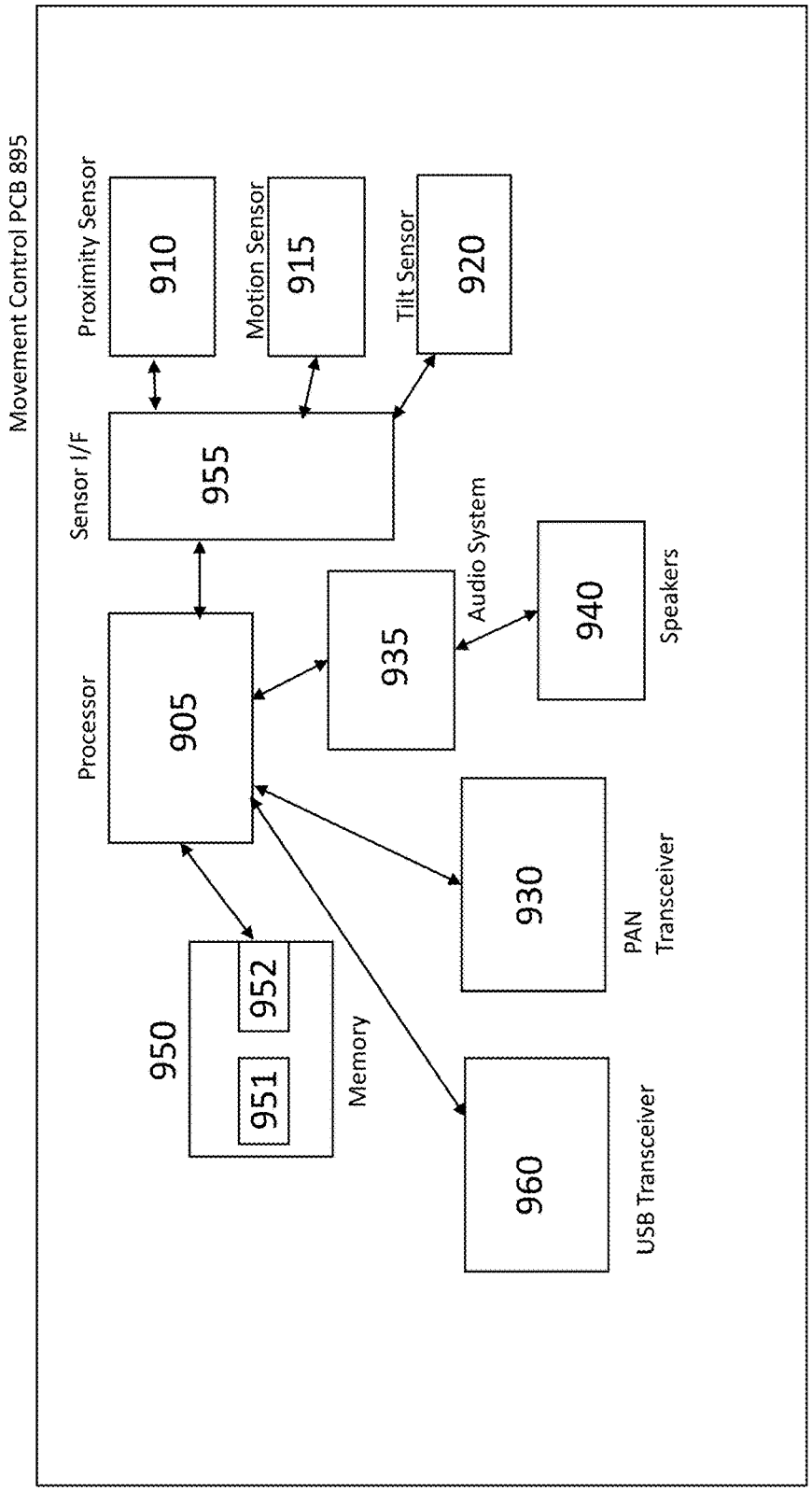
FIG. 9 illustrates a block diagram with data and command flow of a movement control PCB according to embodiments.

FIG. 9 illustrates a block diagram of a movement control PCB according to embodiments. Returning back to discussion of a movement control PCB, in embodiments, a movement control PCB 895 (or other circuit or assembly) may comprise a processor/controller 905, a proximity sensor 910, a motion sensor 915, a tilt sensor 920, a personal area network transceiver 930, an audio transceiver 935, one or more speakers 940, and/or a memory 950 having shading object, intelligent umbrella, or intelligent shading charging system control software (e.g., executable instructions stored in a non-volatile memory 951, loaded into memory 950 and executable by a processor 905). In embodiments, an umbrella movement control PCB 895 may comprise a USB transceiver 960. In embodiments, an umbrella movement control PCB 895 may comprise sensor interface subsystem 955 for communicating sensor measurements to a movement control PCB 895 and communicating messages, instructions, commands and/or signals from and two to external sensors. In embodiments, a sensor interface subsystem 955 may be located, or may also be located on a telemetry PCB 805, a weather variable PCB 810, and/or first, second, or third motor control PCBs 880, 885, and 890. For example, in embodiments, an intelligent shading object, intelligent umbrella, or intelligent shading charging system may also include a signal conditioning subsystem which may also be referred to as a sensor interface system and the terms may be utilized interchangeably throughout the specification.

In embodiments, an intelligent shading object, intelligent umbrella, or intelligent shading charging system (and the signal conditioning subsystem) may further comprise one or more reference signal modules, one or more signal conditioning modules, and one or more analog-to-digital converters. In an embodiment, one or more sensors (e.g., air quality sensor 811, UV radiation sensor 812, wind speed sensor 817, motion sensor 845, and/or tilt sensor 855) may receive communicated analog signals and may transmit analog signals to signal conditioning modules 955. In embodiments, a signal conditioning module 955 may process and/or condition communicated analog sensor signals. Although signals are described as being analog, the description herein equally applies to digital signals. In embodiments, one or more signal conditioning modules may communicate and/or transfer processed and/or conditioned signals to one or more A-to-D converters. In embodiments, one or more signal reference modules may be a non-volatile memory, or other storage device, that stores and/or retrieves signal values that the communicated signal values may be compared to in order to determine if threshold conditions may be met. In embodiments, a comparison of communicated signal values to reference signal values may allow a signal conditioning system to understand if normal conditions are being experienced by an intelligent shading object, intelligent umbrella, or intelligent shading charging system, or if an intelligent shading object subsystem may be experiencing abnormal conditions, (e.g., high humidity, high movement, high wind, and/or bad air quality). Operation and/or location of movement control PCB, sensors, components and assemblies are described in detail in U.S. patent application Ser. No. 15/160,856, filed May 20, 2016, entitled "Automated Intelligent Shading Objects and Computer-Readable Instructions for Interfacing With, Communicating With and Controlling a Shading Object" and U.S. patent application Ser. No. 15/160,822, filed May 20, 2016, entitled "Intelligent Shading Objects with Integrated Computing Device," both of which are hereby incorporated by reference In embodiments, an umbrella movement control PCB 895 may comprise a proximity sensor 840. In embodiments, a proximity sensor 840 may be able to detect a presence of nearby objects, (e.g., people or other physical objects) without any physical contact between a sensor and an object. In embodiments, an umbrella movement control PCB 895 may comprise a motion sensor 845. In embodiments, a motion sensor 845 may generate a signal and/or measurement indicating that an individual, a living organism, or an object is within an area covered by a motion sensor 845. For example, a motion sensor 845 may generate a signal if an individual and/or object is approaching a shading object and/or umbrella, is within 5 or 10 feet of an umbrella, or is moving within a shading area. In embodiments, an umbrella movement control PCB 895 may comprise a USB transceiver 877. In embodiments, a USB transceiver 877 may be a chip that implements hardware portions of a USB protocol for a device, e.g., a shading object. In embodiments, a USB transceiver 877 may comprise an integrated USB port 878. Operation and/or location of USB transceivers, motion sensors, and/or proximity sensors are described in detail in U.S. patent application Ser. No. 15/160,856, filed May 20, 2016, entitled "Automated Intelligent Shading Objects and Computer-Readable Instructions for Interfacing With, Communicating With and Controlling a Shading Object" and U.S. patent application Ser. No. 15/160,822, filed May 20, 2016, entitled "Intelligent Shading Objects with Integrated Computing Device," both of which are hereby incorporated by reference.

In embodiments, an umbrella movement control PCB 895 may comprise an audio/video transceiver 865, a stereo amplifier 875, and/or one or more sound reproducers (e.g., speakers) 875. In embodiments, an audio/video transceiver 865 may be a Bluetooth Audio MP3 transceiver. In embodiments, an audio/video transceiver 875 may receive wirelessly transmitted audio and/or video signals from an audio source such as a portable electronic device, a cellular phone, an iPod, an audio player, and/or a personal computer. In embodiments, a wireless transmission protocol may be a Bluetooth protocol for transmitting audio/video, although other protocols may be utilized. In embodiments, a portable electronic device may establish a communications channel by pairing with an audio/video transceiver, e.g., utilizing a Bluetooth protocol, in a shading object.

In embodiments, a shading object may comprise a shading fabric 715 (FIGS. 1A and 1B) and 195 (FIG. 1C) and one or more solar cells or solar cell arrays 110 (FIGS. 1A and 1B) and 196 (FIG. 1C). In embodiments, one or more strips or arrays of solar cells or solar cell arrays 110 or 196 or may be placed on a top surface of a shading fabric 715 or 195. In embodiments, one or more strips of solar cells or solar cell arrays may be integrated into (or woven into or be a part of) a shading fabric 715 or 195. In embodiments, solar cells or solar cell arrays 110 or 196 may also be comprised of a flexible material. In embodiments, a shading fabric 715 or 195 may be coupled, connected and/or attached to a frame or support assembly (e.g., arm support assemblies 108 (FIGS. 1A and 1B)) and one or more strips of solar cells or solar cell arrays 110 or 196 may be placed on and/or attached to a top surface of an arm support assembly 108 or 194. In embodiments, arm support assemblies 108 or 194 may comprise a recess or a channel where solar cells or solar cell arrays 110 or 196 may be placed and/or inserted. In embodiments, one or more strips of solar cells or solar cell arrays 110 or 196 may form a pattern on a top surface of a shading object. Continuing with this illustrative embodiment, by forming solar cells in specific patterns, one or more strips of solar cells or solar cell arrays 110 or 196 may be capture sunlight and/or other ultraviolet light from a number of directions and/or thus, intensities.

Figure 11:
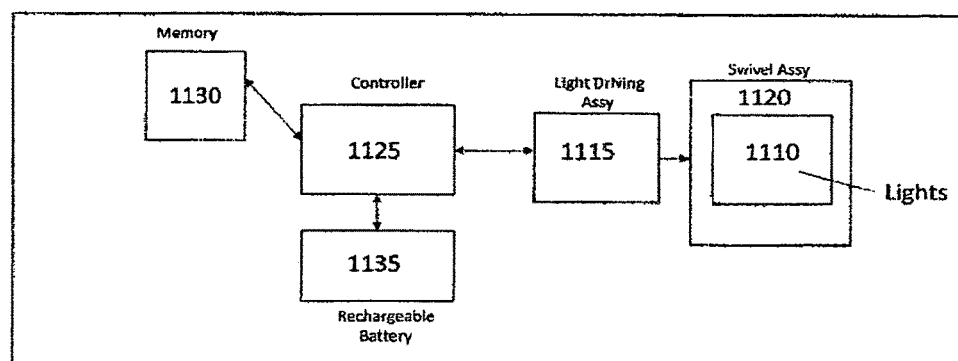
FIG. 11 illustrates a lighting subsystem according to embodiments.

FIG. 11 illustrates a lighting subsystem according to embodiments. In embodiments, a shading object may comprising a lighting subsystem 870. In embodiments, a shading object central support assembly 107 comprises a lighting subsystem 870 installed therein and/or thereon. In embodiments, a solar panel charging system 830 may transfer and/or provide power (e.g., voltage and/or current) to a lighting subsystem 870. In embodiments, a rechargeable battery 820 or 1135 may provide power (e.g., voltage and/or current) to a lighting subsystem 870. In embodiments, a plurality of LED lights 1110 may be integrated into a one or more of shading arm support assemblies 108. In embodiments, one or more LED lights 1110 may be activated and/or turned on via a manual switch. In embodiments, a shading object motion control PCB 895 may communicate commands, instructions, and/or signals to a lighting subsystem 870 based on different environmental conditions and/or situations (e.g., it is a certain time of a day, there is no light due to cloud cover and/or darkness, or a shading object detects movement in an area). In embodiments, LED lights 1110 integrated into or attached to shading object arm support assemblies and may direct light in a downward manner directly towards or at a certain angle to a ground surface. In embodiments, a lighting subsystem 870 (e.g., one or more LED lights) may be integrated into or installed within a shading object central support assembly 107. In embodiments, a lighting system may include a lighting ballast (or lighting driver) 1115 and one or more LED lights 1110. In embodiments, when LED lights 1110 are turned on (and/or activated), one or more LED lights 1110 may direct light beams outward (e.g., in a horizontal direction) from a central support assembly 107. In embodiments, one or more LED lights may be directed at a 90 degree angle from a center support assembly 107 vertical axis. In embodiments, LED lights may be installed in a swiveling assembly 1120 and LED lights 1110 may transmit light (or light beams) at an angle of 0 to 175 degrees from a shading object central support 107 vertical axis. In embodiments, a lighting subsystem 870 may comprise a processor or microcontroller 1125, a lighting driver 1115, a memory 1130, and/or one or more LED lights 1110. In embodiments, a processor or microcontroller 1125, a lighting driver 1115, and/or a memory 1130 may be installed on lighting PCB. In embodiments, a shading object motion control PCB 895 may transmit commands, instructions and/or signals to a processor or microcontroller 1125 to activate or deactivate one or more LED lights 1110. In embodiments, a microcontroller or processor 1125 may communicate pulses of voltage and/or current to a lighting driver 1115, which in turn communicates pulses of voltage and/or current to one or more LED lights 1110. In embodiments, communicating pulses of voltage and/or current to a lighting driver 1115 and/or one or more LED lights 1110, saves a shading object power, due to only providing power a smaller amount of time. This method allows a shading object to conserve a large amount of energy when an object is used in a dark environment (e.g., night time). In embodiments, between 10 and 80 percent of power may be saved utilizing this method. In embodiments, one or more LED lights 1110 may be mounted on or installed within a center support assembly 107. In embodiments, one or more LED lights 1110 may be directed to shine lines in an upward direction (e.g., more vertical direction) towards arms/blades 109 and/or a shading fabric of a shading object. In embodiments, a bottom surface of a shading fabric may reflect light beams from one or more LED lights 1110 back to a surrounding area of a shading object (e.g., shading object). In an embodiment, a shading fabric may have a reflective bottom surface to assist in reflecting light from the LED lights 1110 back to the shading area. In embodiments, a solar panel charging system 830 and/or solar panel arrays 196 may transfer and/or provide power (e.g., voltage and/or current) to one or more first lighting assemblies 199 and/or a second lighting subsystem 198. In embodiments, a rechargeable battery in a battery charging assembly 184 may provide power (e.g., voltage and/or current) to one or more first lighting assemblies 199 and/or a second lighting subsystem 198. In embodiments, one or more first lighting assemblies 199 and/or a second lighting subsystem 198 may be activated and/or turned on via a manual switch.

In embodiments, a controller, processor, and/or microcontroller may communicate commands, instructions, and/or signals to one or more first lighting assemblies 199 and/or a second lighting subsystem 198 based on different environmental conditions and/or situations (e.g., it is a certain time of a day, there is no light due to cloud cover and/or darkness, or movement is detected in an area surrounding an intelligent shading charging system).

FIG. 11 also illustrates one or more first lighting assemblies 199 and/or a second lighting subsystem 198 according to embodiments. In embodiments, one or more first lighting assemblies 199 and/or a second lighting subsystem 198 may comprise a processor or microcontroller 1125, a lighting driver 1115, a memory 1130, and/or one or more LED lights 1110 (or other lighting elements). In embodiments, a processor or microcontroller 1125, a lighting driver 1115, and/or a memory 1130 may be installed on lighting PCB or other similar structure.

In embodiments, a motion controller, processor, and/or microcontroller 895 may communicate and/or transmit commands, instructions and/or signals to a processor or microcontroller 1125 to activate or deactivate one or more LED lights 1110 (or other lighting elements). In embodiments, a microcontroller or processor 1125 may communicate and/or transmit pulses of voltage and/or current to a lighting driver 1115, which in turn communicates pulses of voltage and/or current to one or more LED lights 1110.

In embodiments, communicating pulses of voltage and/or current to a lighting driver 1115 and/or one or more LED lights 1110, saves a shading object, intelligent umbrella, or intelligent shading charging system power, due to only providing power a smaller amount of time. This method allows a shading object, intelligent umbrella, or intelligent shading charging system to conserve a large amount of energy when an object is used in a dark environment (e.g., night time). In embodiments, between 10 and 80 percent of power may be saved utilizing this method.

In embodiments, a solar panel charging system 830 and/or solar panel arrays 196 may transfer and/or provide power (e.g., voltage and/or current) to one or more first lighting assemblies 199 and/or a second lighting subsystem 198. In embodiments, a rechargeable battery in a battery charging assembly 184 may provide power (e.g., voltage and/or current) to one or more first lighting assemblies 199 and/or a second lighting subsystem 198. In embodiments, one or more first lighting assemblies 199 and/or a second lighting subsystem 198 may be activated and/or turned on via a manual switch.

In embodiments, a controller, processor, and/or microcontroller may communicate commands, instructions, and/or signals to one or more first lighting assemblies 199 and/or a second lighting subsystem 198 based on different environmental conditions and/or situations (e.g., it is a certain time of a day, there is no light due to cloud cover and/or darkness, or movement is detected in an area surrounding an intelligent shading charging system).

Figure 12:
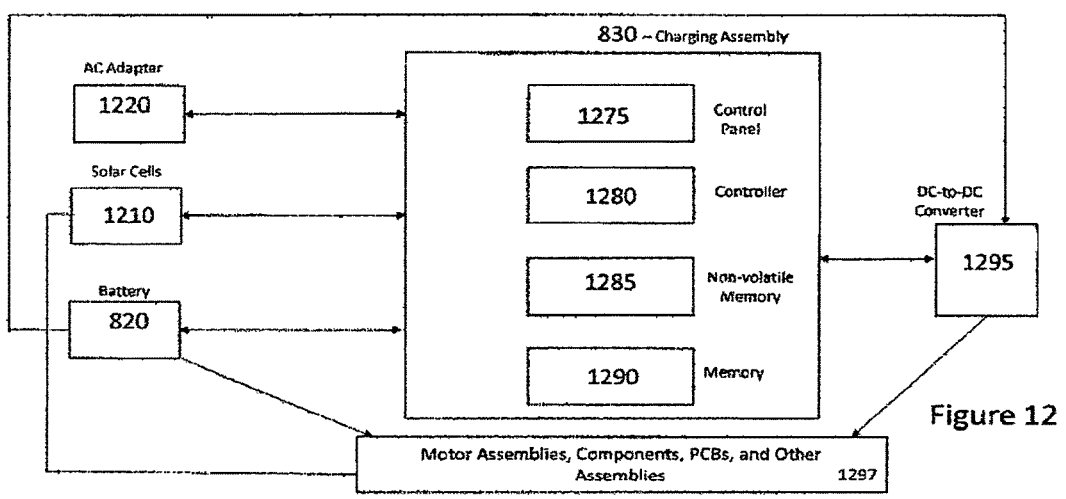
FIG. 12 illustrates a power subsystem according to embodiments.

FIG. 12 illustrates a power subsystem according to embodiments. In embodiments, a shading object, an intelligent umbrella, or an intelligent shading charging system may comprise a power tracking solar charger 830. Descriptions of power tracking solar charger applies with equal force to shading objects, intelligent umbrella, and/or intelligent shading charging systems. In embodiments, a center support assembly 107 (FIG. 1A or 1B) of a shading object or intelligent umbrella or a lower support assembly 187 or upper support assembly 191 (FIG. 1C) may comprise and/or house a power tracking solar charger 830. Continuing with this illustrative embodiment, a power tracking solar charger 830 may be located in and/or on an upper assembly 112 of a center support assembly 107, or alternatively in or on a bottom assembly 114 of a center support assembly 107 (FIGS. 1A and 1B), or a lower support assembly 187 or an upper support assembly 191 (FIG. 1C). In embodiments, a power tracking solar charger 830 may be connected to one or more solar cells 1210, a rechargeable battery 820, and/or an AC adapter 835 or 1220. In embodiments, a PV array 1210 or 110 may comprise one of more of the strips of solar cells. In embodiments, a PV array 1210 or 110 may comprise one solar cell strip. In embodiments, one or more solar cells 1210 (e.g., a PV array 1210) may provide power directly to a power tracking solar charger 830 and/or a rechargeable battery 820. In embodiments, one or more solar cells 1210 (or solar arrays) may provide power to motor assemblies, components, printed circuit boards, and/or other assemblies 1297 in an intelligent shading object, intelligent umbrella and/or intelligent shading charging assembly.

In embodiments, a power tracking solar charger 830 may be coupled and/or connected to a rechargeable battery 820. In embodiments, a power tracking solar charger 830 may be coupled and/or connected to an AC adapter 835 (or DC power adapter), which is coupled and/or connected to a power source. In embodiments, a charging assembly 830 may be coupled to one or more solar cells 1210 or solar arrays.

In embodiments, a power tracking solar charger 830 may include a control panel 1275, a controller 1280, a non-volatile memory 1285 and a volatile memory 1290, the non-volatile memory 1285 comprising computer-readable and computer-executable instructions, which are fetched and loaded into volatile memory 1290 for execution by a controller or processor 1280 to perform a power monitoring, tracking and distribution process. In embodiments, a power monitoring, tracking and/or distribution process may monitor power levels and/or power conditions of different components of a shading object, intelligent umbrella and/or intelligent shading charging system (e.g., a motion control PCB 895, arrays of solar cells 110 1210), a rechargeable battery 820). In embodiments, a power monitoring, tracking and/or distribution process may monitor power levels and/or power conditions of a plurality of shading objects, intelligent umbrellas, and/or intelligent shading, charging systems. For example, power levels and/or power conditions for shading objects, umbrellas, and shading charging systems located in a parking lot, outside plaza, sport or event fields may be monitored and/or tracked. In embodiments, a power tracking and monitoring process may communicate information regarding power levels and/or power conditions of a solar charger 830 (and other shading object components) to a control panel 1275 and/or to a portable electronic device to display to a user and/or owner. In embodiments, a power tracking and monitoring process may communicate information regarding power levels and/or power conditions of shading objects, umbrellas and/or intelligent shading charging systems (and other shading object components) to a control panel 1275, a computing device, and/or to a portable electronic device to display to a user and/or owner of the shading objects, umbrellas and/or intelligent shading charging systems.

In embodiments, a power tracking solar charger 830 may transfer incoming power (e.g., voltage and/or current) generated by the solar cells to one or more converters (e.g., a DC-to-DC converters) 1295. In embodiments, a rechargeable battery 820 may provide power (e.g., voltage and/or current) to a DC-to-DC converter 1295. In embodiments, one or more DC-to-DC converters 1295 may transfer voltage and/or current to one or more PCBs, components, motor assemblies, and/or other assemblies of a shading object, intelligent umbrella, and/or intelligent shading charging system. In embodiments, a DC-to-DC converter 1295 may be utilized to provide lower operating voltages, e.g., 3.3 VDC or 5.0 VDC or other voltages, to components, boards and/or assemblies 1297 operating on a lower DC voltage. In embodiments, rechargeable battery 820 may transfer incoming power (e.g., voltage and/or current) to one or more converters 1295, and a power charger 830 may monitor power distribution and power levels. In embodiments, a rechargeable battery 820 may provide power to shading object or umbrella motor assemblies, PCBs, components, and/or assemblies 1297. If high power requirements are existing due to operating conditions (e.g., motors running), a rechargeable battery 820 and solar cells or solar cell arrays may both provide power to one or more PCBs, components, motor assemblies, and/or other assemblies of a shading object.

In embodiments, a shading object, intelligent umbrella and intelligent shading charging system may comprise a voice recognition engine 815. In embodiments, a motion control PCB 895 may have a voice recognition engine 815 mounted and/or located thereon. In embodiments, an integrated computing device 860 may have a voice recognition engine mounted on and/or located thereon. In embodiments, a voice recognition engine 815 may be mounted separately from a motion control PCB 895 and/or a computing device 860. In embodiments, a voice recognition PCB may comprise a processor, non-volatile and/or volatile memory components, and a voice recognition engine. Operation and/or location of a voice recognition engine are described in detail in U.S. patent application Ser. No. 15/160,856, filed May 20, 2016, entitled "Automated Intelligent Shading Objects and Computer-Readable Instructions for Interfacing With, Communicating With and Controlling a Shading Object" and U.S. patent application Ser. No. 15/160,822, filed May 20, 2016, entitled "Intelligent Shading Objects with Integrated Computing Device," both of which are hereby incorporated by reference. In embodiments, a voice recognition engine or module 815 allows users and/or individuals to speak to a shading object, intelligent umbrella, and/or intelligent shading charging system to communicate with a shading object, intelligent umbrella, and/or intelligent shading charging system and/or external devices (e.g., portable electronic devices and/or cameras) coupled to a shading object, intelligent umbrella, or intelligent shading charging system. In addition, a voice recognition engine 815 may synthesize speech from received commands (e.g., text commands) and may talk to an individual. In embodiments, computer-readable and computer-executable instructions may be fetched from a non-volatile memory, stored in a volatile memory, and executed by a processor to recognize an individuals' voice and/or implement a voice recognition process. In embodiments, a voice recognition engine 815 may recognized preprogrammed voice commands. In embodiments, a voice recognition engine 815 may allow training and/or incorporating of new commands. In embodiments, if commands are successfully translated and/or converted, a voice recognition engine 815 may communicate a conformation audio signal to an audio amplifier 875 and/or one or more speakers 940. In embodiments, commands may be open, close, deploy, retract, rotate, move, turn on lights, turn on music, and/or activate solar power, etc. In embodiments, a voice recognition engine 815 may also have a speech synthesizer. In embodiments, a voice synthesizer in a voice recognition engine 815 may allow for an intelligent shading object, intelligent umbrella, and/or intelligent shading charging system to talk to individuals within an area surrounding and/or adjacent to a shading object, intelligent umbrella, and/or intelligent shading charging system. In embodiments, a voice recognition engine 815 may generate voice prompts, responses or alerts and convert these prompts, responses, and/or alerts to audio signals. In embodiment, generated audio signals may be communicated to an audio amplifier and/or one or more speakers 940.

In embodiments, a shading object central support assembly 107 (FIG. 1B) or a lower support assembly 187 or upper support assembly 191 (FIG. 1C) may also comprise one or more microphones. In embodiments, one or more microphones may also be attached to and/or integrated within a stem assembly 106, a base assembly 105, shading fabric 715, arms/blades 109, and/or arm support assemblies 108 of FIGS. 1A and 1B and lower support assembly 187, housing or enclosure 182, upper support assembly 191, arm support assemblies 193, arms/blades 194 and/or shading fabric 195 of FIG. 1C. In embodiments, for example, a voice recognition process and/or method may be initiated when a user in a physical vicinity of a shading object may speak. In embodiments, a microphone, located on or within the shading object, may capture a user's voice and generate an analog voice signal. In embodiments, an analog-to-digital converter (ADC) may convert a voice to a digital voice signal and may transfer and/or communicate a voice digital signal to a voice recognition engine 815. Operation and/or location of a voice recognition engine are described in detail in U.S. patent application Ser. No. 15/160,856, filed May 20, 2016, entitled "Automated Intelligent Shading Objects and Computer-Readable Instructions for Interfacing With, Communicating With and Controlling a Shading Object" and U.S. patent application Ser. No. 15/160,822, filed May 20, 2016, entitled "Intelligent Shading Objects with Integrated Computing Device," both of which are hereby incorporated by reference.

In embodiments, a shading object movement control PCB 895 may comprise a personal area network transceiver 865. In embodiments, a PAN transceiver 865 may be located on a separate PCB or on other PCBs within a shading object, intelligent umbrella and/or intelligent shading charging system. In embodiments, a PAN transceiver 865 located on a movement control PCB 895 may be a master transceiver. In embodiments, which are illustrative, but not limiting, PAN transceivers, may be an INSTEON transceiver, an IrDA transceiver, a Wireless USB transceiver, a Bluetooth transceiver, a Z-Wave transceiver, a ZigBee transceiver, and/or a body area network transceiver. In embodiments, additional PCBs and/or components may also comprise PAN transceivers. In embodiments, a transceiver 865 on a movement control PCB 895 may communicate instructions, commands, and/or signals to one or more PAN transceivers located in other areas of the intelligent shading object, intelligent umbrella, and/or intelligent shading charging system (e.g., PAN transceivers in a first PCB (e.g., a PCB controlling azimuth movement), a computing device (e.g., a Linux computer), a second PCB (e.g., a PCB controlling elevation movement), a third PCB (e.g., a PCB controlling extension or linear actuation movement), a telemetry PCB, and/or a weather variable PCB). By utilizing PAN transceivers and PAN communication protocols in an intelligent shading object, umbrella or shading charging system, use of wires, flexible circuit boards, and/or other interfaces may be minimized and more physical space may be present in an intelligent shading object, intelligent umbrella, and/or shading charging system. This is a benefit in that a shading object, intelligent umbrella, and/or shading charging system may be able to house and/or incorporate more features and/or components. In addition, potential hindrances to movements of a shading object, intelligent umbrella, and/or shading charging system (e.g., rotation about a vertical axis of a central support assembly and/or deployment of a support arms and/or blades) may be minimized allowing free movement of these assemblies. In embodiments, PAN transceivers may be utilized in all communications between PCBs and/or between PCBs and/or components of a shading object, intelligent umbrella, and/or shading charging system. In embodiments, PAN transceivers may be utilized for communications of shorter durations and/or lower data throughput. In embodiments, for example, communications from a movement control PCB 895 to a first motor controller 880 may utilize a PAN communication protocol (e.g., PAN transceivers in each device) due to short duration and/or a low data throughput. In embodiments, for example, communications from a movement control PCB 895 (or another circuit or assembly) to a weather variable PCB 810 may utilize a PAN communication protocol.

In embodiments, an intelligent shading object, shading umbrella or intelligent shading charging system may further comprise a sensor module 750. In embodiments, a sensor module 750 may be connected to a top end of a center support assembly 107. As illustrated in FIG. 7, a sensor module 750 may connect, couple or fasten to a post or other structure on top of an upper assembly 112 of a center support assembly 107 (FIG. 1A or 1B) or upper support assembly 191 (FIG. 1C). In embodiments, such as FIGS. 1A and 1B, a sensor module 750 may be located on other portions of a shading object, e.g., integrated into a shading fabric 715, attached to or integrated into arms and/or blades, connected, coupled or attached to a center support assembly 107, a stem assembly 106, and/or a base assembly 106. In embodiments, a sensor module 750 may screw into a recess on a top of a center support assembly, or alternatively may snap onto a top of a center support assembly 107. In embodiments, such as FIG. 1C, a sensor module 750 may be located on other portions of an intelligent charging shading system, e.g., integrated into a shading fabric 195, attached to or integrated into arms and/or blades 193 or 194, connected, coupled or attached to a lower support assembly 187 and/or upper support assembly 191. In embodiments, a sensor module 750 may screw into a recess on a top of a center support assembly, or alternatively may snap onto a top of an upper support assembly 191.

In embodiments, a sensor module 750 may comprise a telemetry PCB 705 and a weather-related PCB. A telemetry PCB 705 may also be referred to as a GPS solar tracking module. In embodiments, a telemetry PCB may comprise a GPS/GNSS sensor 706 and/or a digital compass 707. In embodiments, a telemetry PCB 705 may be powered by a rechargeable battery 820 and/or DC-to-DC converters, or by a battery located on a telemetry PCB. In embodiments, a GPS receiver 706 may communicate with GPS/GNSS satellites and receive positioning signals from satellites and calculates a latitude and/or longitude of a shading object. In embodiments, a GPS receive may receive latitude, longitude and/or altitude readings from GPS/GNSS satellites. In embodiments, a GPS receiver 706 may also determine an altitude of a shading object from signals communicated from GPS/GNSS satellites. In embodiments, GPS receiver measurements and/or calculations may be utilized by a shading object to determine movements necessary by different electromechanical assemblies of a shading object. For example, a movement control PCB 895 may receive GPS receiver measurements (e.g., longitude, latitude, and/or altitude measurements), analyze and/or process these measurements, and determine necessary movements by a stem assembly 106, a center support assembly 107, and/or arm support assembly 108 (FIGS. 1A and 1B) or a lower support assembly 187 and/or upper support assembly 191. In embodiments, a movement control PCB 895 may communicate commands, signals, and/or instructions to a first motor controller PCB 880 (azimuth), a second motor controller 885 (elevation), and/or a third motor controller PCB 890 (actuation) to cause movements of a stem assembly 106, a center support assembly 107, and/or arm support assembly 108 (FIGS. 1A and 1B) or lower support assembly 187, an upper support assembly 191, and/or arm support assemblies 193 (FIG. 1C).

In embodiments, a sensor module 805 may comprise a digital compass 707 may measure magnetic fields surrounding a shading object and may generate a directional reading and/or an angle a direction heading (e.g., a degree heading from true north). In embodiments, these directional and/or angular readings may be communicated to a motion control PCB 895. For example, a movement control PCB may receive digital compass 807 measurements or values, analyze and/or process these measurements or values, and determine necessary movements in response to heading or directional information by a stem assembly 106, a center support assembly 107, and/or arm support assemblies 108 (FIGS. 1A and 1B) or lower support assembly 187, an upper support assembly 191, and/or arm support assemblies 193 (FIG. 1C). In embodiments, a movement control PCB may communicate commands, signals, and/or instructions to a first motor controller PCB 880 (azimuth), a second motor controller 885 (elevation), and/or a third motor controller PCB 890 (actuation) to cause movements of a stem assembly 106, a center support assembly 107, and/or arm support assembly 108 (FIG. 1A or 1B) or lower support assembly 187, an upper support assembly 191, and/or arm support assemblies 193 (FIG. 1C). In embodiments, a telemetry PCB may be utilized infrequently because a shading object may not be moved from one geographical location to another. Thus, GPS information (latitude, longitude, and/or altitude) and/or heading information (from a digital compass) may not change frequently. Thus, a telemetry circuit PCB 805 may comprise a low power processor. In embodiments, a telemetry PCB 805 (and a GPS receiver 806 and/or digital compass 807) may only utilized during configuration and/or calibration of a shading object. During configuration and/or calibration of a shading object (or after a shading object or umbrella has been moved), GPS and digital compass measurements may be requested and after communication of these measurements, a movement control PCB 895 may analyze measurements, calculate elevation and azimuth movements for an intelligent shading object, and communicate instructions, commands and/or signals to respective motor assemblies. In embodiments, a digital compass 807 may be utilized more frequently than a GPS receiver 806.

In embodiments, a sensor module 750 may comprise a weather variable PCB 810. In embodiments, a weather variable PCB may be located in another assembly of a shading object and intelligent umbrella (e.g., stem assembly 106, a center support assembly 107, and/or arm support assembly 108 in FIG. 1A or 1B) or intelligent shading charging assembly (e.g., or lower support assembly 187, an upper support assembly 191, and/or arm support assemblies 193 (FIG. 1C)). In embodiments, a weather variable PCB 810 may also be referred to as a micro climate data module. In embodiments, a weather variable PCB 810 may comprise a processor/controller, a memory, one or more air quality sensors 811, one or more UV radiation sensors 812, one or more digital and/or analog barometers 813, one or more temperature sensors 814, one or more humidity sensors 816, and/or one more wind speed sensors 817. In embodiments, a solar power charging assembly 830 may provide power (e.g., voltage and/or current to a weather variable PCB 805 and/or components located thereon. In embodiments, a battery (e.g., rechargeable battery) 820 may provide power to a weather variable PCB and components located thereon.

In embodiments, sensor readings, measurements, and values communicated by sensors to a weather variable PCB in a sensor module 750 may be communicated directly or indirectly to a movement control PCB 895 and then directly or indirectly to an integrated computing device 860. In embodiments, sensor readings, measurements, and values communicated by a sensor module 750 may be communicated directly or indirectly to an integrated computing device 860. In embodiments, sensor readings, measurements and/or values may be stored in a memory of a shading object computing device and/or a memory coupled thereto. In embodiments, a memory storing sensor reading measurements may be non-volatile and/or volatile. In embodiments, a shading object computing device 860 may communicate sensor readings to external computing devices via wireless communication protocols (e.g., WiFi) in order to minimize usage of storage on a shading object computing device. In embodiments, external devices storing sensor information may include application servers and/or databases, cloud servers and/or databases, and other offsite storage devices. In embodiments, storing of sensor readings on either a shading object computing device and/or external computing devices allows a shading object sensor reading history to be created and/or maintained. In embodiments, sensor information for multiple shading objects, intelligent umbrellas, or intelligent shading charging assemblies for outdoor areas (parking lots, building plazas, sports and/or event fields) may be sent to external computing devices (application servers and/or databases, cloud servers and/or databases, and other offsite storage devices).

In embodiments, a sensor module 750 may comprise an air quality sensor 811. In embodiments, an air quality sensor 811 may provide ozone measurements, particulate matter measurements, carbon monoxide measurements, sulfur dioxide measurements and/or nitrous oxide measurements. In embodiments, an air quality sensor 811 may provide allergen measurements. In embodiments, a sensor module 750 may comprise a humidity sensor 816. In embodiments, a humidity sensor 816 may provide humidity measurements in an environment where a shading object is located. In embodiments, a sensor module 750 may comprise a temperature sensor 814. In embodiments, a temperature sensor 814 may generate and provide a temperature reading for a shading object environment. In embodiments, a sensor module 750 may comprise a digital barometer 813. In embodiments, a digital barometer may provide, measure, and/or display complex atmospheric data more accurately and quickly than prior barometers. Many digital barometers display both current barometric readings and previous 1-, 3-, 6-, and 12-hour readings in a bar chart format, much like a barograph. They also account for other atmospheric readings such as wind and humidity to make accurate weather forecasts. In embodiments, a sensor module 750 may comprise an ultraviolet (UV) radiation sensor 812. In embodiments, a UV radiation sensor may provide discrete radiation band measurements, including, but not limited to UVB, radiation, UVA radiation, Infrared lighting, or a combination of any and all of these radiation measurements. Operation and/or location of humidity sensors, temperature sensors, digital barometer, and/or UV sensors are described in detail in U.S. patent application Ser. No. 15/160,856, filed May 20, 2016, entitled "Automated Intelligent Shading Objects and Computer-Readable Instructions for Interfacing With, Communicating With and Controlling a Shading Object" and U.S. patent application Ser. No. 15/160,822, filed May 20, 2016, entitled "Intelligent Shading Objects with Integrated Computing Device," both of which are hereby incorporated by reference.

In embodiments, a sensor module 750 may comprise a wind sensor 817. In embodiments, a wind speed sensor 817 may provide wind speed and/or wind direction information at a top of a shading object or umbrella, and/or at a middle of a shading object, umbrella and/or intelligent shading charging system. In embodiments, a weather variable PCB 810 may receive measurements and/or readings from a wind sensor 817 and may communicate these measurements to a movement control PCB 895. In embodiments, for example, a movement control PCB 895 may receive wind speed measurements analyze and/or process these measurements, and determine necessary movements by a stem assembly 106, a center support assembly 107, and/or arm support assembly 108 (FIG. 1A or 1B) or a lower support assembly 187, an upper support assembly 191 and/or arm support assemblies 193 (FIG. 1C). In embodiments, a movement control PCB 895 may communicate commands, signals, and/or instructions to a first motor controller PCB 880 (azimuth), a second motor controller 885 (elevation), and/or a third motor controller PCB 890 (actuation) to cause movements of a stem assembly 106, a center support assembly 107, and/or arm support assembly 108 (FIGS. 1A and 1B) or a lower support assembly 187, an upper support assembly 191 and/or arm support assemblies 193 (FIG. 1C). In embodiments, if a wind speed is higher than a predetermined threshold, a movement control PCB 895 may communicate messages, commands, instructions, and/or signals to motor controllers to cause a shading object, intelligent umbrella and/or intelligent shading charging system to be retracted and moved to a rest position. In embodiments, a wind sensor 817 may also be mounted on or integrated into a center support assembly 107, an upper support assembly 191 or lower support assembly 187 and utilized in a same fashion as described above.

In embodiments, a shading object may comprise one or more digital cameras 857. In embodiments, digital cameras 857 may display images on a screen immediately after being captured. In embodiments, one or more digital cameras 857 may store and/or delete images from a memory associated with a digital camera. In embodiments, one or more digital cameras 857 may capture, record and/or moving videos with or without sound. In embodiments, a central support assembly 107 (FIGS. 1A and 1B), a lower support assembly 187, and/or an upper support assembly 191 (FIG. 1C) may comprise one or more cameras 857. In embodiments, a center support assembly 107, lower support assembly 187, and/or an upper support assembly 191 may comprise four cameras, with each camera installed approximately 90 degrees from another. In embodiments, digital cameras 857 may each be able to move in a canister or rotate in order to capture 360 degrees around a shading object. In embodiments, one or more cameras 857 may also be located on a top portion of a shading object (e.g., located on and/or within a sensor module positioned on top of a center support assembly 107 (or upper support assembly 191), located on top of an arm/blade 108 or 194, or located on a shading fabric 715 or 195).

In embodiments, one or more digital cameras 857 may be utilized as a security cameras. In embodiments, for example, one or more digital cameras 857 may capture images in an environment in which a shading object is installed and/or located. For example, if a shading object is rotating around a vertical axis (e.g., a) the shading system (stem assembly 106 and center support assembly 107 are rotating about a base assembly 105) for shading objects and intelligent umbrellas or b) the lower support assembly 187 is rotating about a housing 182 and/or base assembly for intelligent shading charging systems, a camera 857 may capture images, video and/or sound (e.g., delayed or in real-time). In embodiment, one or more digital cameras may capture images, sound and/or video and may communicate images, sound and/or video to a memory located on a computing device 860 located within a shading object, intelligent umbrella, or intelligent shading charging assembly. In embodiments, one or more digital cameras 857 may capture images, sound and/or video (either delayed or in real-time) of an environment here a a shading object, intelligent umbrella, or intelligent shading charging assembly is located (up to a 360 degree picture) and may communicate images, sound and/or video to a memory located on a motion control PCB 895. In embodiments, images, sound, and/or video may be communicated and/or streamed to a wireless transceiver in an integrated computing device 860 and/or associated computing device PCB. In embodiments, continuing with this example, images, sounds and/or video communicated to a shading object computing device may be stored in a memory (e.g., volatile and/or non-volatile memory) of a computing device 860 located within a shading object, intelligent umbrella, or intelligent shading charging assembly. In embodiments, continuing with this illustrative embodiments, images, sounds, and/or real-time video may be communicated via a wireless transceiver and/or wireless hotspot to external computing devices (e.g., application servers, databases, network servers) or other devices on a global communications network (e.g., such as the World Wide Web and/or the Internet).

In embodiments, one or more of the digital cameras 857 may comprise an infrared detector. In embodiments, an infrared detector may comprise one or infrared light sources and an infrared sensor. In embodiments, infrared sensors may detect a select light wavelength in an Infra-Red (IR) spectrum. In embodiments, one or more LED lights (or other light assemblies) may produce and/or generate light at an IR wavelength and an IR sensor may receive and/or analyze an intensity and/or amplitude of a received light. In embodiments, when an object is close to an IR sensor, light generated from an IR LED (or IR light assembly) may bounce and/or reflect off an object back into an IR light sensor. In embodiments, this large jump in an IR intensity may be compared against a threshold, and if a threshold is reached (e.g., the return IR intensity is higher than a threshold), then an infrared detector may generate a signal indicating that an object is located within an area being monitored or viewed by an infrared detector. In embodiments, if an infrared detector generates a signal indicating that an object (and/or individual) is present, a camera 857 may be activated and begin to capture images and/or video, with or without sound, and transmit captured images and/or video, with or without sound, to a computing device 860 in a shading object, intelligent umbrella, or intelligent shading charging assembly. In embodiments, if an infrared detector generates a signal indicating that an object (and/or individual) is present, a lighting assembly (e.g., LED lights) 870 may also be activated and lights may be directed in an area surrounding a shading object, intelligent umbrella, or intelligent shading charging assembly and/or directly to an area where an object is detected. In embodiments, one or more cameras 857 and/or one or more lighting assemblies 870 may be activated, which results in better images and/or video of an area surrounding a shading object, intelligent umbrella, or intelligent shading charging assembly being captured and/or communicated to an integrated computing device. This is yet another example of how a shading object, intelligent umbrella, or intelligent shading charging assembly provides additional benefits of not only capturing images of its surrounding area but also being utilized as a security device for an environment in which a shading object, intelligent umbrella, or intelligent shading charging assembly is located.

In embodiments, one or more cameras 857 may be thermal imaging cameras. Operation and/or location of thermal imaging cameras are described in detail in U.S. patent application Ser. No. 15/160,856, filed May 20, 2016, entitled "Automated Intelligent Shading Objects and Computer-Readable Instructions for Interfacing With, Communicating With and Controlling a Shading Object" and U.S. patent application Ser. No. 15/160,822, filed May 20, 2016, entitled "Intelligent Shading Objects with Integrated Computing Device," both of which are hereby incorporated by reference. In embodiments, a thermal imaging camera comprises a special lens may focus on infrared light emitted by all objects within an area surrounding and/or adjacent to a shading object, intelligent umbrella, or intelligent shading charging assembly. In embodiments, a focused light may be scanned by a phased array of infrared-detector elements. In embodiments, one or more detector elements may generate a very detailed temperature pattern, which may be referred to as a thermogram. In embodiments, a detector array may take about one-thirtieth of a second to obtain temperature information to make a thermogram. In embodiments, a signal-processing unit of a thermal imaging camera 857 may communicate thermal images and/or thermal video to a computing device 860 in a shading object, intelligent umbrella, or intelligent shading charging assembly for analysis, storage and/or retransmission to external computing devices. In embodiments, a thermal image may appear as various colors depending on and/or corresponding to an intensity of an infrared image. In embodiments, a thermal imaging camera allows additional benefits of not having to activate a lighting assembly in order to capture images and/or videos of an area surrounding a shading object, intelligent umbrella, or intelligent shading charging assembly. In addition, by not activating a lighting assembly 870, an intruder or moving object may not be aware that a digital camera 857 may be capturing an image or video of an area where an intruder or object is located. In embodiments, an infrared detector may activate a thermal imaging camera 857 upon detection of movement. In embodiments, a thermal imaging camera may activate on its own due to movement of an intruder and/or object, or may be periodically or continuing capturing images and/or video.

Figure 10:
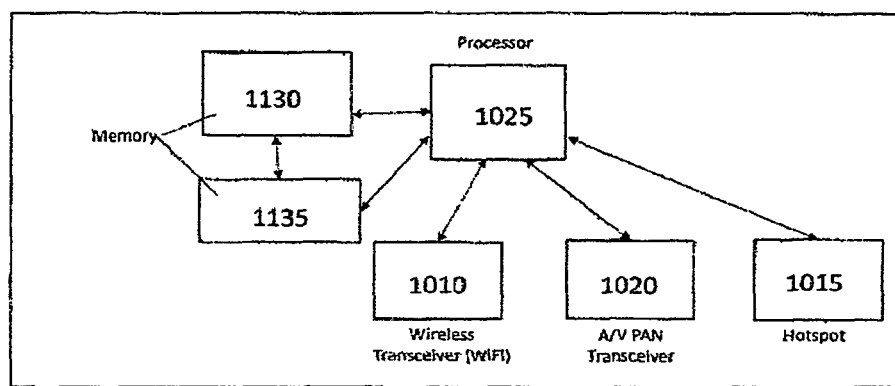
FIG. 10 illustrates a shading object or umbrella computing device according to embodiments.

FIG. 10 illustrates an integrated computing device in a shading object, intelligent umbrella, or intelligent shading charging assembly according to embodiments. In embodiments, an integrated computing device PCB 1000 may comprise a wireless WiFi or LAN wireless transceiver 1010 (which may or may not operate as a wireless hotspot and/or router), a separate wireless hotspot device 1015, one or more audio/video transceivers 1020 (e.g., PAN transceivers), one or more processors 1025, one or more non-volatile memories 1030 and one or more memory components 1035. In embodiments, many of the components may reside on a computing device PCB. In embodiments, a separate PCB may house or have some of the above-listed components (e.g., WiFi transceiver 1010, wireless hotspot device 1015) mounted thereon and a computing device may comprise non-volatile memory 1030 (e.g., a flash drive, a hard drive, a removable disk drive), and a volatile memory 1035 such as RAM, and on or more processors 1025. In locations with one or more shading objects, intelligent umbrellas or intelligent shading charging systems, integrated computing devices 860 may communicate with each other to perform actions and/or processes described herein. These devices may communicate using wireless and/or wired communication.

In embodiments, computer-readable and/or computer-executable instructions may be stored in non-volatile memory, fetched by one or more processors 1025, loaded into RAM 1035, and executed by one or more processors 1025 to perform data intensive functions, execute processes such as a healthcare process (e.g., selecting a healthcare option from a dashboard of a mobile application), a security process (e.g., selecting a security option from a dashboard of a mobile application), an energy process or application (e.g., selecting an energy option from a dashboard of a mobile application), a weather application or processor (e.g., selecting a weather option from a dashboard of a mobile application), and/or communicating with external devices (e.g., wireless access points, portable electronic devices, servers, networks). In embodiments, an integrated computing device 860 and/or a computing device PCB may consume more power due to higher data throughput and higher utilization time. Having a computing device integrated into a shading object, intelligent umbrella, or intelligent shading charging assembly, provides a benefit, as to prior art shading objects or umbrellas, of allowing an intelligent shading object to run software applications, communicate with data intensive devices, such as cameras and/or audio system, utilize WiFi or other wireless communication transmissions, operate as a WiFi hotspot (or other wireless communication hub) and communicate with external computing devices to transfer data obtained by the intelligent shading object.

In embodiments, an integrated computing device 1000 may communicate with application servers, mobile applications servers, proxy servers, and/or other computing devices on a global communications network (e.g., the Internet). In embodiments, a shading object computing device may handle data and/or command communications between external devices and a shading object. In embodiment, a integrated computing device 860 may handle intra-shading object communications requiring more extensive processing power and/or higher data transfer rates. In embodiments, a center support assembly 107 (FIGS. 1A and 1B), a lower support assembly 187 or an upper support assembly 191 (FIG. 1C) may house an integrated computing device. In embodiments, a center support assembly 107, a lower support assembly 187 or an upper support assembly 191 (FIG. 1C) may also house a computing device PCB to which a computing device 860 may be attached to and/or connected.

In embodiments, an integrated computing device 860 or 1000 may be a Linux-based computing device (e.g., Raspberry PI) although other operating systems and/or other processor types may be utilized. In embodiments, a shading object may comprise one or more transceivers to communicate with wireless access points utilizing a wireless communication protocol. In embodiments, one or more wireless transceivers may communicate voice and/or data communications to an access point, which in turn may communicate received voice and/or data communications to a packet-switched network (e.g., a global communications network such as the Internet, an intranet, or a private network) or a circuit-switched network (such as existing telecommunications system).

In embodiments, an integrated computing device may comprise a WiFi (or wireless LAN) transceiver 1010 which may also operate as a hotspot and/or personal wireless access point. In embodiments, an integrated computing device 860 may comprise a separate and/or additional wireless hotspot 1015. In embodiments, a wireless hotspot may be operate as an wireless access point providing network and/or Internet access to portable electronic devices (e.g., smartphones, music players) or other electronic devices (personal computers and/or laptops) in public locations, where other wireless access points are not located (or being utilized for different purposes). If a computing device 860 comprises a wireless hotspot 1015 (or a wireless transceiver 1010 is operating as a hotspot), wireless communication devices (e.g., laptops, tablets, smartphones) may utilize a shading object as a communications hub. This may be beneficial in remote locations where no wireless access points are located, or in locations where wireless data or voice communications have been interrupted. In addition, if a shading object computing device and thus a shading object includes a wireless hotspot, image or video streaming, face-timing, application downloads, or other data intensive functions and/or applications may execute and be completed in a shorter amount of time then when using a PAN transceiver 865.

In embodiments, an integrated computing device 860 may store and/or execute shading object or umbrella application software, which may be referred to as SMARTSHADE and/or SHADECRAFT application software. In embodiments, shading object or umbrella application software may be run and/or executed on a variety of computing devices including a computing device integrated within a shading object or umbrella. In embodiments, for example, shading object, intelligent umbrella, or intelligent shading charging system application software may include computer-readable instructions being stored in non-volatile memories of a shading object computing device, a portable electronic device (e.g., a smart phone and/or a tablet), an application server, and/or a web application server, all which interact and communicate with each other. In embodiments, computer-readable instructions may be retrieved from memories (e.g., non-volatile memories) of these above-identified computing devices, loaded into volatile memories and executed by processors in the shading object computing device, portable electronic device, application server, and/or mobile application server. In embodiments, a user interface (and/or graphical user interface) for a shading object, intelligent umbrella, or intelligent shading charging system software application may be presented on a portable electronic device, although other computing devices could also execute instructions and present a graphical user interface (e.g., dashboard) to an individual. In embodiments, application software may generate and/or display a dashboard with different application (e.g., process) selections (e.g., weather, health, storage, energy, security processes and/or applications). In embodiments, shading object, intelligent umbrella, or intelligent shading charging system application software may control operation of a shading object, communicate with and receive communications from shading object assemblies and/or components, analyze information obtained by assemblies and/or components of a shading object, intelligent umbrella, or intelligent shading charging assembly, integrate with existing home and/or commercial software systems, and/or store personal data generated by the shading object, and communicate with external devices. In environments where there are one or more shading objects, intelligent umbrellas, and/or intelligent shading charging systems (e.g., shopping plazas, outdoor plazas, parking lots, sports and/or event fields), application software may be installed on one or more integrated computing devices.

In embodiments, a portable electronic device may also comprise a mobile application stored in a non-volatile memory. In embodiments, a mobile application may be referred to as a SHADECRAFT or a SMARTSHADE mobile application. In embodiments, a mobile application (mobile app) may comprise instructions stored in a non-volatile memory of a portable electronic device, which can be executed by a processor of a portable electronic device to perform specific functionality. In embodiments, this functionality may be controlling of, interacting with, and/or communicating with a shading object, intelligent umbrella, or intelligent shading charging assembly. In embodiments, mobile apps may provide users with similar services to those accessed and may be individual software units with limited or specific function. In embodiments, applications may be available for download from mobile application stores, such as Apple's App Store. In embodiments, mobile apps may be known as an app, a Web app, an online app, an iPhone app or a smartphone app.

In embodiments, a mobile app may communicate with a mobile application server and/or also an application server. In embodiments, an application server may be a backend server. In embodiments, application servers may consist of components, such as web server connectors, computer programming languages, runtime libraries, database connectors, and administration software code which may be utilized to deploy, configure, manage, and connect these components on a web host. In embodiments, an application server may run and/or execute behind a web Server (e.g. an Apache or Microsoft IIS webs server) and may run and/or execute) in front of an SQL database (e.g. a PostgreSQL database, a MySQL database, or an Oracle database). In embodiments, web software applications may be executable computer instructions which run and/or execute on top of application servers, and are written in computer programming language(s) an application server may supports. In embodiments, web software applications may call runtime libraries and/or components an application server may offer. In embodiments, an application server may be referred to as a SMARTSHADE application server and/or a SHADECRAFT application server.

In embodiments, a mobile app server may be utilized in between a mobile app and an application server. Operation, structure, functionality and/or location of application software, mobile apps, mobile application servers, and/or cloud storage are described in detail in U.S. patent application Ser. No. 15/160,856, filed May 20, 2016, entitled "Automated Intelligent Shading Objects and Computer-Readable Instructions for Interfacing With, Communicating With and Controlling a Shading Object" and U.S. patent application Ser. No. 15/160,822, filed May 20, 2016, entitled "Intelligent Shading Objects with Integrated Computing Device," both of which are hereby incorporated by reference.

In embodiments, a SMARTSHADE and/or SHADECRAFT application software may comprise one or more application components and/or modules which may provide a user and/or individual with different features and/or functionality. For example, in embodiments, a SMARTSHADE and/or SHADECRAFT application software or system may comprise a personal care component and/or module, a shading object operation component and/or module, a shading object accessory commerce component, an e-commerce component and/or module, and a home security/monitoring component and/or module (e.g., like a connection to an Internet of Things). In embodiments, a SMARTSHADE and/or SHADECRAFT application system or system may also provide storage or access to storage for individual's personal information, preferences, digital products (e.g., movies, pictures, and/or music), and/or security information. In embodiments, SMARTSHADE and/or SHADECRAFT application software may refer to software (e.g., computer-readable instructions) executing on a portable electronic device (e.g., a mobile device such as a smart phone), an integrated computing device (in an intelligent shading object), an application server, a cloud server, and/or a mobile application server). In embodiments, different portions, components, modules of the SHADECRAFT application software may be located and executing on different devices and a user may be interacting with one or more of the devices.

In embodiments, when implementing a weather process (e.g., executing a weather process from a dashboard on a mobile application), an integrated computing device 860 may leverage shading object, intelligent umbrella, and/or intelligent shading charging system sensors and data from other nearby shading objects, intelligent umbrella, and/or intelligent shading charging system and can communicate users weather information with unprecedented accuracy and improve an individual's understanding and measurement of weather conditions. In embodiments, weather information and/or data may be obtained from sensors in a sensor module 750 via a weather variables PCB 810 and/or a shading object, intelligent umbrella, and/or intelligent shading charging system moving control PCB 895. In embodiments, sensor measurements may be stored in a memory 1030 and/or 1035 of an integrated computing device 1000. Individuals may be presented with localized and microenvironment weather conditions with unprecedented accuracy due to localization of measurements. In embodiments, an individual may establish weather thresholds and/or preferred weather conditions, and if these threshold and/or weather conditions are determined to have occurred by the shading object, intelligent umbrella, and/or intelligent shading charging system, executing the weather process (or software application), the weather process may alert an individual through an audio system or via a display device. In embodiments, a weather process may also predict weather conditions for an upcoming period of time. In embodiments, a computing device in a shading object, intelligent umbrella, and/or intelligent shading charging system may communicate with an access point (or its own hot spot access point), which in turn communications with a weather-related application server or weather-related mobile application server. Information regarding weather forecasts (sun intensity, cloud cover, atmospheric conditions, air quality, etc.) for a geographic area where a shading object, intelligent umbrella, and/or intelligent shading charging system is installed, may be downloaded to a memory 1030 or 1035 of a computing device in a shading object, intelligent umbrella, and/or intelligent shading charging system and may be utilized by a shading object, intelligent umbrella, and/or intelligent shading charging system or an individual. In embodiments, this information may be integrated with date information, and/or sensor measurements to provide weather predictions for an individual and/or user. In addition, a weather process may also alert individuals and/or users as to inclimate or problematic weather conditions before these conditions occur. The operations and functionality described above with regard to shading objects and intelligent umbrellas in home or other locations, may also be utilized for intelligent shading charging systems located in outdoor plazas, shopping malls, parking lots, event and sports facilities, and other similar locations. Data, measurements and/or information from one or more shading objects, intelligent umbrellas and/or intelligent charging shading system may be utilized by a weather process to provide predictions and/or summaries for outdoor locations besides personal homes (shopping plazas, parking lots, outdoor event centers).

In embodiments, an integrated computing device may communicate (e.g., through wireless transceivers, wires, and/or circuit traces) with a movement control PCB 895 (or another circuit or assembly). In response, a movement control PCB 895 may communicate with a weather variables PCB 810 to obtain sensor measurements from sensors coupled to and/or connected to a weather variables PCB 810. In embodiments, sensors may obtain measurements and may communicate these measurements to a weather variables PCB 810, a control PCB 895, and/or to a computing device 860 located within a shading object, intelligent umbrella, and/or intelligent shading charging system. In embodiments, obtained measurements may be stored (for later use and/or analyzation) in a memory 1030 or 1035 of a computing device 860 in a shading object, intelligent umbrella, and/or intelligent shading charging system, may be communicated via a sound system to a user, or may be displayed via a mobile software application.

In embodiments, in another illustrative example, a user may provide verbal instructions to rotate a shading object, intelligent umbrella, and/or intelligent shading charging system, a computing device 860 may process the voice signal as described above (e.g., employing voice analyzation and/or voice recognition), and transmit messages, instructions and/or commands to a first motor controller to cause a first motor to rotate a shading object, intelligent umbrella, and/or intelligent shading charging system a specified number of degrees (e.g., about a vertical axis). In embodiments, a user may provide verbal commands to a shading object, intelligent umbrella, and/or intelligent shading charging system remotely. For example, a user may provide verbal instructions to a mobile communication device (e.g., a smartphone), which may communicate the voice commands via a wireless communications protocol and/or Bluetooth to an audio/video receiver (e.g., a Bluetooth-enabled receiver) installed within the shading object, intelligent umbrella, and/or intelligent shading charging system. In this example embodiment, an audio/video receiver may communicate the voice-commands to a voice-recognition engine 815 which may convert the remotely-transmitted speech and communicate signals to the controller/processor, which may then operate in a manner described above.

In embodiments, computer-readable and computer-executable instructions may be fetched from a non-volatile memory, loaded into a volatile memory, and may be executed by a processor in a computing device to operate a security system and/or to perform a home security process (if a shading umbrella or shading object is utilized at a home). This may occur in response to a user selecting a home security button or icon on a dashboard of a shading object mobile and/or software application. Operation of a home security process (or home security portion of a software application) may be controlled by a computing device. In embodiments, a home security process (e.g., initiated by selection in a shading object mobile application or another shading object software application) may receive communicated live and/or almost real-time video, image and/or sound feeds and may also set quality of image readings. In embodiments, video, sound and/or image feeds may be stored in a memory 1030 or 1035 of a shading computing device, a memory of a cloud server, a memory of an application server, and/or databases. In embodiments, an integrated computing device 860 can analyze video, sound, and/or images and issue safety alerts based on analyzation of video and/or images, motion detector activity, and/or over threshold air quality readings from an air quality sensor. In embodiments, an integrated computing device 860 may communicate captured video, sound and/or images to an external device, such as an existing home security application server, such as ADT Security, which could enhance ADTs security capabilities, and/or also provide a platform for cross-promotion of security system software. In embodiments, an integrated computing device 860 may execute a home security process and communicate video and/or images, with or without sound, to emergency responders (e.g., police, fire, security responders, FEMA) to aid in dealing with emergency situations.

Figure 13A:
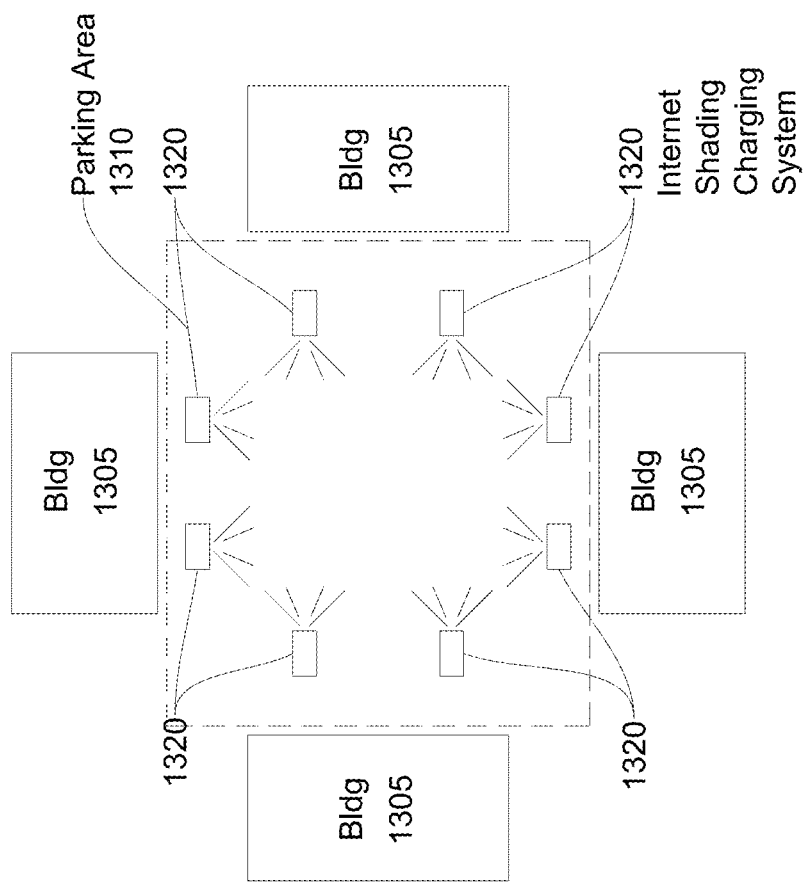

FIGS. 13A and 13B illustrates placements of intelligent shading charging systems in outdoor locations according to embodiments. In embodiments, intelligent shading charging systems may have one or more digital cameras installed thereon or integrated within. In embodiments, digital cameras may provide images, video, and/or audio from locations where intelligent shading charging systems are located and/or installed. By having multipurpose intelligent shading charging systems located in various places around outdoor locations, owners or patrons of outdoor locations may monitor and/or view locations as well as events occurring at locations. In embodiments, this is an improvement over current shading systems and/or charging systems because the intelligent shading charging systems may be utilized for security purposes at event locations and/or outdoor locations.

In embodiments, computer-readable and computer-executable instructions may be fetched from a non-volatile memory, loaded into a volatile memory, and may be executed by a processor in a computing device to operate a security system and/or to perform an outdoor location security process (if an intelligent shading charging system is utilized in an outdoor location such as ones described above). This may occur in response to a user selecting a home security button or icon on a dashboard of a shading object, intelligent umbrella, or intelligent shading charging system mobile and/or software application. Operation of a security process for public outdoor locations (e.g., building plazas, parking lots, outdoor sports fields and/or event fields (or a security portion/process of a software application) may be controlled by a computing device. In embodiments, a security process (e.g., initiated by selection in a mobile application or another software application) may receive communicated live and/or almost real-time video, image and/or sound feeds and may also set quality of image readings. In embodiments, video, sound and/or image feeds, data, or information may be stored in a memory 1030 or 1035 of an intelligent shading charging system computing device, a memory of a cloud server, a memory of an application server, and/or databases. In embodiments, an integrated computing device 860 can analyze video, sound, and/or images and issue safety alerts based on analyzation of video and/or images, motion detector activity, and/or over threshold air quality readings from an air quality sensor. In embodiments, an integrated computing device 860 may communicate captured video, sound and/or images to an external device, such as an existing security application server of public outdoor locations, such as ADT Security or other building or outdoor location security operations, which could enhance ADTs security capabilities, and/or also provide a platform for cross-promotion of security system software. In embodiments, an integrated computing device 860 may execute an outdoor environment security process and communicate video and/or images, with or without sound, to emergency responders (e.g., police, fire, security responders, FEMA) to aid in dealing with emergency situations. In embodiments, in emergency situations, digital cameras may communicate video and/or images, with or without sound, to emergency responders (e.g., police, fire, security responders, FEMA) to aid in dealing with emergency situations.

For example, as illustrated in FIG. 13A, an outdoor parking lot in a plaza between a number of buildings 1305 may have one or more intelligent shading charging systems installed. In FIG. 13A, eight intelligent shading charging systems 1320 may be located around a parking area 1310. In embodiments, electrical vehicles may juice or rechargeable their electric vehicle batteries at any of the intelligent shading charging systems 1320. In addition, intelligent shading charging systems may comprise cameras to provide images, video, and/or sound of the parking area 1310. In embodiments, a placement of intelligent shading charging systems 1320 may allow visual coverage of most, or a substantial portion of a parking area. In embodiments, as described previously, images, videos, and/or sound may be transmitted to a computing device within an intelligent shading charging system 1320 and/or an external computing devices (e.g., laptops, tablets, smartphones, servers, application servers, cloud servers, etc.). These images may be utilized by security providers as visual recognition of what is happening in an environment. In embodiments, intelligent shading charging systems may record and/or capture images, video and/or sound in real-time or substantially close to real-time. In embodiments, cameras in intelligent shading charging systems may be activated by motion detection, proximity detection, or by remote activation, as discussed above, by an integrated computing device and/or external computing device.

For example, as illustrated in FIG. 13B, one or more intelligent shading charging systems may be installed in an outdoor event area, such as an outdoor sports complex (e.g., for soccer, lacrosse, baseball, football, etc.) or an outdoor event location (e.g., movie theatre, concert, fair, online game playing festival.). In embodiments, a computing device and mobile app may allow individuals to diagnose problems with shading object, intelligent umbrella and an intelligent shading charging system operation. In FIG. 13B, eight intelligent shading charging systems 1320 may be located in, around or adjacent to a parking area 1340. In embodiments, electrical vehicles may recharge their electric vehicle batteries at any of the intelligent shading charging systems 1320. In addition, in embodiments, intelligent shading charging systems may comprise cameras to provide images, video, and/or sound of the parking area 1340 and/or fields 1345 where events and/or sporting events are happening and/or taking place. In embodiments, an intelligent shading charging system 1320 may have one or more cameras facing a parking area and capturing images, video, and/or sound for security purposes and one or more cameras facing and/or directed to athletic fields and/or event fields 1345 to capture images, videos, and/or sound of events occurring on the athletic and/or event fields 1345 (which may be utilized to keep track of sporting events or other events). In embodiments, such as an embodiment illustrated in FIG. 13B, a parking area 1340 may be located on both ends of athletic and/or event fields to capture more images, videos, and/or sounds of events occurring on such fields. In embodiments, high quality and/or high speed camera equipment may be utilized to capture higher quality images, video and/or sound of events occurring on playing fields. In embodiments, one or more cameras may be directed to a scoreboard or other score keeping device 1350 to allow monitoring of scores on athletic fields and/or information regarding events on the event or athletic fields (e.g., times of events, sponsorships, and/or emergency situations). In embodiments, a placement of intelligent shading charging systems 1320 may allow visual coverage of most, or a substantial portion of a parking area. In embodiments, as described previously, images, videos, and/or sound may be transmitted to a computing device within an intelligent shading charging system 1320 and/or an external computing devices (e.g., laptops, tablets, smartphones, servers, application servers, cloud servers, etc.). These images, videos, and/or sounds may be utilized by security providers as visual recognition of what is happening in an environment, by parents or other family members wishing to monitor events occurring on athletic and/or event fields, or by third parties for security purposes. In embodiments, such as illustrated in FIG. 13B, coverage (e.g., image and video coverage) of a large amount of playing fields and/or event fields may be obtained by placement of a plurality intelligent shading charging systems 1320 at locations around an area that provide viewing angles of athletic and event fields 1345 and proximity to parking areas 1340 (to allow for electric vehicles to have batteries recharged).

Operation and/or location of diagnostic programs for diagnosing problems in shading objects, intelligent umbrellas, or intelligent shading charging systems are described in detail in U.S. patent application Ser. No. 15/160,856, filed May 20, 2016, entitled "Automated Intelligent Shading Objects and Computer-Readable Instructions for Interfacing With, Communicating With and Controlling a Shading Object" and U.S. patent application Ser. No. 15/160,822, filed May 20, 2016, entitled "Intelligent Shading Objects with Integrated Computing Device," both of which are hereby incorporated by reference.

In embodiments, an intelligent shading object, intelligent umbrella, and/or intelligent shading charging system may be a device that is part of an Internet of Things (IoT). In embodiments, an Internet of Things (IoT) may be a network of physical objects-sensors, devices, vehicles, buildings, computers, wireless communication devices, and other electronic devices. These objects and/or devices may comprise items embedded with electronics, software, sensors, and network connectivity, which enables these physical objects to collect and exchange data with each other and/or with servers connected and/or coupled via a global communications network (e.g., an Internet and/or a private network). In embodiments, the IoT may sense and/or control objects across existing wireless communication network infrastructure and a global communications network infrastructure. In embodiments, integrating of devices via IoT may create opportunities for more direct integration of a physical world into computer-based systems, which may result in improved efficiency, accuracy and economic benefit. In addition, when IoT is augmented with sensors and actuators, IoT may be integrated or enabled with a more general class of cyber-physical systems, e.g., smart grids, smart homes, intelligent transportation and smart cities. In embodiments, in IoT, for example, may be uniquely identifiable through its embedded computing system but is able to interoperate within the existing Internet infrastructure. If a shading object, intelligent umbrella, and/or intelligent shading charging system is integrated into IoT, for example, these systems and/or devices may be part of a smart home, a smart office, a smart sports facility, a smart shopping mall, a smart parking lot, and/or a smart building plaza.

For example, a shading object or intelligent umbrella enabled with IoT capability, because it may incorporate cameras, may be able to communicate with or be integrated into a home or office security system. Further, if an individual has a smart home, an individual may be able to control operation of, or communicate with an intelligent shading object or umbrella as part of an existing smart home software application (either via a smart phone, mobile communication device, tablet, and/or computer). In addition, an intelligent shading object, if part of IoT, may be able to interface with, communicate with and interact with an existing home security system. Likewise, an intelligent shading object may be able to be an additional sound reproducer (e.g., via speaker(s)) for a home audio and/or video system that is also on the IoT. In addition, an intelligent shading object may be able to integrate itself with an electronic calendar (stored on a computing device) and become part of a notification or alarm system because it will identify when upcoming meetings are occurring. In embodiments, an intelligent shading computing device may utilize artificial intelligence to determine which music to play from a portable electronic device. In embodiments, a memory of an intelligent shading object may have user playlist information, e.g., genre played during certain timeframes, favorites, song played at specific times. In embodiments, an integrated computing device 860 may receive a request to play music and may select a playlist of music based on user's preferences and or usage factors. After a playlist is selected, a shading object computing device 860 may stream selected music from an individual's portable electronic device through a wireless network transceiver and to a sound reproduction system.

For example, an intelligent shading charging system having IoT capability (or being part of an IoT, because it may incorporate cameras, may be able to communicate with or be integrated into a security system for an outdoor area (e.g., a sports facility, a shopping and/or entertainment mall, an outdoor plaza, a parking lot). Further, in embodiments, if an owner and/or operator has smart technology integrated into its buildings, plazas, parking lots, facilities, etc., an owner operator may be able to control operation of, or communicate with an intelligent shading charging system as part of an existing smart building or outdoor area software application (either via a smart phone, mobile communication device, tablet, a computing device, and/or computer). In addition, an intelligent shading charging system, if part of IoT, may be able to interface with, communicate with and interact with an existing building security system (or outdoor area, parking lot or sports facility security area). Likewise, an intelligent shading charging system may be able to be an additional sound reproducer (e.g., via speaker(s)) for a building audio and/or video system that is also connected to or on the IoT. In addition, an intelligent shading object may be able to integrate itself with a scheduling application calendar (stored on a computing device and/or servers) that may allow patrons or users in outdoor shopping plazas, sports facilities, outdoor building plazas, and/or parking lots to schedule use of an electric vehicle charging station in building and/or facility. In addition, the intelligent shading charging system may become part of a notification system because it will identify when upcoming events, charging appointments may be occurring. In embodiments, an intelligent shading charging system's integrated computing device may utilize artificial intelligence to determine which music to play from a portable electronic device. In embodiments, a memory of an intelligent shading object may have user playlist information, e.g., genre played during certain timeframes, favorites, song played at specific times. In embodiments, an integrated computing device 860 may receive a request to play music and may select a playlist of music based on user's preferences and or usage factors. After a playlist is selected, a computing device 860 may stream selected music from an individual's portable electronic device through a wireless network transceiver and to a sound reproduction system.

In embodiments, a computing device 860 in a shading object, intelligent umbrella, and/or an intelligent shading charging system, may have computer-readable instructions, stored in a non-volatile memory, which when executed by a processor, may execute a power monitoring and device control process (shading object, intelligent umbrella, or intelligent shading charging systems) and may provide this functionality to a shading object, intelligent umbrella, or intelligent shading charging assembly. For example, a computing device 860 in a shading object, intelligent umbrella, or intelligent shading charging assembly may receive measurements from rechargeable batteries and power charging assemblies in one or more other shading objects, intelligent umbrella, or intelligent shading charging systems. For example, a computing device 860 may analyze the measurements, and make recommendations to users and/or operators regarding power usages, which devices are using a large quantity of power, and which shading objects, intelligent umbrella, or intelligent shading charging systems are using power and/or which units are supplying power. In embodiments, an operator and/or user of a computing device 860 in a shading object, intelligent umbrella, or intelligent shading charging system may control one or more other shading objects, intelligent umbrellas and/or intelligent shading charging assemblies. In other words, shading object, intelligent umbrella, or intelligent shading charging system software may allow a user and/or operator to operate and/or move one or more devices in a synchronized manner, and/or address different devices independently. For example, shading object, intelligent umbrella, or intelligent shading charging system software may allow a user and/or operator to move all devices in unison to track the sun better. For example, shading object, intelligent umbrella, or intelligent shading charging system software may allow a user and/or operator to turn on wireless communication capabilities and/or to turn on music.

In embodiments, a computing device 860 in a shading object, intelligent umbrella, and/or an intelligent shading charging system, may have computer-readable instructions, stored in a non-volatile memory, which when executed by a processor, may execute an artificial intelligence process and may provide artificial intelligence functionality to the shading object, intelligent umbrella, or intelligent shading charging assembly. For example, a computing device 860 in a shading object, intelligent umbrella, or intelligent shading charging assembly may receive measurements from environmental sensors, e.g., wind sensors, humidity sensors, air quality sensors, temperature sensors, etc.), analyze the measurements, and make recommendations to users and/or operators regarding sun exposure, heat exposure, and/or hydration. For example, a computing system 860 in a shading object, intelligent umbrella, or intelligent shading charging assembly may receive and analyze temperature measurements and sun intensity measurements, and based on the analysis, provide a recommendation to a shading object, intelligent umbrella, or intelligent shading charging assembly user and/or operator on how long the user or operator should be out in the environment or when an individual should hydrate in an environment. In addition, an individual or operator may input health risk factors, and a computing device 860 in a shading object, intelligent umbrella, or intelligent shading charging assembly may also consider health risk factors when making a recommendation. For example, if a temperature is high and humidity is high, and a user has a heart condition, a computing device system may recommend that a user only spend 30 minutes under a shading object, intelligent umbrella, or intelligent shading charging assembly and that during this time, the individual should drink eight ounces of water.

In embodiments, an integrated computing device 860 in a shading object, intelligent umbrella, or intelligent shading charging assembly may also recommend positioning throughout a day based on weather forecasting and/or sun tracking. In embodiments, a computing device in a shading object, intelligent umbrella, or intelligent shading charging assembly may have stored previous positions of different portions of a shading object (e.g., rotation angle of a stem assembly, angle of an upper assembly 112 with respect to a lower assembly 113 of a central support assembly—FIGS. 1A and 1B or rotation angle of a lower support assembly 187 and angle of an upper support assembly 191 with respect to a lower support assembly 187—FIG. 1C), and may provide a recommendation of a starting shade position based on previous positions of different portions of a shading object, intelligent umbrella, or intelligent shading charging assembly. In addition, a computing device 860 in a shading object, intelligent umbrella, or intelligent shading charging assembly may also consider current environmental factors when making recommendations of a shading object starting position and/or positions throughout a day. In addition, a computing device 860 may consider environmental factors and/or sensor readings and provide a recommendation of when sunburn may occur if 1) no sunscreen is used; 2) sunscreen with a specific sun protection factor (SPF) is used; and/or 3) sunscreen is used in a partly cloudy environment.

In embodiments, a computing device 860 integrated into a shading object, intelligent umbrella, or intelligent shading charging assembly may communicate with and/or interface with an external artificial intelligence system, such as the Amazon Alexa system or the Google Now system. In embodiments, a user may speak into a microphone located on or integrated within a shading object or intelligent central support assembly 107 (for example) (or an upper support assembly 191 or lower support assembly 187 in an intelligent shading charging system) and ask questions or make requests. These voice signals are converted by a computing device 860 and/or a voice recognition engine or module 815 in a shading object, intelligent umbrella, or intelligent shading charging assembly, as discussed previously, and communicated to an external artificial intelligence system (Amazon Alexa and/or Google Now) via a wireless transceiver, a PAN transceiver, and/or a wireless hotspot within a shading object, intelligent umbrella, or intelligent shading charging assembly. In embodiments, a computing device 860 in a shading object, intelligent umbrella, or intelligent shading charging assembly may also comprise an artificial intelligence engine, which may be located on a computing device PCB or within these devices, and perform similar functions to an external artificial intelligence engine (such as Amazon Alexa and/or Google Now). In embodiments, an external artificial intelligence engine may responds to requests, transfer requests to other application servers for processing, and/or perform analysis based on a user request. After an action has been performed and responses and/or confirmations obtained, the external artificial intelligence engine may communicate the responses, answers, and/or confirmations to a computing device in shading object, intelligent umbrella, or intelligent shading charging assembly. An integrated computing device may provide the responses, answer, and/or confirmations to an individual via a sound reproducing apparatus (e.g., speakers) and/or a visual display apparatus (display, monitor, and/or screen). In embodiments, for example, if an intelligent shading charging system is installed in a shopping mall parking lot, a user may ask questions regarding store, theatre or restaurant information, and receive information back from a shopping mall information system through utilization of an artificial intelligence engine and/or a third party artificial intelligence engine. In embodiments, for example, if an intelligence shading charging system is installed in an outdoor sports and/or event facility, a user of an intelligent shading charging system may make verbal requests (e.g., please provide scores, standings, timing of events, detailed description of events, video of events, etc.) and an artificial intelligence engine (either internal to intelligent shading charging system or a third-party AI engine) may interface and/or communicate with a computing device in an outdoor sports and/or event facility to gather information and communicate responses and/or video, images, and/or sound to the user's requests In embodiments, a cable comprising data, control and power lines may be connected and/or attached between shading objects, intelligent umbrellas, and/or intelligent shading charging systems. In embodiments, a cable may be housed in a base assembly 105 and may extend to a power connector on another shading object or intelligent umbrellas. In embodiments, a cable may be housed in a stem assembly 106 and/or a center support assembly 107 and may extend to a power connector on another shading object or intelligent umbrella. In embodiments, one or more cables comprising data, control and power lines may be connected and/or attached between intelligent shading charging systems 260. In embodiments, a cable may be located in a housing 182, a lower assembly 187, or an upper support assembly 191. In embodiments, a rechargeable reservoir 262 may be connected to intelligent shading charging systems 260 via a cable or other connection interface. In embodiments, excess power from an intelligent shading charging system 260 may be transferred and/or communicated to a rechargeable reservoir 262. In embodiments, if an intelligent shading charging system 260 is low on power and its rechargeable battery 184 cannot provide the power, the intelligent shading charging system 260 may utilize the rechargeable reservoir 262 and/or another rechargeable battery to supply power.

In embodiments, a shading object may comprise an automatic button and a manual button, the operation of which is described in are described in detail in U.S. patent application Ser. No. 15/160,856, filed May 20, 2016, entitled "Automated Intelligent Shading Objects and Computer-Readable Instructions for Interfacing With, Communicating With and Controlling a Shading Object" and U.S. patent application Ser. No. 15/160,822, filed May 20, 2016, entitled "Intelligent Shading Objects with Integrated Computing Device," both of which are hereby incorporated by reference.

In embodiments, a shading object or intelligent umbrella stem assembly 106 may be comprised of stainless steel. In embodiments, a shading object stem may be comprised of a plastic and/or a composite material, or a combination of materials listed above. In embodiments, a shading object stem assembly 106, a base assembly 105, and/or a center support assembly 107 may be comprised and/or constructed by a biodegradable material. In embodiments, a shading object stem assembly 106 may be tubular with a hollow inside except for shelves, ledges, and/or supporting assemblies. In embodiments, a shading object stem assembly 106 may have a coated inside surface. In embodiments, a shading object stem assembly 106 may have a circular circumference or a square circumference. In embodiments, a shading object stem assembly 106 may be a separate physical structure from a shading object center support assembly 107. In embodiments, a shading object stem assembly and a shading object or umbrella center support assembly may be one physical structure. In embodiments, for example, a shading object stem assembly 106 and a shading object center support assembly 107 may be comprised of one extruded material (e.g., a single tubular structure of, for example, stainless steel).

In embodiments, a shading object center support assembly 107 may be comprised of stainless steel. In embodiments, a shading object center support assembly 107 may be comprised of a metal, plastic and/or a composite material, or a combination thereof. In embodiments, a shading object center support assembly 107 may be comprised of wood, steel, aluminum or fiberglass. In embodiments, a shading object center support assembly may be a tubular structure, e.g., may have a circular or an oval circumference. In embodiments, a shading object center support assembly 107 may be a rectangular or triangular structure with a hollow interior. In embodiments, a hollow interior of a shading object center support assembly 107 may have a shelf or other structures for holding or attaching assemblies, PCBs, and/or electrical and/or mechanical components. In embodiments, for example components, PCBs, and/or motors may be attached or connected to an interior wall of a shading object center assembly. Likewise, the housing 182, lower support assembly 187, and/or upper support assembly 191 on an intelligent shading charging system may be comprised of materials discussed above.

In embodiments, a plurality of arms/blades 109 (FIGS. 1A and 1B) or 194 (FIG. 1C) and/or arm support assemblies 108 (FIGS. 1A and 1B) or 193 (FIG. 1C) may be composed of materials such as plastics, plastic composites, fabric, metals, woods, composites, or any combination thereof. In an example embodiment, arms/blades 109 or 194 and/or arm support assemblies 108 or 193 may be made of a flexible material. In an alternative example embodiment, arms/blades 109 or 194 and/or arm support assemblies 108 or 193 may be made of a stiffer material.

Figure 14A:
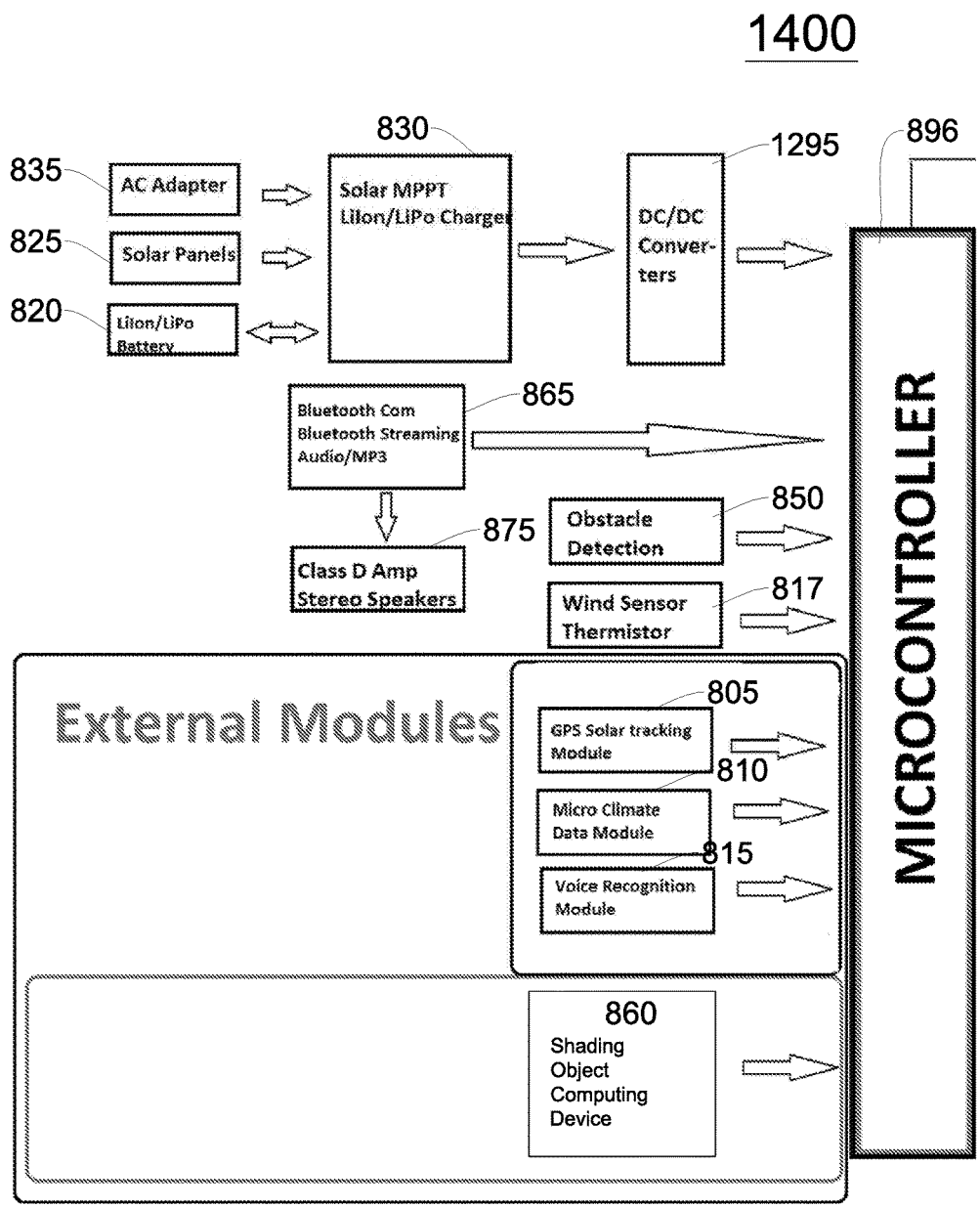
FIGS. 14A AND 14B are a block diagram of multiple assemblies and components or a shading object, intelligent umbrella, or intelligent shading charging system according to embodiments.
Figure 14B:
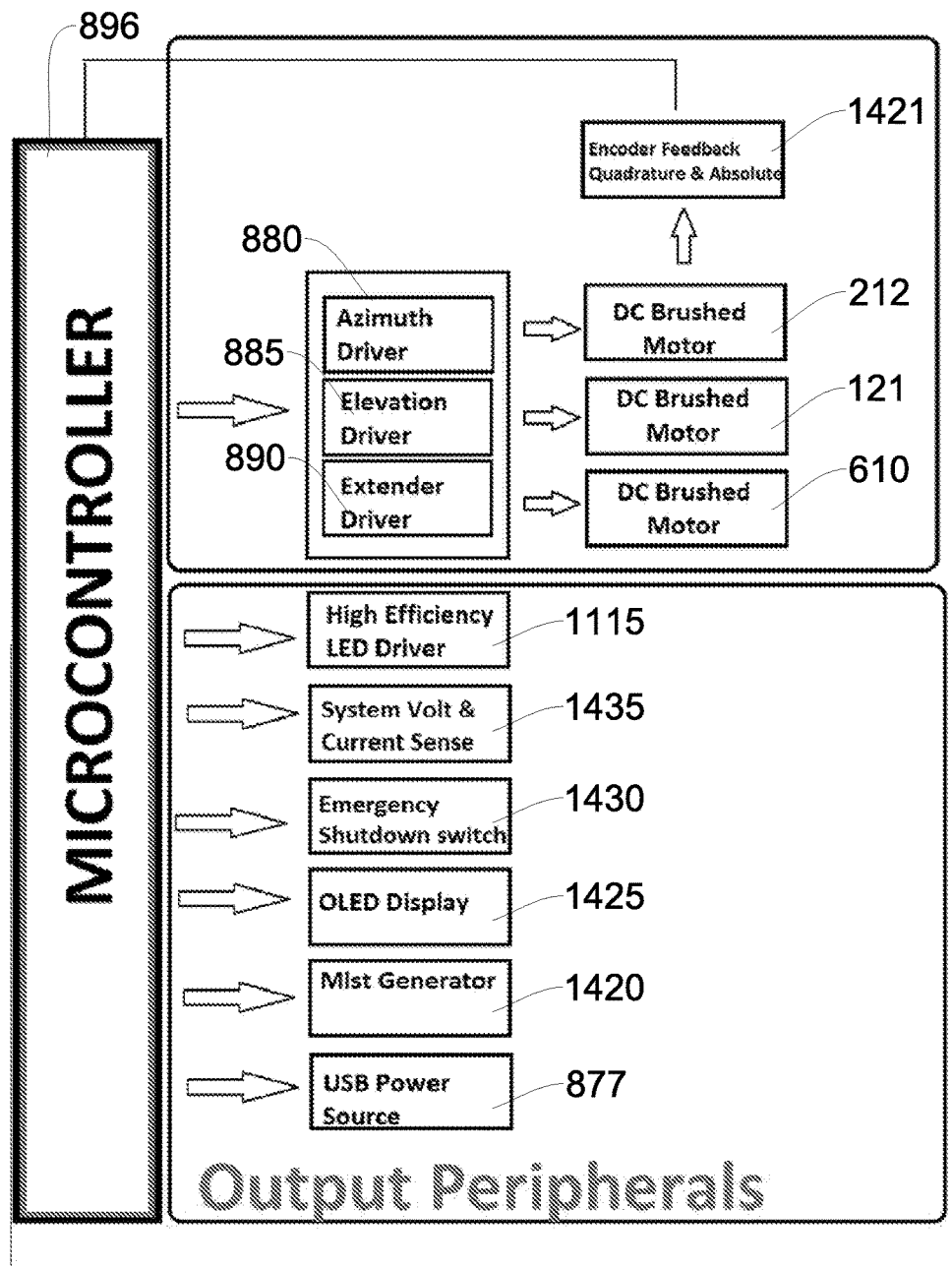

FIGS. 14A and 14B are a block diagram and a flow diagram of a shading object, intelligent umbrella, and/or intelligent shading charging system according to embodiments. In embodiments, a shading object, intelligent umbrella, or intelligent shading charging assembly 1400 comprises a microcontroller 896, a GPS solar tracking module 805, a micro climate data module 810, and/or a voice recognition module 815. In embodiments, a shading object includes a Bluetooth transceiver 865, class D amplifier and stereo speakers 875, an AC adapter 835, arrays of solar panels 825, a LiIon/LiPo rechargeable battery 820, a solar MPPT LiIon/LiPo Charger or Charging Assembly 830, and DC-to-DC converters 1295. In embodiments, a shading object, intelligent umbrella, or intelligent shading charging assembly comprises an obstacle detection module 850 and a wind sensor thermistor 817. In embodiments, a microcontroller 896 may be coupled to an azimuth driver or motor controller 880, an elevation driver or motor controller 885, an extender driver or motor controller 890, each of which are respectively coupled to a respective DC Brushed motor 212, 121 and 610. In embodiments, one or more of the DC brushed motors 212, 121 and 610 are coupled and/or connected to an encoder feedback quadrature and absolute module 1421. In embodiments, an encoder feedback quadrature and absolute module 1421 provides positioning and/or location information about how far a DC brushed motor 212 and/or gearbox assemblies or linear actuators have moved in response to commands, instructions, and/or signals from, for example, the azimuth driver 880. This location and/or position information may be feedback to a microcontroller or processor 896 and the microcontroller/processor 896 may adjust the commands, instructions and/or signals directed to, for example, the azimuth driver 880.

In embodiments, a shading object, intelligent umbrella, or intelligent shading charging assembly may comprise a high efficiency LED driver 1115 and LED lights, a system volt and current sense module and/or circuit 1435, an emergency shutdown switch 1430, a display (e.g., OLED display) 1425, a mist generator system 1420, and/or a USB power source. In embodiments, a user may depress an emergency shutdown switch 1430 to kill or top operations of a shading object, intelligent umbrella, or intelligent shading charging assembly. In embodiments, an emergency shutdown switch and/or an on/off switch may be pressed or depressed to resume and/or restart operation. This allows an operator and/or individual to stop movement and/or operation of a shading object, intelligent umbrella, or intelligent shading charging assembly in emergency situations, such as when electrical mechanical components and/or computing systems are not operating.

In embodiments a shading object, intelligent umbrella, or intelligent shading charging assembly may comprise a system volt & current sense circuit 1435 to determine if a shading object, intelligent umbrella, or intelligent shading charging assembly is operating outside recommended settings, which may result in dangerous operations. If an out-of-threshold condition is detected by a volt and current sense circuit 1435, a controller may send a shutdown or minimize operation command, instruction and/or signal. This feature may be beneficial if a power source is experiencing spikes and/or surges and may protect components and/or assemblies of a shading object. In addition, a volt and current sense circuit 1435 may sense if components and/or assemblies are drawing too much power (and thus causing dangerous conditions) and may cause commands to be sent from the motion control PCB 895 to stop and/or minimize operations. In addition, a voltage and current sense circuit 1435 may communicate, e.g., via the motion control PCB 895 or directly, alert commands, signals, instructions and/or messages to a sound reproduction system (amplifier and or speaker 875) and/or a display device (e.g., OLED display 1425).

In embodiments, an AC adapter 835 and one or more arrays of solar panels 825 may connect and/or plug-in to a charging assembly 830. In embodiments, a charging assembly 830 may comprise a MPPT LiIon/LiPo Charging Assembly or Charger. In embodiments, a charging assembly 830 may provide power to and/or charge a rechargeable battery. In embodiments, a rechargeable battery 820 may be a LiIon/LiPro rechargeable battery 820. In embodiments, an AC adapter 830 and one or more arrays of solar panels 825 may charge a rechargeable battery 820 (either directly or indirectly). In some circumstances, a power draw (e.g., a voltage and/or current draw) may be too great for only one of the AC adapter 830 or one or more arrays of solar panels 825 to provide power. For example, if one or more assemblies of a shading object, intelligent umbrella, or intelligent shading charging assembly is moving, a large amount of current is needed to power the motor and/or assemblies and neither the AC adapter nor array of solar panels may provide this power. In embodiments, a charging assembly 830 may provide power to one or more DC-to-DC converters 1295. In embodiments, a rechargeable battery may provide power to one or more DC-to-DC converters 1295. In embodiments, DC-to-DC converters 1295 may provide power (e.g., voltage and/or current) to other assemblies and/or components in the intelligent shading object or umbrella. For example, the DC-to-DC converter 1296 may provide power to a motion control PCB 895, any of the motor assemblies, a computing device 860, and/or a sensor module 805 housing telemetry sensors and/or weather variable sensors. In embodiments, some other components may be self-powered, e.g., include and/or integrate batteries. In embodiments, a shading object, intelligent umbrella, or intelligent shading charging assembly may also include power storage components, e.g., capacitors and/or recharging reservoirs (including batteries and/or capacitors). In embodiments with power storage components, an AC adapter and/or one or more solar arrays may provide power to a power storage components and the power storage components may provide power to a rechargeable batteries 820. In embodiments, and an AC adapter 835 and/or arrays of solar panels 825 may provide power to a rechargeable battery 820, and a rechargeable battery 820 may provide power to power storage components. Continuing with this illustrative embodiment, power storage components may be coupled and/or connected to DC-to-DC converters 1295 to provide power to a shading object, intelligent umbrella, or intelligent shading charging assembly assemblies and components. This provides benefit of a shading object, intelligent umbrella, or intelligent shading charging assembly being able to compensate for high current flow during operations and not having to deal with charge/discharge cycles of a rechargeable battery. In embodiments, a charging assembly 830 may monitor power input (e.g., amount of current flow) from a power source (e.g., AC adapter and/or one or more array of solar cells. In embodiments, a charging assembly may communicate a value and/or measurement (in response to a request or command asking for current level) indicating an amount of charge remaining in a rechargeable battery 820 (e.g., a current level). In embodiments, a charging assembly 830 may also monitor solar panel array output and/or efficiency as well as AC power quality.

A computing device may be a server, a computer, a laptop computer, a mobile computing device, and/or a tablet. A computing device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

Internal architecture of a computing device includes one or more processors (also referred to herein as CPUs), which interface with at least one computer bus. Also interfacing with computer bus are persistent storage medium/media, network interface, memory, e.g., random access memory (RAM), run-time transient memory, read only memory (ROM), etc., media disk drive interface, an interface for a drive that can read and/or write to media including removable media such as floppy, CD-ROM, DVD, etc., media, display interface as interface for a monitor or other display device, keyboard interface as interface for a keyboard, mouse, trackball and/or pointing device, and other interfaces not shown individually, such as parallel and serial port interfaces, a universal serial bus (USB) interface, and the like.

Memory, in a computing device and/or an intelligent shading object system, interfaces with computer bus so as to provide information stored in memory to processor during execution of software programs such as an operating system, application programs, device drivers, and software modules that comprise program code or logic, and/or computer-executable process steps, incorporating functionality described herein, e.g., one or more of process flows described herein. CPU first loads computer-executable process steps or logic from storage, e.g., memory 1004, storage medium/media, removable media drive, and/or other storage device. CPU can then execute the stored process steps in order to execute the loaded computer-executable process steps. Stored data, e.g., data stored by a storage device, can be accessed by CPU during the execution of computer-executable process steps.

Persistent storage medium/media is a computer readable storage medium(s) that can be used to store software and data, e.g., an operating system and one or more application programs, in a computing device or storage subsystem of an intelligent shading object. Persistent storage medium/media also be used to store device drivers, such as one or more of a digital camera driver, monitor driver, printer driver, scanner driver, or other device drivers, web pages, content files, metadata, playlists and other files. Persistent storage medium/media 1006 can further include program modules/program logic in accordance with embodiments described herein and data files used to implement one or more embodiments of the present disclosure.

A computing device or a processor or controller may include or may execute a variety of operating systems, including a personal computer operating system, such as a Windows, iOS or Linux, or a mobile operating system, such as iOS, Android, or Windows Mobile, or the like. A computing device, or a processor or controller in an intelligent shading controller may include or may execute a variety of possible applications, such as a software applications enabling communication with other devices, such as communicating one or more messages such as via email, short message service (SMS), or multimedia message service (MMS), including via a network, such as a social network, including, for example, Facebook, LinkedIn, Twitter, Flickr, or Google+, to provide only a few possible examples. A computing device or a processor or controller in an intelligent shading object may also include or execute an application to communicate content, such as, for example, textual content, multimedia content, or the like. A computing device or a processor or controller in an intelligent shading object may also include or execute an application to perform a variety of possible tasks, such as browsing, searching, playing various forms of content, including locally stored or streamed content. The foregoing is provided to illustrate that claimed subject matter is intended to include a wide range of possible features or capabilities. A computing device or a processor or controller in an intelligent shading object may also include imaging software applications for capturing, processing, modifying and transmitting image files utilizing the optical device (e.g., camera, scanner, optical reader) within a mobile computing device.

Network link typically provides information communication using transmission media through one or more networks to other devices that use or process the information. For example, network link may provide a connection through a network (LAN, WAN, Internet, packet-based or circuit-switched network) to a server, which may be operated by a third party housing and/or hosting service. For example, the server may be the server described in detail above. The server hosts a process that provides services in response to information received over the network, for example, like application, database or storage services. It is contemplated that the components of system can be deployed in various configurations within other computer systems, e.g., host and server.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, hardware, or firmware (or combinations thereof), process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

The invention claimed is:

1. An intelligent shading charging system, comprising:
    a housing having a rechargeable battery installed therein;
    a lower support assembly connected to the housing;
    an upper support assembly, the upper support assembly comprising one or more arm support assemblies;
    a hinging assembly connecting the lower support assembly to the upper support assembly to allow the upper support assembly to rotate with respect to the lower support assembly;
    a motor assembly, the motor assembly comprising a motor controller and a motor, the motor controller and the motor causing the upper support assembly to rotate the upper support assembly with respect to the lower support assembly via the hinging assembly, the motor assembly housed inside the lower support assembly;
    one or more arms connected to the one or more arm support assemblies;
    a shading fabric;
    one or more solar cell arrays mounted on or integrated within the shading fabric; and
    one or more digital cameras, the one or more digital cameras capturing images, video and/or sound of an area surrounding an intelligent shading charging system.

2. The intelligent shading charging system of claim 1, the housing further including an interface coupled to an electrical power supply system, the electrical power supply system comprising a power grid.

3. The intelligent shading charging system of claim 2, the rechargeable battery in the housing providing excess electrical power to the power grid.

4. The intelligent shading charging system of claim 2, the housing further including an electrical vehicle charging port, the electrical power supply system further providing power to the electrical vehicle charging port.

5. The intelligent shading charging system of claim 1, the rechargeable battery in the housing receiving electrical power from the one or more solar cell arrays.

6. The intelligent shading charging system of claim 1, the rechargeable battery in the housing providing electrical power to components, circuits and/or assemblies in the lower support assembly and/or the upper support assembly.

7. The intelligent shading charging system of claim 1, the housing further including an electrical vehicle charging port, the electrical vehicle charging port being coupled to the rechargeable battery and the rechargeable battery providing power to the electrical vehicle charging port.

8. The intelligent shading charging system of claim 1, the lower support assembly further comprising a light assembly, the light assembly projecting light in a downward direction.

9. The intelligent shading charging system of claim 8, further comprising an additional lighting assembly, the additional lighting assembly projecting light in an upward direction.

10. The intelligent shading charging system of claim 1, further comprising a computing device, the computing device installed within the lower support assembly or the upper support assembly, the computing device further comprising a volatile memory device, a processor, a non-volatile memory device, and computer-readable instructions stored on a non-volatile memory device, loaded into a volatile memory device and executed by the processor.

11. The intelligent shading charging system of claim 10, further comprising a wireless transceiver device, the one or more digital cameras to communicate the captured images, videos and/or sound to the wireless transceiver device, which communicates the captured images, videos and/or sound to the non-volatile memory device.

12. The intelligent shading charging system of claim 11, further comprising the wireless transceiver communicating the captured images, video, and/or sound to an external computing device.

13. The intelligent shading charging system of claim 11, further comprising a display coupled to the intelligent shading charging system, the captured images, videos and/or sound being communicated to the display.

14. An intelligent shading charging system, comprising:
a housing having a rechargeable battery installed therein;
a lower support assembly connected to the housing;
an upper support assembly, the upper support assembly comprising one or more arm support assemblies;
a hinging assembly connecting a lower support assembly to an upper support assembly to allow an upper support assembly to rotate with respect to the lower support assembly;
one or more arms connected to the one or more are support assemblies;
a shading fabric; and
a base assembly installed within the housing including the rechargeable battery, the lower support assembly to be inserted into an opening of the base assembly and the lower support assembly to rotate about an azimuth axis with respect to the base assembly.

15. An intelligent shading charging system, comprising:
a housing having a rechargeable battery installed therein;
a lower support assembly connected to the housing;
an upper support assembly, the upper support assembly comprising one or more arm support assemblies;
a hinging assembly connecting a lower support assembly to an upper support assembly to allow an upper support assembly to rotate with respect to the lower support assembly;
one or more arms connected to the one or more are support assemblies;
a shading fabric;
one or more solar cell arrays mounted on or integrated within the shading fabric;
a wireless transceiver; and
an additional wireless transceiver, the additional wireless transceiver to provide wireless communications capability for a computing device, such as a wireless computing device within an electric vehicle.

16. The intelligent shading charging system of claim 15, the lower support assembly comprising an additional motor assembly.

17. The intelligent shading charging system of claim 16, wherein the additional motor assembly to cause the lower support assembly to rotate about an azimuth axis with respect to the housing including the rechargeable battery.

18. The intelligent shading charging system of claim 15, the upper support assembly comprising an additional motor assembly, the additional motor assembly to cause the one or more arm support assemblies to deploy outward from the upper support assembly to cause the one or more arms and/or shading fabric to be deployed.

* * * * *